(12) United States Patent
Yamasaki et al.

(10) Patent No.: US 11,247,384 B2
(45) Date of Patent: Feb. 15, 2022

(54) METHOD FOR MANUFACTURING STRUCTURE, INTEGRALLY-MOLDED BODY, AND METHOD FOR MANUFACTURING INTEGRALLY-MOLDED BODY

(71) Applicant: KYORAKU CO., LTD., Kyoto (JP)

(72) Inventors: Yoshihiro Yamasaki, Kanagawa (JP); Yu Igarashi, Kanagawa (JP); Yuta Minamigawa, Kanagawa (JP); Teruo Tamada, Tokyo (JP); Yosuke Hayashi, Kanagawa (JP); Kunimasa Ozaki, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 353 days.

(21) Appl. No.: 16/464,141

(22) PCT Filed: Nov. 28, 2017

(86) PCT No.: PCT/JP2017/042672
§ 371 (c)(1),
(2) Date: May 24, 2019

(87) PCT Pub. No.: WO2018/097320
PCT Pub. Date: May 31, 2018

(65) Prior Publication Data
US 2020/0039139 A1 Feb. 6, 2020

(30) Foreign Application Priority Data

Nov. 28, 2016 (JP) .............................. JP2016-230362
Jan. 31, 2017 (JP) .............................. JP2017-015038
(Continued)

(51) Int. Cl.
*B29C 44/00* (2006.01)
*B29C 48/00* (2019.01)
(Continued)

(52) U.S. Cl.
CPC .............. *B29C 63/04* (2013.01); *B29C 44/10* (2013.01); *B29C 48/08* (2019.02);
(Continued)

(58) Field of Classification Search
CPC ......... B29C 44/00; B29C 44/10; B29C 48/00; B29C 48/08; B29C 63/00; B29C 63/0004;
(Continued)

(56) References Cited

FOREIGN PATENT DOCUMENTS

| CN | 106079216 A | 11/2016 |
|----|-------------|---------|
| CN | 107486972 A | 12/2017 |

(Continued)

OTHER PUBLICATIONS

Partial supplementary European Search Report dated Dec. 21, 2020, in connection with corresponding EP Application No. 17873878.7; 12 pages.
(Continued)

*Primary Examiner* — Jacob T Minskey
*Assistant Examiner* — Matthew Hoover
(74) *Attorney, Agent, or Firm* — Maier & Maier, PLLC

(57) ABSTRACT

According to a method for manufacturing a structure that is provided, it is possible to prevent creases on a skin sheet when the skin sheet and a molten resin sheet are integrally molded using a mold. The method provided by the present invention is a method for manufacturing a structure including the step of integrally molding a skin sheet and a molten resin sheet using a mold. The molding is performed with the skin sheet under tension.

4 Claims, 55 Drawing Sheets

(30) Foreign Application Priority Data

Feb. 28, 2017 (JP) .............................. JP2017-036998
Mar. 30, 2017 (JP) .............................. JP2017-068781

(51) Int. Cl.
| | |
|---|---|
| *B29C 63/00* | (2006.01) |
| *B32B 5/00* | (2006.01) |
| *B60R 13/00* | (2006.01) |
| *B29C 63/04* | (2006.01) |
| *B29C 48/08* | (2019.01) |
| *B29C 44/10* | (2006.01) |
| *B32B 5/18* | (2006.01) |
| *B32B 5/24* | (2006.01) |
| *B60R 13/02* | (2006.01) |

(52) U.S. Cl.
CPC ............ *B29C 63/0004* (2013.01); *B32B 5/18* (2013.01); *B32B 5/245* (2013.01); *B60R 13/0243* (2013.01); *B29C 2948/92028* (2019.02); *B32B 2605/003* (2013.01)

(58) Field of Classification Search
CPC .. B29C 63/04; B32B 5/00; B32B 5/10; B32B 5/18; B32B 5/20; B32B 5/24; B32B 5/245; B60R 13/00; B60R 13/02; B60R 13/024; B60R 13/0243
See application file for complete search history.

(56) References Cited

FOREIGN PATENT DOCUMENTS

| | | | |
|---|---|---|---|
| DE | 102010021123 | A1 | 11/2011 |
| EP | 0226105 | A1 | 6/1987 |
| JP | 50-050473 | A | 5/1974 |
| JP | 63-189226 | A | 8/1988 |
| JP | 8-281779 | A | 10/1996 |
| JP | H11-291760 | A | 10/1999 |
| JP | 2000-289093 | A | 10/2000 |
| JP | 2004-261961 | A | 9/2004 |
| JP | 2006-151042 | A | 6/2006 |
| JP | 2012-192512 | A | 10/2012 |
| JP | 2014-051077 | A | 3/2014 |
| JP | 2014-079899 | A | 5/2014 |
| JP | 2014-079900 | A | 5/2014 |
| JP | 2014-079901 | A | 5/2014 |
| JP | 2015-104886 | A | 6/2015 |
| JP | 2016-135580 | A | 7/2016 |
| JP | 2016-172456 | A | 9/2016 |

OTHER PUBLICATIONS

International Search Report issued in corresponding International Application No. PCT/JP2017/042672 dated Feb. 27, 2018.
Japanese Office Action dated Sep. 29, 2020, in corresponding JP Application No. 2016-230362 (10 pp., including machine-generated English translation).
Chinese Office Action dated Sep. 30, 2020, in corresponding CN Application No. 201780072691.8 (12 pp., including machine-generated English translation).
Japanese Office Action dated Oct. 20, 2020, in corresponding JP Application No. 2017-068781 (12 pp., including machine-generated English translation).
Japanese Office Action dated Nov. 17, 2020, in corresponding JP Application No. 2017-036998 (8 pp., including machine-generated English translation).
Chinese Office Action dated Apr. 6, 2021, in connection with corresponding CN Application No. 201780072691.8 (12 pp., including machine-generated English translation).
Japanese Office Action dated Apr. 20, 2021, in connection with corresponding JP Application No. 2017-068781; (8 pp., including machine-generated English translation).

FIG. 6
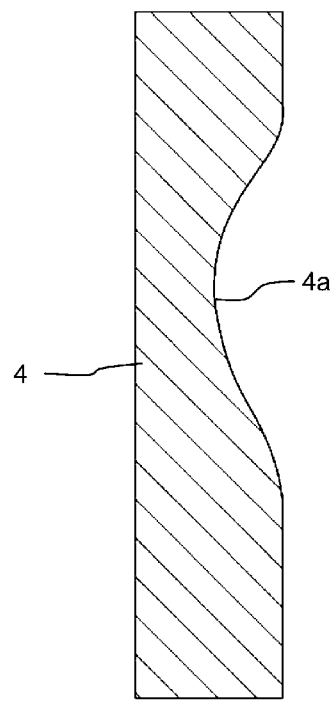
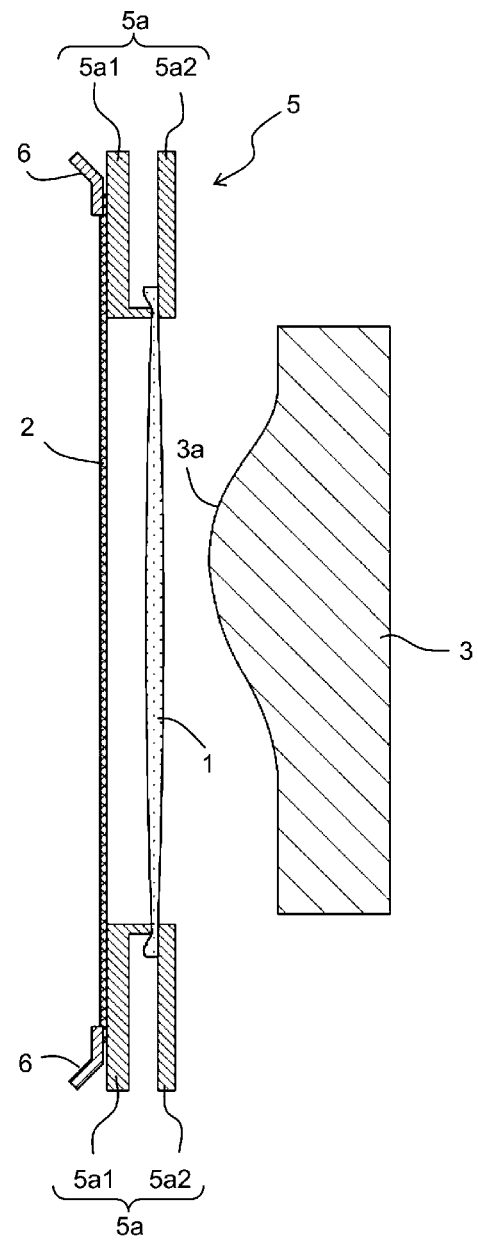

FIG. 8
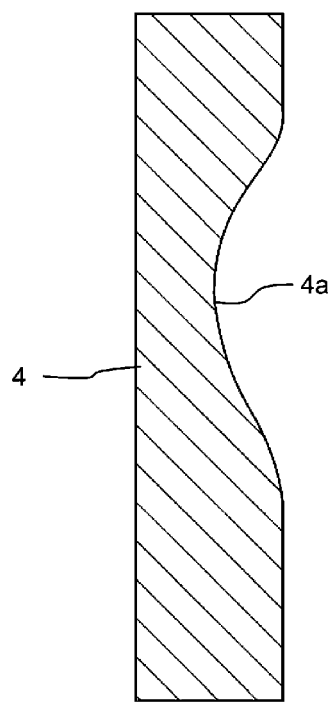
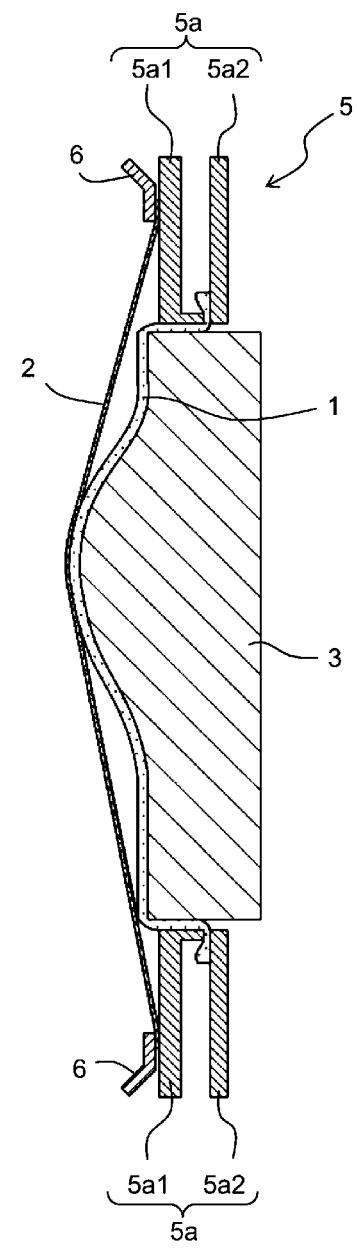

METHOD FOR MANUFACTURING STRUCTURE, INTEGRALLY-MOLDED BODY, AND METHOD FOR MANUFACTURING INTEGRALLY-MOLDED BODY

CROSS REFERENCE TO RELATED APPLICATIONS

This is a U.S. National Phase Application under 35 U.S.C. § 371 of International Patent Application No. PCT/JP2017/042672, filed Nov. 28, 2017, which claims priority of Japanese Patent Application No. 2016-230362, filed Nov. 28, 2016; Japanese Patent Application No. 2017-015038, filed Jan. 31, 2017; Japanese Patent Application No. 2017-036998, filed Feb. 28, 2017 and Japanese Patent Application No. 2017-068781, filed Mar. 30, 2017. The entire contents of which are hereby incorporated by reference.

TECHNICAL FIELD

The present invention relates to a method for manufacturing a structure that can be used as a vehicle interior member (such as a door trim), an integrally-molded body, and a manufacturing method thereof.

BACKGROUND

In a structure such as a vehicle interior member, a skin sheet may be integrally molded onto a surface of a molded body for the purpose of, for example, improving the aesthetic appearance of the structure. In JP-A-2015-104886, a resin sheet and a skin sheet are molded by vacuum suction in a state where the skin sheet is placed between the resin sheet and a mold. Consequently, the skin sheet is integrally molded on the surface of a molded body.

SUMMARY OF THE INVENTION

A skin sheet may be molded onto a molded body with a single wall structure. In this case, the skin sheet may be provided on both sides of one resin sheet. Moreover, the skin sheet may be provided on a surface, which is opposite to the mold, of the resin sheet. In these cases, the method described in Patent Literature 1 cannot be used. Therefore, the skin sheet tends to crease.

The present invention has been made considering such circumstances. The present invention provides the following method for manufacturing a structure. This manufacturing method allows preventing creases on a skin sheet when the skin sheet and a molten resin sheet are integrally molded, using a mold.

According to the present invention, the following method is provided. This method is a method for manufacturing a structure including the step of integrally molding a skin sheet and a molten resin sheet using a mold. The molding is performed with the skin sheet under tension.

The inventors earnestly conducted a study of prevention of creases on a skin sheet. As a result, the inventors found that creases are prevented from occurring on the skin sheet by performing the molding with the skin sheet under tension, and reached the completion of the present invention.

Various embodiments of the present invention are illustrated by example below. The embodiments illustrated below can be combined with one another.

It is preferable that the resin sheet be formed by extruding molten resin through a slit and drooping the molten resin.

It is preferable that the tension be applied to the skin sheet widthwise.

It is preferable that the tension be applied by an expander, the expander include a pair of holding units, each of the skin sheet and the resin sheet be held at both ends widthwise by the pair of holding units, and a distance between the pair of holding units be increased to apply the tension to the skin sheet.

It is preferable that the mold include a first and a second mold, and the skin sheet and the resin sheet be sandwiched between the first and second molds to perform the molding.

It is preferable that the first mold include a protrusion, the resin sheet be placed between the skin sheet and the first mold, the resin sheet and the skin sheet be pressed against the protrusion, and then sandwiched between the first and second molds to perform the molding, and the skin sheet be pressed against the protrusion to apply the tension to the skin sheet.

It is preferable that the resin sheet be a foamed resin sheet.
It is preferable that the skin sheet be a nonwoven fabric sheet.

BRIEF DESCRIPTION OF THE DRAWINGS

FIG. 6 is a cross-sectional view of the same cross section as FIG. 2 for explaining a step of applying tension.

FIG. 8 is a cross-sectional view of the same cross section as FIG. 2 for explaining the primary shaping step.

FIG. 11A illustrates a first surface 43a side and FIG. 11B illustrates a second surface 43b side.

DETAILED DESCRIPTION

Figure 1:
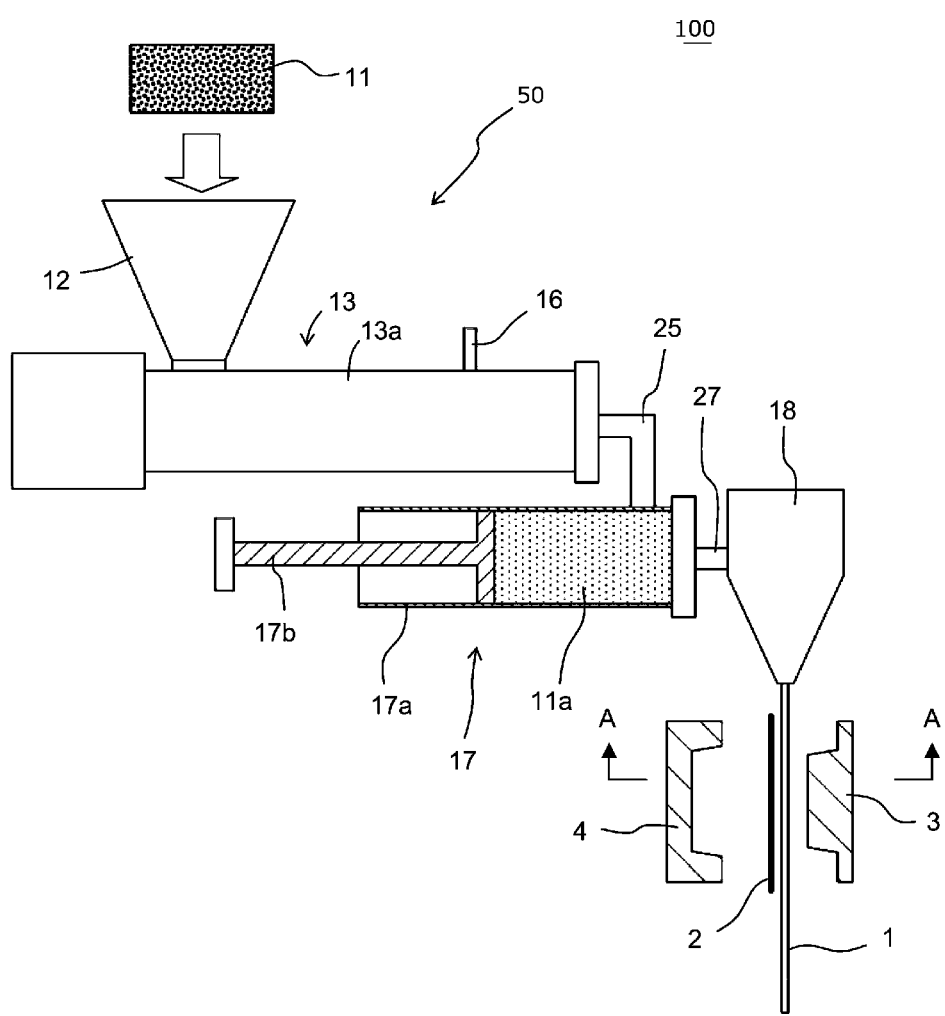
FIG. 1 illustrates an example of a molding machine 100 that can be used in a method for manufacturing a structure according to one embodiment of the present invention.

Embodiments of the present invention are described hereinafter. Various feature matters illustrated in the embodiments illustrated below can be combined with one another. Moreover, each feature matter establishes itself as the invention independently.

First Embodiment

1. Configuration of Molding Machine 100

Firstly, a molding machine 100 that can be used to carry out a method for manufacturing a structure according to one embodiment of the present invention is described, using FIGS. 1 to 10. The molding machine 100 includes a resin supply apparatus 50, a T-die 18, and molds 3 and 4. The resin supply apparatus 50 includes a hopper 12, an extruder 13, an injector 16, and an accumulator 17. The extruder 13 and the accumulator 17 are connected via a connecting pipe 25. The accumulator 17 and the T-die 18 are connected via a connecting pipe 27.

Each configuration is described in detail below.

<Hopper 12, Extruder 13>

The hopper 12 is used to charge raw resin 11 into a cylinder 13a of the extruder 13. The form of the raw resin 11 is not especially limited, but is normally a pellet. The raw resin is, for example, a thermoplastic resin such as polyolefin. Examples of polyolefin include low-density polyethylene, liner low-density polyethylene, high-density polyethylene, polypropylene, ethylene-propylene copolymer, and a mixture thereof. The raw resin 11 is charged into the cylinder 13a from the hopper 12 and then heated in the cylinder 13a. Accordingly, the raw resin 11 melts into molten resin. Moreover, the molten resin is carried to a distal end of the cylinder 13a with the rotation of a screw placed in the cylinder 13a. The screw is placed in the cylinder 13a, and the rotation of the screw allows carrying the molten resin while mixing the molten resin. A gear apparatus is provided at a base end of the screw. The gear apparatus drives and rotates the screw. The number of screws placed in the cylinder 13a may be one or more.

<Injector 16>

The cylinder 13a is provided with the injector 16 for injecting a foaming agent into the cylinder 13a. If the raw resin 11 is not foamed, the injector 16 can be omitted. Examples of the foaming agent that is injected from the injector 16 include a physical foaming agent, a chemical foaming agent, and a mixture thereof. The foaming agent is preferably a physical foaming agent. Inorganic foaming agents such as air, carbonic acid gas, nitrogen gas, and water, organic foaming agents such as butane, pentane, hexane, dichloromethane, and dichloroethane, and supercritical fluids thereof can be used as the physical foaming agent.

The supercritical fluid is preferably produced using carbon dioxide, nitrogen, or the like. Nitrogen is increased to or above a critical temperature of −149.1° C. and a critical pressure of 3.4 MPa to obtain a supercritical fluid. Carbon dioxide is increased to or above a critical temperature of 31° C. and a critical pressure of 7.4 MPa to obtain a supercritical fluid. Examples of the chemical foaming agent include one that generates carbonic acid gas by a chemical reaction of an acid (for example, a citric acid or a salt thereof) and a base (for example, sodium bicarbonate). The chemical foaming agent may be charged from the hopper 12 instead of being injected from the injector 16.

<Accumulator 17, T-Die 18)>

A molten resin 11a to which the foaming agent has been added, or a molten resin 11a to which the foaming agent has not been added, is extruded through a resin extrusion port of the cylinder 13a, and is injected into the accumulator 17 via the connecting pipe 25. The accumulator 17 includes a cylinder 17a and a piston 17b that can slide in the cylinder 17a. The molten resin 11a can be stored in the cylinder 17a. After a predetermined amount of the molten resin 11a is stored in the cylinder 17a, the piston 17b is moved to extrude the molten resin 11a through a slit provided in the T-die 18 via the connecting pipe 27 and droop the molten resin 11a. Consequently, a resin sheet 1 is formed.

<First and Second Molds 3 and 4>

The resin sheet 1 is guided to between the first and second molds 3 and 4, and molded by the molds 3 and 4. The mold 3 has a protrusion 3a on a surface facing the mold 4. The mold 4 has a recess 4a on a surface facing the mold 3. The protrusion 3a and the recess 4a have shapes that are substantially complementary to each other. The mold 3 is preferably provided with many vacuum suction holes. Therefore, the resin sheet 1 can be shaped into a shape along a surface of the mold 3 by vacuum suction. The mold 4 may also be provided with vacuum suction holes. If the molten resin contains a foaming agent, the resin sheet 1 is a foamed resin sheet, and the molded body is a molded foam.

Figure 10:
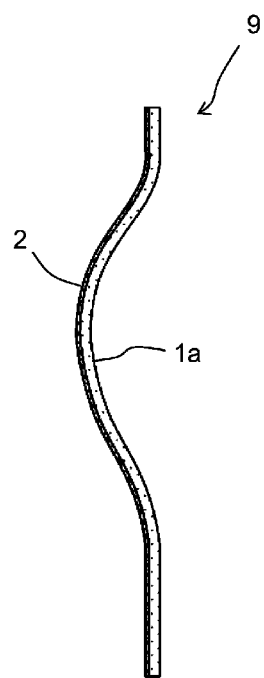
FIG. 10 is a cross-sectional view of the same cross section as FIG. 2 for explaining a postprocessing step.

Moreover, a skin sheet 2 is placed at a position adjacent to the resin sheet 1 in such a manner as to coincide with the resin sheet 1, and the skin sheet 2 and the resin sheet 1 are sandwiched between the molds 3 and 4. Accordingly, the skin sheet 2 and the resin sheet 1 can be integrally molded. Consequently, as illustrated in FIG. 10, a structure 9 where the skin sheet 2 has been integrally molded with a molded body 1a.

Figure 2:
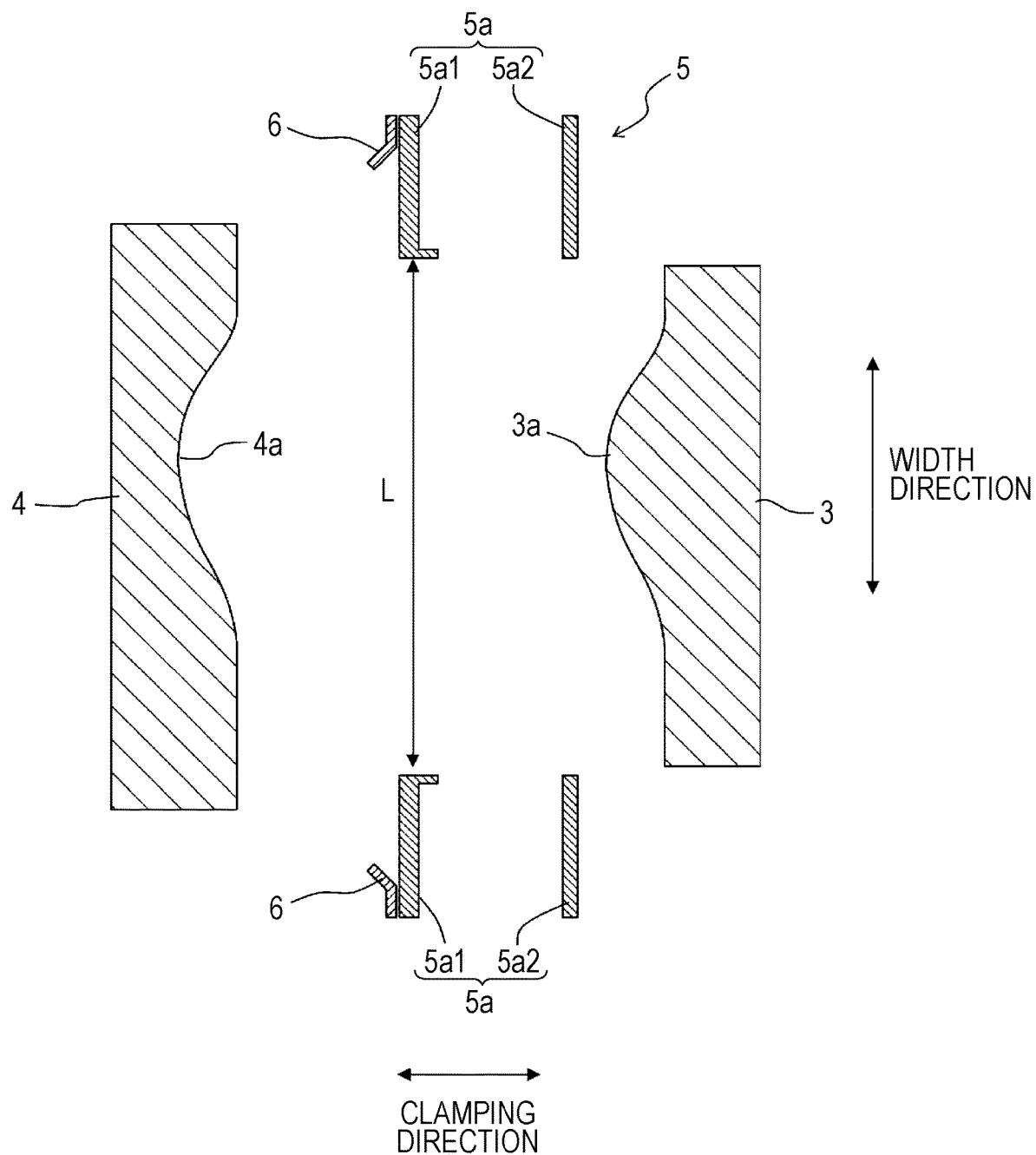
FIG. 2 is a cross-sectional view, corresponding to a cross section A-A in FIG. 1, for explaining molds 3 and 4 and an expander 5.
Figure 5:
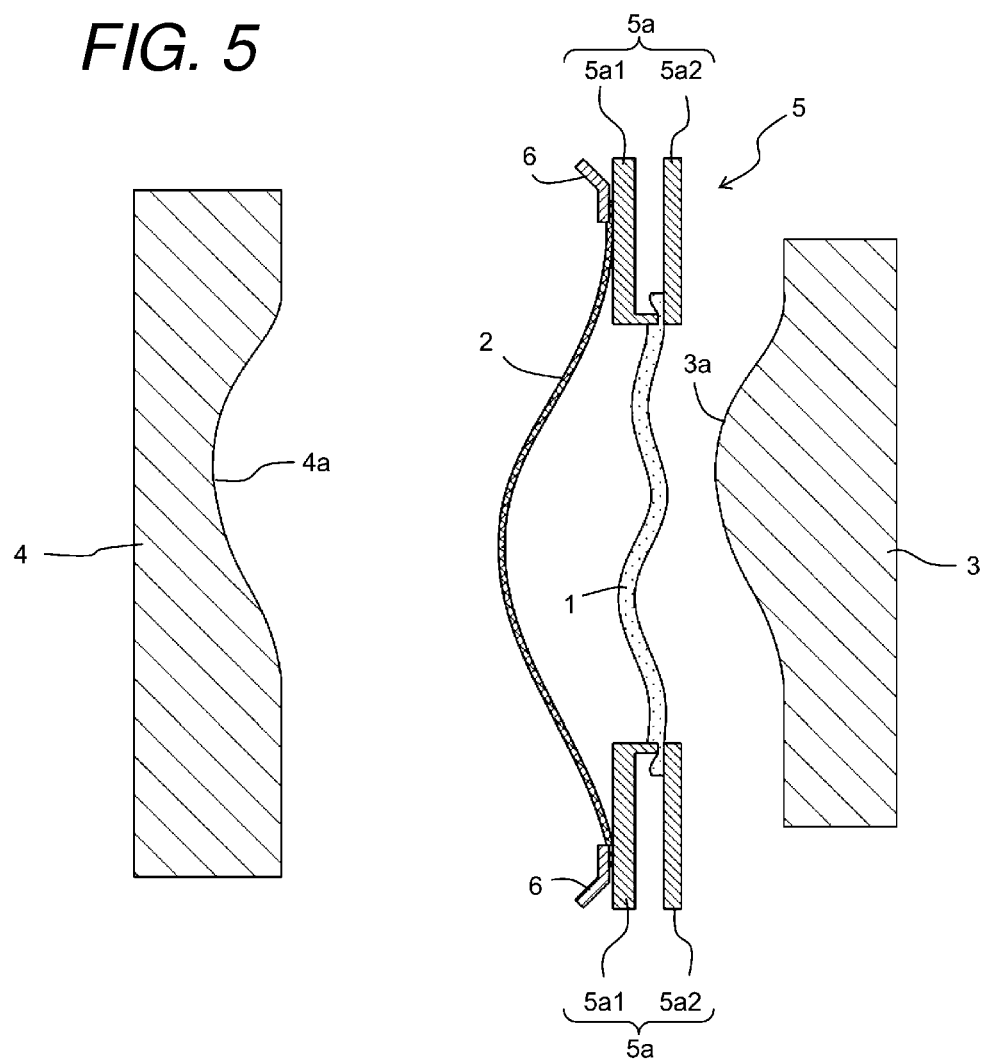
FIG. 5 is a cross-sectional view of the same cross section as FIG. 2 for explaining the step of holding a resin sheet, and illustrates a state after the resin sheet 1 is held.

Moreover, as illustrated in FIG. 2, an expander 5 for applying tension to the resin sheet 1 and the skin sheet 2 between the molds 3 and 4 is provided. The expander 5 includes a pair of holding units 5a. Each holding unit 5a includes holding portions 5a1 and 5a2. As illustrated in FIG. 5, it is possible to hold the resin sheet 1 between the holding portions 5a1 and 5a2. Moreover, a distance L between the pair of holding units 5a can be changed. The distance L is increased in a state where the pair of holding units 5a is holding the resin sheet 1 at both ends widthwise to allow applying tension to the resin sheet 1 widthwise. Moreover, each holding unit 5a is provided with a sheet attaching portion 6. As illustrated in FIG. 2, the skin sheet 2 is attached at both ends widthwise to a pair of the sheet attaching portions 6 to also allow applying tension to the skin sheet 2 widthwise when the distance L is increased. Moreover, the expander 5 can move relatively to the mold 3 in a clamping direction. The expander 5 moves relatively toward the mold 3 to allow pressing the skin sheet 2 and the resin sheet 1 against the protrusion 3a of the mold 3.

2. Method for Manufacturing Structure

Here, a method for manufacturing a structure according to one embodiment of the present invention is described, using FIGS. 2 to 10. The method of the embodiment includes a step of attaching a skin sheet, a step of holding a resin sheet, a step of applying tension, a primary shaping step, a secondary shaping step, and a postprocessing step. The details are described below.

<Step of Attaching Skin Sheet>

Figure 3:
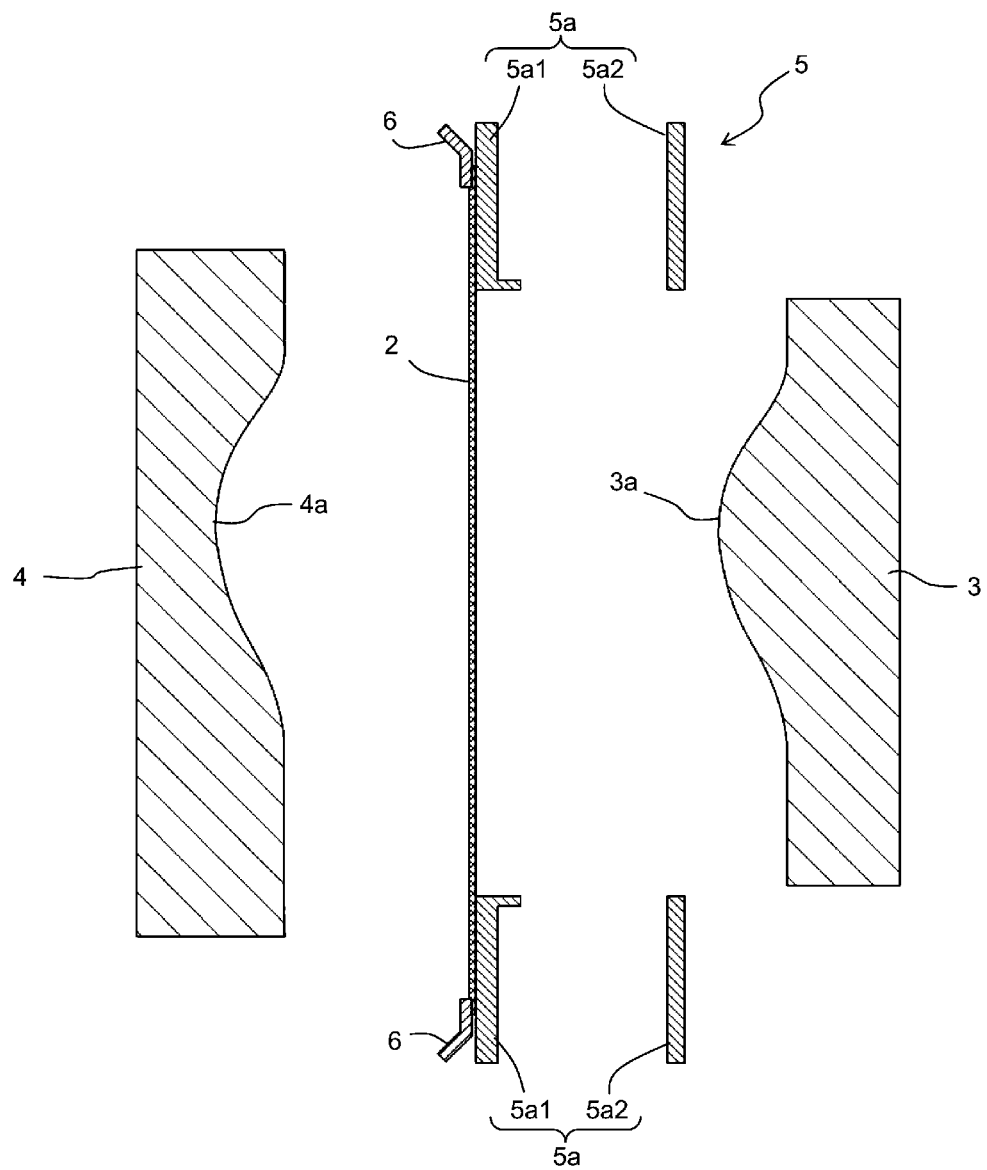
FIG. 3 is a cross-sectional view of the same cross section as FIG. 2 for explaining a step of attaching a skin sheet.

As illustrated in FIGS. 2 to 3, in the step of attaching a skin sheet, the skin sheet 2 is attached to the sheet attaching portions 6. The skin sheet 2 is simply required to be a sheet that can be integrally molded with the resin sheet 1, and a material and configuration thereof is not especially limited. The skin sheet 2 may or may not be breathable. In an example, the skin sheet 2 is a nonwoven fabric sheet.

<Step of Holding Resin Sheet>

Figure 4:
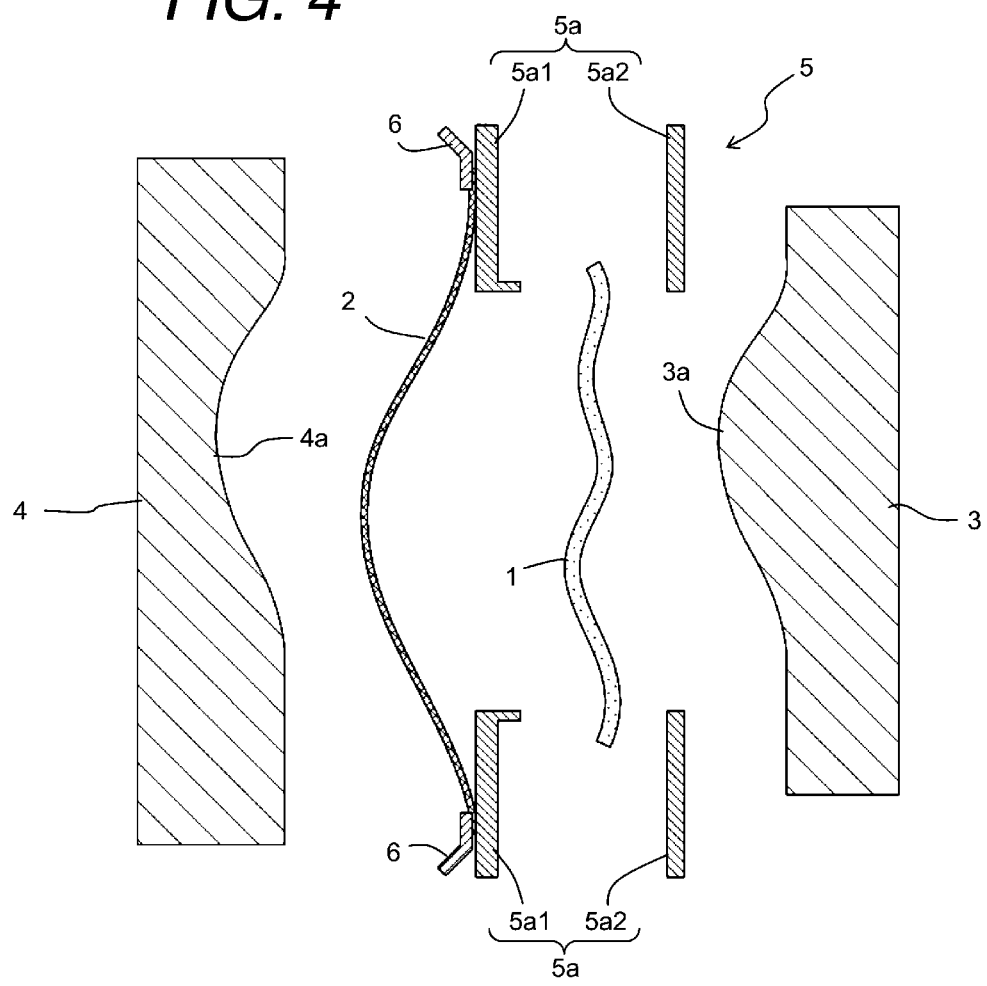
FIG. 4 is a cross-sectional view of the same cross section as FIG. 2 for explaining a step of holding a resin sheet, and illustrates a state before a resin sheet 1 is held.

As illustrated in FIGS. 4 to 5, in the step of holding a resin sheet, the distance L between the pair of holding units 5a is reduced, and the resin sheet 1 placed between the molds 3 and 4 is held at each end portion widthwise between the holding portions 5a1 and 5a2. Accordingly, the resin sheet 1 is held. The resin sheet 1 is formed by extruding molten resin through a slit provided in the T-die 18 and drooping the molten resin. As illustrated in FIG. 5, the resin sheet 1 is normally wavy. If the resin sheet 1 is a foamed resin sheet, the degree of waviness is noticeable. Hence, the technical significance of applying tension to the resin sheet 1 widthwise becomes remarkable.

<Step of Applying Tension>

As illustrated in FIGS. 5 and 6, in the step of applying tension, the distance L between the pair of holding units 5a is increased to apply tension to the skin sheet 2 and the resin sheet 1 widthwise.

<Primary Shaping Step>

Figure 7:
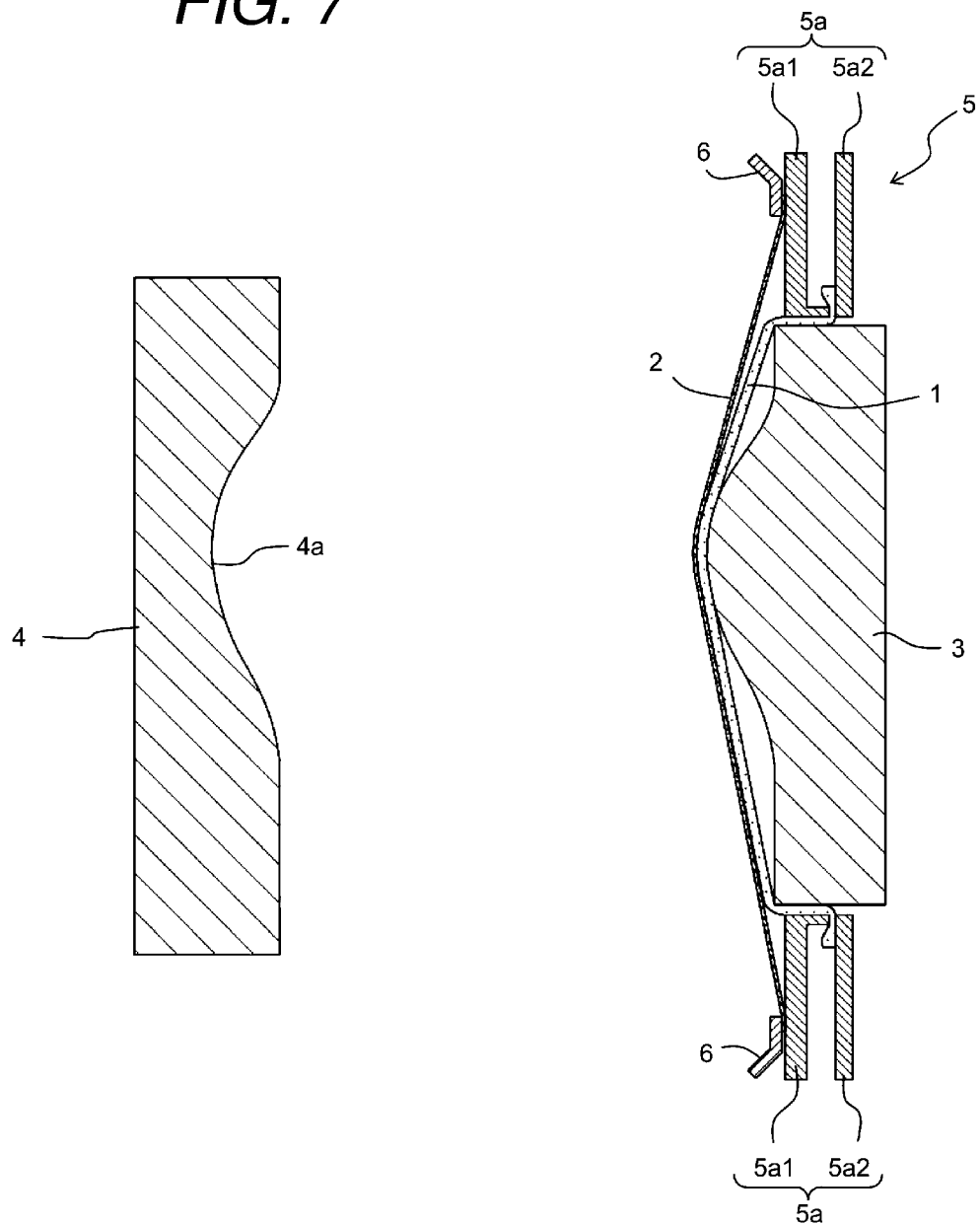
FIG. 7 is a cross-sectional view of the same cross section as FIG. 2 for explaining a primary shaping step.

As illustrated in FIGS. 6 and 7, in the primary shaping step, the expander 5 is moved relatively toward the mold 3 to press the skin sheet 2 and the resin sheet 1 against the protrusion 3a of the mold 3. Consequently, primary shaping is performed. At this point in time, the tension applied to the skin sheet 2 and the resin sheet 1 is increased. In FIG. 7, the expander 5 is moved closer to the mold 3. The mold 3 may be moved closer to the expander 5. The step of applying tension may be omitted, and the primary shaping step may be configured in such a manner as to apply tension to the skin sheet 2 and the resin sheet 1. In other words, tension may be applied to the skin sheet 2 by pressing the skin sheet 2 against the protrusion 3a. Moreover, in the primary shaping step, as illustrated in FIG. 8, the resin sheet 1 is vacuum suctioned through the vacuum suction holes provided to the mold 3 to shape the resin sheet 1 into the shape along the surface of the mold 3.

<Secondary Shaping Step>

Figure 9:
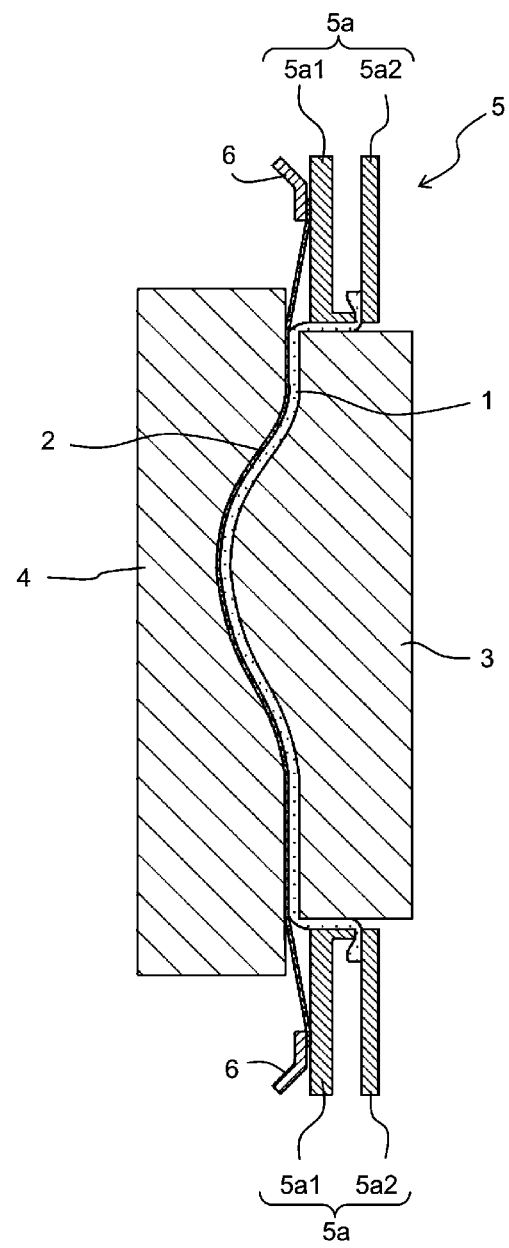
FIG. 9 is a cross-sectional view of the same cross section as FIG. 2 for explaining a secondary shaping step.

As illustrated in FIGS. 8 and 9, in the secondary shaping step, the skin sheet 2 and the resin sheet 1 are sandwiched between the molds 3 and 4. Consequently, secondary shaping is performed on the skin sheet 2 and the resin sheet 1. Consequently, the skin sheet 2 and the resin sheet 1 are integrally molded. Moreover, in the secondary shaping step, the resin sheet 1 is vacuum suctioned through the vacuum suction holes provided to the mold 4 to shape the resin sheet 1 into a shape along a surface of the mold 4. Consequently, the skin sheet 2 and the resin sheet 1 may be integrally molded.

<Postprocessing Step>

As illustrated in FIGS. 9 and 10, in the postprocessing step, the molded body obtained by secondary shaping is taken out from the molds 3 and 4 and unnecessary parts are removed. Consequently, the structure 9 where the skin sheet 2 has been integrally molded with the molded body 1a is obtained.

3. Other Embodiments

The present invention can also be carried out in the following modes:

In the above embodiment, primary shaping and secondary shaping are sequentially performed to mold the skin sheet 2 and the resin sheet 1. Instead of this, the skin sheet 2 and the resin sheet 1 may be molded by clamping the molds 3 and 4 together from the state illustrated in FIG. 6 as illustrated in FIG. 9 without performing primary shaping. Also in this case, the skin sheet 2 and the resin sheet 1 are molded with the skin sheet 2 under tension. Hence, creases are prevented on the skin sheet 2.

In the above embodiment, the expander 5 applies tension to the skin sheet 2 and the resin sheet 1. Instead of this, different apparatuses may apply tension to the skin sheet 2 and the resin sheet 1. In this case, it becomes possible to individually control the tension that is applied to the skin sheet 2 and the tension that is applied to the resin sheet 1.

In the above embodiment, tension is applied to both of the skin sheet 2 and the resin sheet 1. Instead of this, tension may be applied only to the skin sheet 2.

In the above embodiment, the skin sheet 2 is placed on the secondary shaping side. Instead of this, the skin sheet 2 may be placed on the primary shaping side. In other words, the skin sheet 2 may be placed between the resin sheet 1 and the mold 3. Also in this case, it is possible to prevent creases on the skin sheet 2 by performing molding with the skin sheet 2 under tension.

If the skin sheet 2 is placed on the primary shaping side and the skin sheet 2 is breathable, the skin sheet 2 and the resin sheet 1 can be molded by vacuum suction. In this case, the mold on the secondary shaping side is not required. In other words, the present invention can also be carried out with one mold. In this case, the mold is simply required to have a protrusion. Moreover, the mold may have a recess. Furthermore, both of a protrusion and a recess may be provided.

If the skin sheet 2 and the resin sheet 1 are integrally molded in a state where the skin sheet 2 is placed on each of the primary shaping side and the secondary shaping side of the resin sheet 1, a structure where the skin sheet 2 has been integrally molded on either surface of the molded body 1a with a single wall is obtained.

Second Embodiment

In terms of a vehicle interior member such as a door trim, it may be required to attach an insert member such as a clip to a resin molded body (base) made of a thermoplastic resin for the purpose of assembly with another component. In such a case, resin is introduced into a cavity of a mold in a state where the insert member is placed in the cavity to mold an integrally molded body including the base and the insert member. A thick-wall portion is conventionally formed on a molded foam as follows: one reheated and softened foamed resin sheet is placed between a pair of split mold blocks; the foamed resin sheet is vacuum suctioned through both molds; and secondary foaming is performed on the foamed resin sheet.

A high design quality in an appearance (design surface) that can be seen by a consumer is required for the integrally-molded body used as a vehicle interior member in this manner. If the integrally-molded body is, for example, a double-wall body, an uneven geometry resulting from the insert member does not appear on the design surface side. However, in a case of a single-wall body, it is assumed that the uneven geometry appears on the design surface side and the design quality is reduced. Moreover, examples of a countermeasure include increasing the thickness of the product to a level at which the uneven geometry does not appear. However, the weight of the product may increase to reduce practicality as the commodity product.

The embodiment has been made considering such circumstances. The embodiment provides an integrally-molded body and manufacturing method thereof that can avoid exposure of an uneven geometry resulting from an insert member.

An integrally-molded body provided according to a first aspect of the embodiment includes a sheet-shaped molded foam and an insert member. The molded foam has a first and a second surface facing each other. The insert member includes a main body portion and an extension portion extending from the main body portion. The extension portion is buried in the molded foam on the first surface side.

In the integrally-molded body according to the first aspect of the embodiment, a base is made of a foamed resin and is lightweight. In addition, the insert member is molded, buried in the base. Hence, it is possible to avoid exposure of an uneven geometry resulting from the insert member on a design surface side that can be seen by a consumer. In other words, an integrally-molded body with higher practicality and higher design quality can be molded.

In the embodiment, not a solid resin but a foamed resin is used for the base. It is required for a solid single-wall body to increase the thickness of the base to hide projections and depressions. On the other hand, if a foamed resin is used, it is easier to produce a product that is lighter than a solid molded body. Moreover, since the base is the foamed resin, the thickness can also be increased by vacuum shaping. At this point in time, it is simply that the diameter of an internal cell is increased. When insert molding is performed, even if the thickness of the product is increased to a level where the uneven geometry does not appear, it is hardly required to change the weight of the product.

Moreover, it is assumed that the pull-out strength of the insert member is reduced in the foamed resin as compared to a known solid resin. Hence, the vicinity of a spot where the insert member is placed is compressed to allow an improvement in the spread of the resin around the insert member and an increase in pull-out strength.

As described above, according to the embodiment, it is possible to manufacture a good design molded foam that does not show an uneven geometry of an insert member attaching portion on a design surface side. Furthermore, the molded foam is lightweight even with a thick base and has a high pull-out strength of the insert member by compressing a surrounding portion.

Various embodiments of the embodiment are illustrated by example below. The embodiments illustrated below can be combined with one another.

It is preferable that an area corresponding to the insert member, and a surrounding area thereof be flat on the second surface.

It is preferable that the molded foam include a first and a second portion, the insert member be buried in the first portion, t1>t2, and the t1 be a thickness of the first portion, and the t2 be a thickness of the second portion.

It is preferable that a groove be provided along a boundary between the first and second portions.

It is preferable that the second surface be covered with a skin member.

It is preferable that an average thickness of the molded foam be equal to or less than 20 mm.

Moreover, a method provided according to a second aspect of the embodiment is a method for manufacturing an integrally-molded body using a first and a second mold. The method includes: an inserting step; a placement step; and a molding step. In the inserting step, an insert member is mounted on the second mold. In the placement step, foamed resin in a molten state is caused to droop between the first and second molds in a state where the insert member is mounted on the second mold. The insert member includes a main body portion and an extension portion extending from the main body portion. The extension portion is buried in the foamed resin in the molding step.

In the second aspect of the embodiment, a molten foamed resin sheet is vacuum suctioned by both of the first and second molds to stretch cells at the center portion that is hardly cooled by the air and has low viscosity. It becomes possible to increase the thickness to a gap provided between the molds. Hence, when the insert member is inserted, the uneven geometry hardly appears on the design surface side. Accordingly, it is possible to manufacture a flat molded body with high design quality.

It is preferable that the molding step include an expansion step, and in the expansion step, the foamed resin be vacuum suctioned by both of the first and second molds in a state where the first and second molds are close to each other in such a manner as to provide a gap greater than a thickness of the foamed resin between the first and second molds, and accordingly be expanded to a thickness of the gap.

It is preferable that the expansion step include a first suction step, a mold approaching step, and a second suction step in this order, in the first suction step, the foamed resin be vacuum suctioned by the first mold to shape the foamed resin into a shape along a cavity of the first mold, in the mold approaching step, the first and second molds be brought close to each other in such a manner as to provide the gap between the first and second molds, and in the second suction step, the foamed resin be vacuum suctioned by the first and second molds to expand the foamed resin to the thickness of the gap.

It is preferable that the second mold include a protrusion surrounding a mounting part for the insert member, and in the expansion step, the protrusion press the foamed resin to form a groove on the foamed resin.

The embodiment is described below. Various feature matters illustrated in the embodiment illustrated below can be combined with one another. Moreover, each feature matter establishes itself as the invention independently.

1. Integrally-Molded Body 41

Figure 11A:
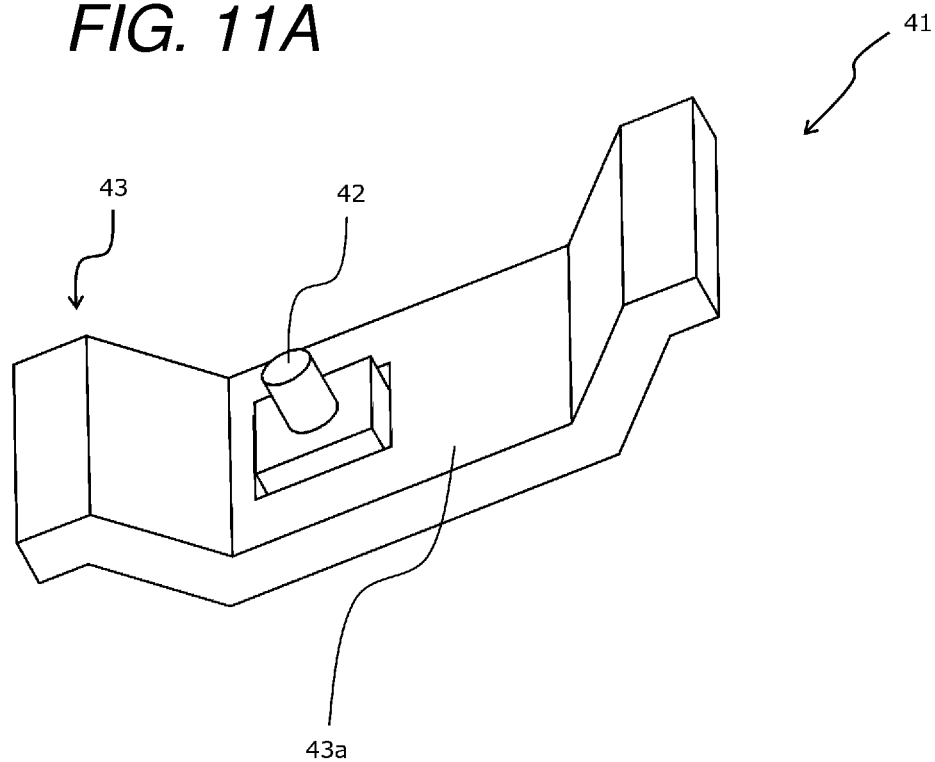
FIGS. 11A and 11B are perspective views of an integrally-molded body 41 according to an embodiment of the present invention, and particularly
Figure 11B:
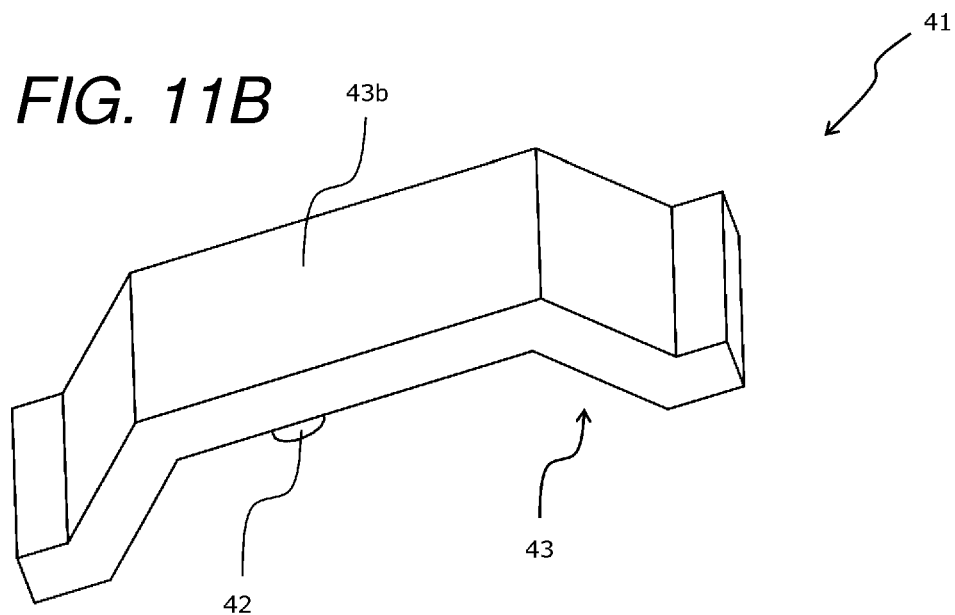

FIGS. 11A and 11B are perspective views illustrating an integrally-molded body 41 according to the embodiment. As illustrated in FIGS. 11A and 11B, the integrally-molded body 41 according to the embodiment is, for example, a vehicle interior member such as a door trim, and is an integrally-molded body formed by insert molding. In other words, the integrally-molded body 41 includes an insert member 42 (for example, a clip) molded by, for example, injection molding, and a molded foam 43 molded in such a manner as to bury the insert member 42. As illustrated in FIGS. 11A and 11B, the molded foam 43 has a sheet shape, and has a first surface 43a and a second surface 43b. Here, the first surface 43a is a surface where the insert member 42 is attached, and the second surface 43b is a back surface thereof (what is called a design surface). It is characterized in that an area corresponding to the insert member 42 (that is, an area of the second surface 43b, which faces a portion of the first surface 43a where the insert member 42 is buried), and a surrounding area thereof are flat. Although not illustrated in FIGS. 11A and 11B, the second surface 43b may be covered with a skin member such as a carpet. A method for manufacturing the integrally-molded body 41, which is described below, is described assuming a case of covering with a skin member.

Figure 12:
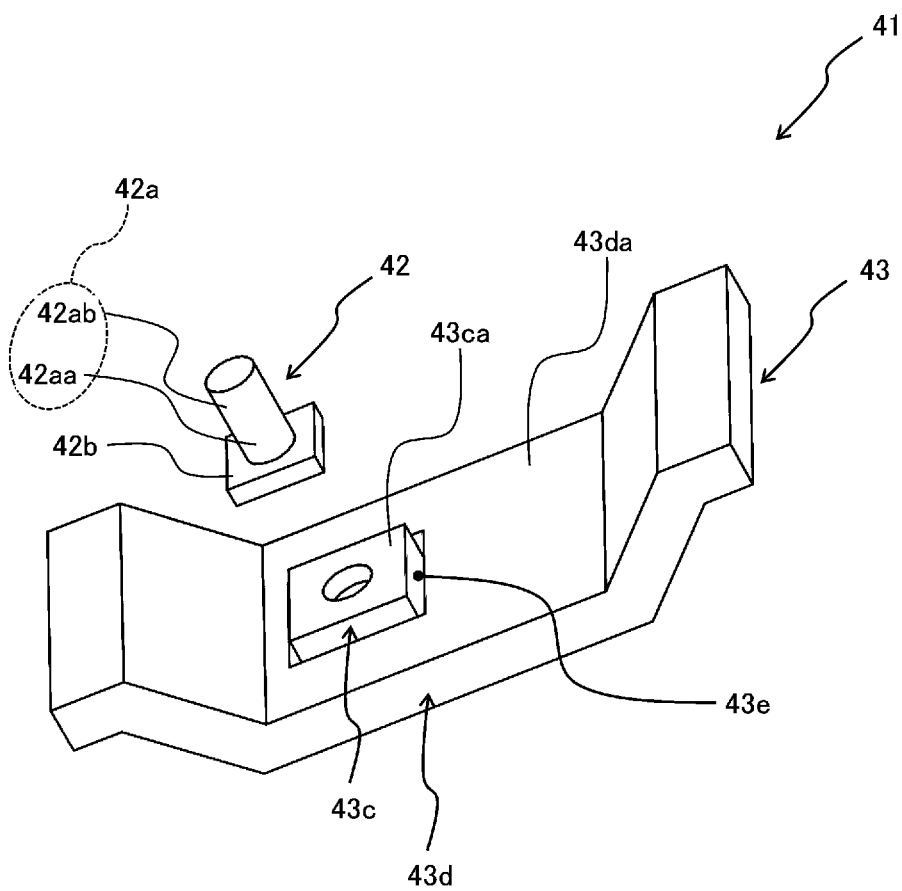
FIG. 12 is an exploded view of the integrally-molded body 41 illustrated in FIGS. 11A and 11B exploded into an insert member 42 and a molded foam 43.
Figure 13A:
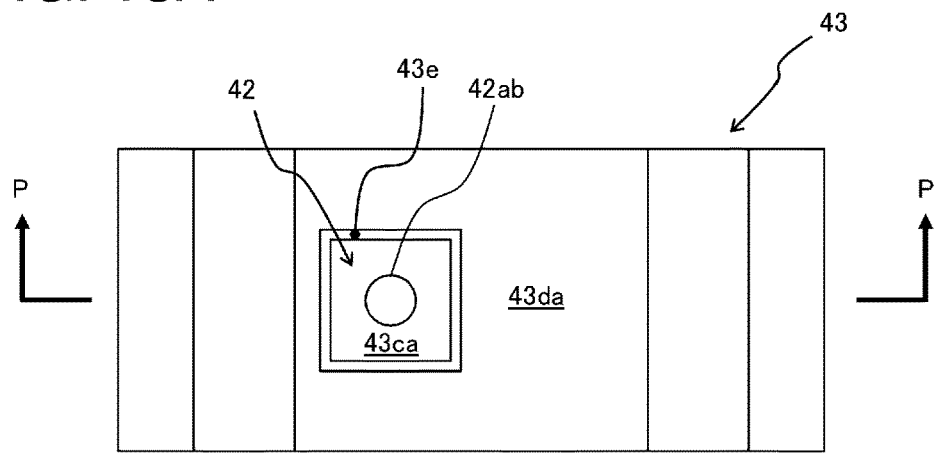
FIG. 13A is a plan view of the integrally-molded body 41 illustrated in FIGS. 11A and 11B.
Figure 13B:
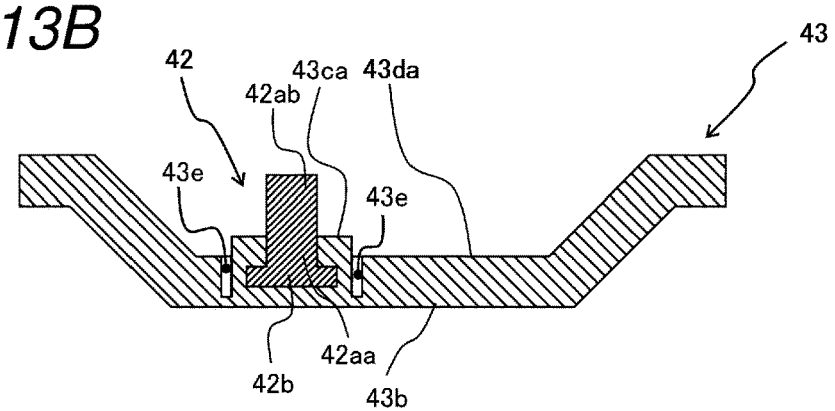
FIG. 13B is a cross-sectional view along P-P in FIG. 13A.
Figure 13C:
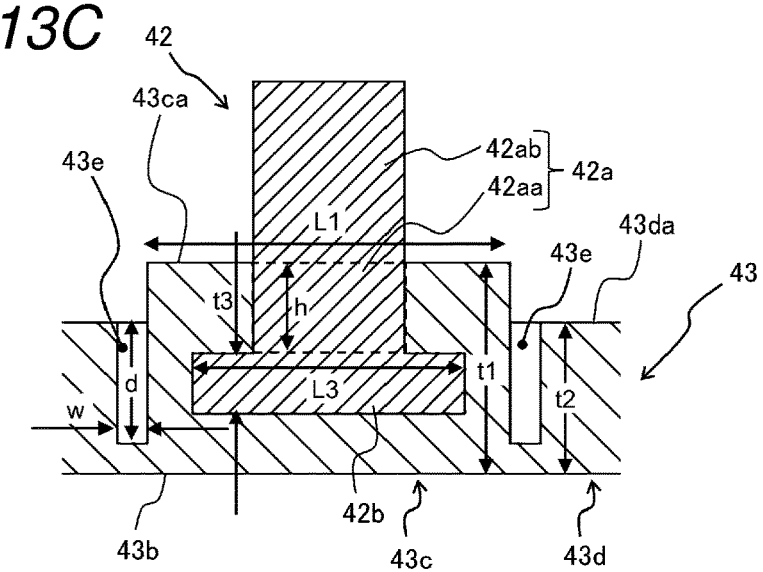
FIG. 13C is a partial enlarged view of FIG. 13B.

FIG. 12 is an exploded view of the integrally-molded body 41 illustrated in FIG. 11A exploded into the insert member 42 and the molded foam 43. Moreover, FIG. 13A is a plan view of the integrally-molded body 41 illustrated in FIGS. 11A and 11B. FIG. 13B is a cross-sectional view along P-P in FIG. 13A. FIG. 13C is a partial enlarged view of FIG. 13B. The insert member 42 may be a resin molded body or metal molded body, and a manufacturing method thereof is not especially limited. As illustrated in FIG. 12, the insert member 42 includes a main body portion 42a and an extension portion 42b. Especially, as illustrated in FIGS. 13B and 13C, the main body portion 42a includes a buried portion 42aa and a protruding portion 42ab. The buried portion 42aa is buried in the molded foam 43 via the first surface 43a in the integrally-molded body 41. The protruding portion 42ab is adjacent to the buried portion 42aa, and protrudes from the first surface 43a without being buried in the molded foam 43. The extension portion 42b is closer to the second surface 43b side than the buried portion 42aa is and is adjacent to the buried portion 42aa. The extension portion 42b extends in a planar direction related to the first and second surfaces 43a and 43b. Such a configuration allows preventing the insert member 42 from coming out of the molded foam 43. In the embodiment, as illustrated in FIG. 13A and the like, the shape of the extension portion 42b is substantially square in plan view. It may be substantially rectangular or substantially circular.

As described above, the molded foam 43 includes the first and second surfaces 43a and 43b. Moreover, the molded foam 43 includes a first portion 43c and a second portion 43d, which are two portions having different thicknesses from each other. The first surface 43a for the two portions is referred to as a first portion first surface 43ca and a second portion first surface 43da. The first portion first surface 43ca is placed in such a manner as to bury the insert member 42 therein. As illustrated in FIG. 13C, let the thickness of the first portion 43c be t1, and let the thickness of the second portion 43d be t2. An implementation where t1>t2 is carried out. The value of t1/t2 is, for example, 1.1 to 3.0, specifically, for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. The value of t1/t2 may be within a range between any two of the numerical values illustrated here by example.

As illustrated in FIG. 13C, let the thickness of the extension portion 42b be t3. The value of t3/t1 is, for example, 0.05 to 0.90, specifically, for example, 0.05, 0.10, 0.15, 0.20, 0.25, 0.30, 0.35, 0.40, 0.45, 0.50, 0.55, 0.60, 0.65, 0.70, 0.75, 0.80, 0.85, or 0.90. The value of t3/t1 may be within a range between any two of the numerical values illustrated here by example.

As illustrated in FIG. 13C, let the height of the buried portion 42aa (that is, the depth of the extension portion 42b buried under the first portion first surface 43ca) be h. The value of h/t1 is, for example, 0.05 to 0.80, specifically, for example, 0.05, 0.10, 0.15, 0.20, 0.25, 0.30, 0.35, 0.40, 0.45, 0.50, 0.55, 0.60, 0.65, 0.70, 0.75, or 0.80. The value of h/t1 may be within a range between any two of the numerical values illustrated here by example.

Figure 14:
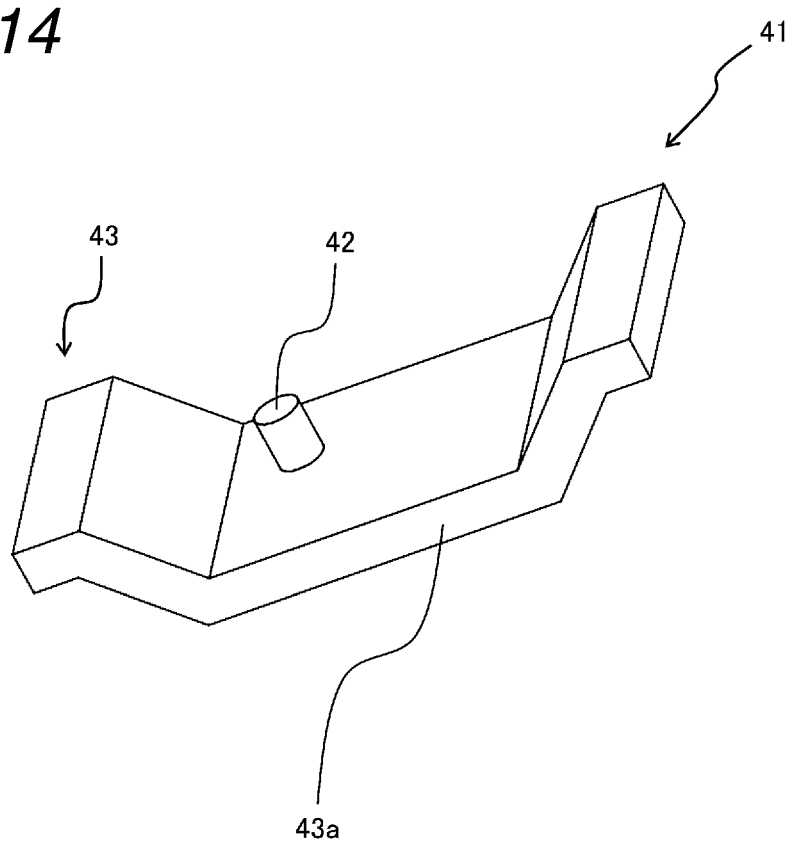
FIG. 14 is a perspective view of the integrally-molded body 41 according to a modification where a first portion first surface 43ca and a groove 43e illustrated in FIG. 12 and the like are not provided.

As illustrated in FIGS. 13B and 13C, a groove 43e is provided along a boundary between the first portion first surface 43ca and the second portion first surface 43da. As illustrated in FIG. 13C, let the depth of the groove be d. The value of d/t2 is, for example, 0.05 to 0.90, specifically, for example, 0.05, 0.10, 0.15, 0.20, 0.25, 0.30, 0.35, 0.40, 0.45, 0.50, 0.55, 0.60, 0.65, 0.70, 0.75, 0.80, 0.85, or 0.90. The value of d/t2 may be within a range between any two of the numerical values illustrated here by example. In other words, the first portion 43c and the second portion 43d are defined, separated by the groove 43e. In the embodiment, as illustrated in FIG. 13A and the like, the first portion first surface 43ca is substantially square. Instead of this, the groove 43e may be formed in such a manner that the first portion first surface 43ca is substantially rectangular or substantially circular. Furthermore, it is simply required to prevent the insert member 42 from coming out of the molded foam 43. Please note that the first portion first surface 43ca and the groove 43e are not always required in terms of the configuration (refer to FIG. 14).

Moreover, as illustrated in FIG. 13C, let the length of one side of the first portion first surface 43ca in the planar direction be L1, let the length of one side of the extension portion 42b in the same direction be L3, and let the width of the groove 43e be w. The value of L3/L1 is, for example, 0.30 to 0.80, specifically, for example, 0.30, 0.35, 0.40, 0.45, 0.50, 0.55, 0.60, 0.65, 0.70, 0.75, or 0.80. The value of L3/L1 may be within a range between any two of the numerical values illustrated here by example. The value of w/L1 is, for example, 0.01 to 0.30, specifically, for example, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. The value of w/L1 may be within a range between any two of the numerical values illustrated here by example.

An average thickness considering all of the first and second portions 43c and 43d and the groove 43e of the molded foam 43 is preferably equal to or less than 20 mm. The average thickness is, for example, 1 to 20 mm, specifically, for example, 1, 2, 3, 4, 5, 6, 7, 8, 9, 10, 11, 12, 13, 14, 15, 16, 17, 18, 19, or 20 mm. The average thickness may be within a range between any two of the numerical values illustrated here by example.

2. Configuration of Foam Molding Machine 200

Figure 15:
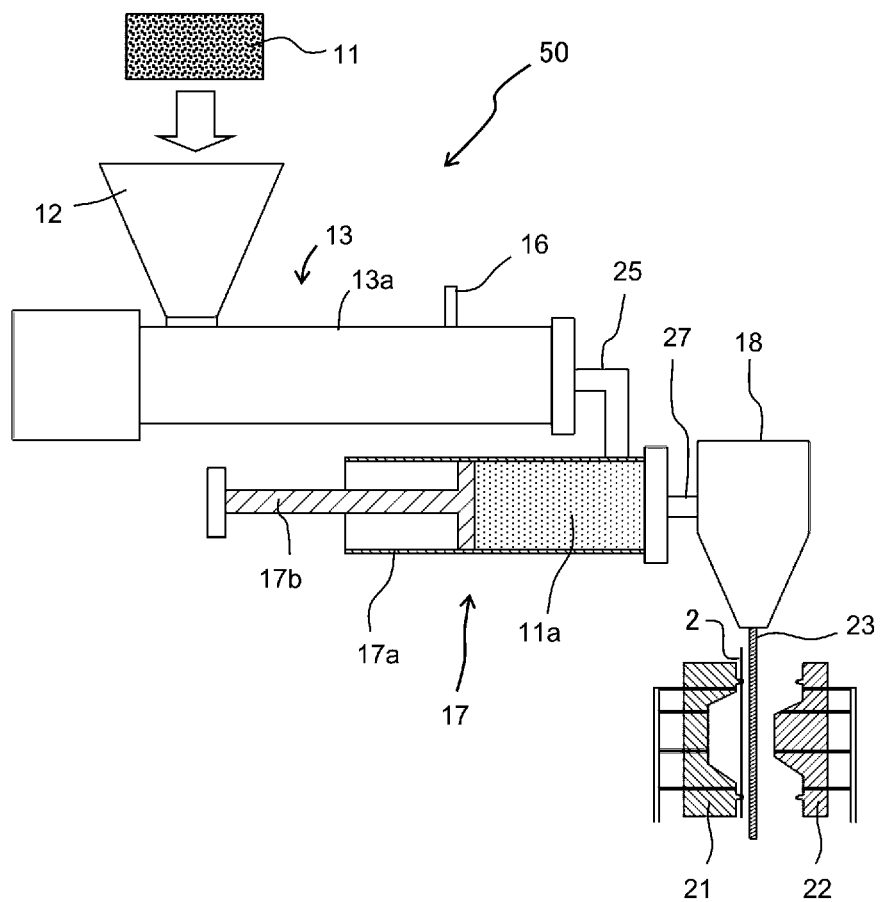
FIG. 15 illustrates an example of a foam molding machine that can be used in a method for manufacturing the integrally-molded body 41 according to an embodiment of the present invention.

Next, a foam molding machine that can be used to carry out a method for manufacturing an integrally-molded body according to one embodiment of the present invention is described, using FIGS. 15 to 22. FIG. 15 illustrates an example of a foam molding machine that can be used in a method for manufacturing the integrally-molded body 41 according to an embodiment of the present invention. A foam molding machine 200 includes a resin supply apparatus 50, a T-die 18, a first mold 21, and a second mold 22. The resin supply apparatus 50 includes a hopper 12, an extruder 13, an injector 16, and an accumulator 17. The extruder 13 and the accumulator 17 are connected via a connecting pipe 25. The accumulator 17 and the T-die 18 are connected via a connecting pipe 27. The T-die can be used with a cylindrical die core. Each configuration is described in detail below.

<Hopper 12, Extruder 13>

The hopper 12 is used to charge raw resin 11 into a cylinder 13a of the extruder 13. The form of the raw resin 11 is not especially limited, but is normally a pellet. The raw resin is, for example, a thermoplastic resin such as polyolefin. Examples of polyolefin include low-density polyethylene, liner low-density polyethylene, high-density polyethylene, polypropylene, ethylene-propylene copolymer, and a mixture thereof. The raw resin 11 is charged into the cylinder 13a from the hopper 12 and then heated in the cylinder 13a. Accordingly, the raw resin 11 melts into molten resin. Moreover, the molten resin is carried to a distal end of the cylinder 13a with the rotation of a screw placed in the cylinder 13a. The screw is placed in the cylinder 13a, and the rotation of the screw allows carrying the molten resin while mixing the molten resin. A gear apparatus is provided at a base end of the screw. The gear apparatus drives and rotates the screw. The number of screws placed in the cylinder 13a may be one or more.

<Injector 16>

The cylinder 13a is provided with the injector 16 for injecting a foaming agent into the cylinder 13a. Examples of the foaming agent that is injected from the injector 16 include a physical foaming agent, a chemical foaming agent, and a mixture thereof. The foaming agent is preferably a physical foaming agent. Inorganic foaming agents such as air, carbonic acid gas, nitrogen gas, and water, organic foaming agents such as butane, pentane, hexane, dichloromethane, and dichloroethane, and supercritical fluids thereof can be used as the physical foaming agent.

The supercritical fluid is preferably produced using carbon dioxide, nitrogen, or the like. Nitrogen is increased to or above a critical temperature of −149.1° C. and a critical pressure of 3.4 MPa to obtain a supercritical fluid. Carbon dioxide is increased to or above a critical temperature of 31° C. and a critical pressure of 7.4 MPa to obtain a supercritical fluid. Examples of the chemical foaming agent include one that generates carbonic acid gas by a chemical reaction of an acid (for example, a citric acid or a salt thereof) and a base (for example, sodium bicarbonate). The chemical foaming agent may be charged from the hopper 12 instead of being injected from the injector 16.

<Accumulator 17, T-Die 18>

Foamed resin obtained by melting and mixing the raw resin and the foaming agent is extruded through a resin extrusion port of the cylinder 13a, and injected into the accumulator 17 via the connecting pipe 25. The accumulator 17 includes a cylinder 17a and a piston 17b that can slide in the cylinder 17a. The foamed resin can be stored in the cylinder 17a. After a predetermined amount of the foamed resin is stored in the cylinder 17a, the piston 17b is moved to extrude the foamed resin through a slit provided in the T-die 18 via the connecting pipe 27 and droop the foamed resin. Consequently, a foamed resin sheet 23 is formed.

<Molds 21 and 22>

Figure 16:
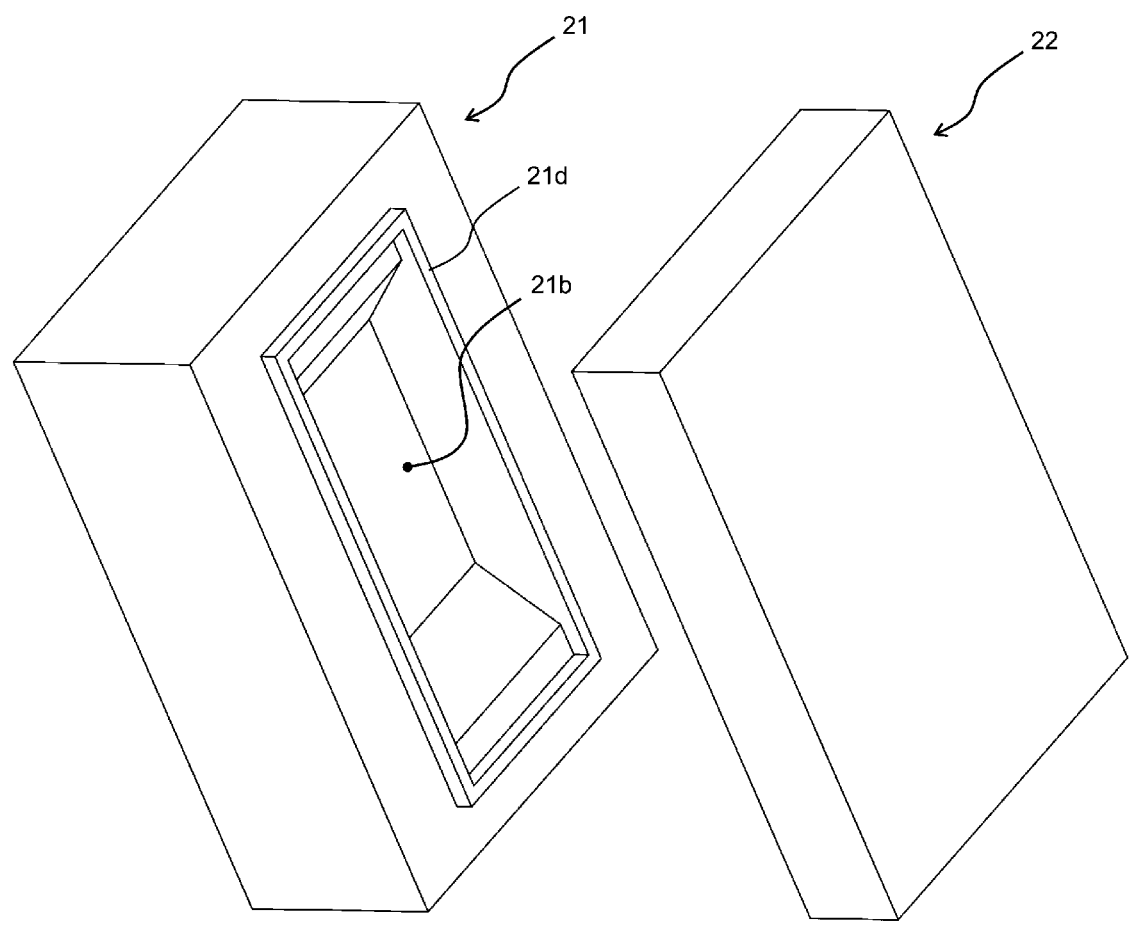
FIG. 16 is a perspective view of first and second molds 21 and 22, in which illustrations of vacuum suction holes 21a and 22a are omitted here, considering visibility.
Figure 17:
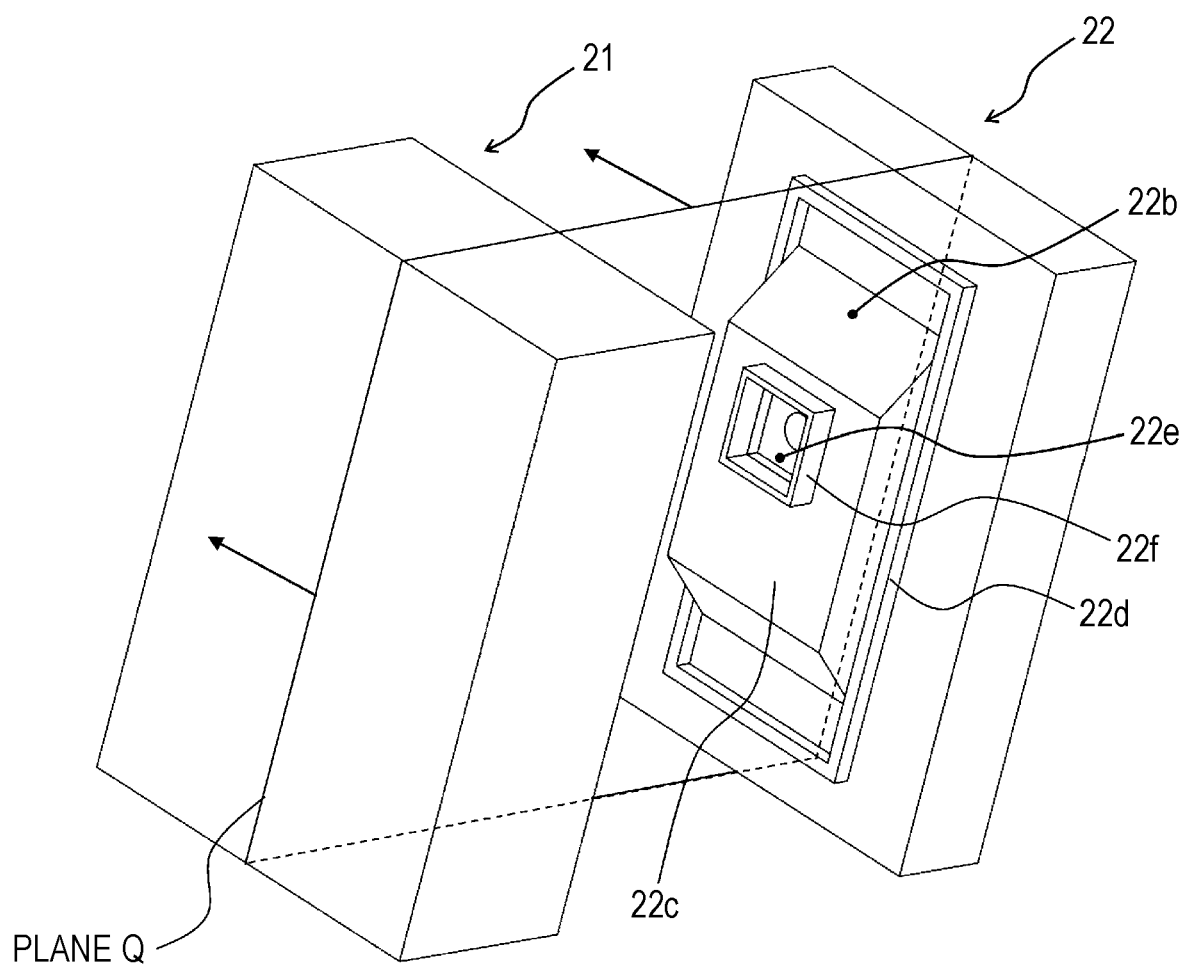
FIG. 17 is a perspective view as viewed from a different angle from FIG. 16.

FIGS. 16 and 17 are perspective views of the first and second molds 21 and 22. The illustrations of vacuum suction holes 21a and 22a are omitted here, considering visibility. The foamed resin sheet 23 (refer to FIG. 19) is guided to between the first mold 21 and the second mold 22 (expressed in combination as the molds 21 and 22). As illustrated in FIGS. 18 to 22, the first mold 21 is provided with many vacuum suction holes 21a, and is configured in such a manner as to be capable of shaping the foamed resin sheet 23 into a shape along a cavity 21b of the first mold 21 by vacuum suction. Moreover, as illustrated in FIGS. 16 and 18 to 22, a pinch-off portion 21d is provided in such a manner as to surround the cavity 21b. As illustrated in FIGS. 18 to 22, the second mold 22 is provided with may vacuum suction holes 22a, and is configured in such a manner as to be capable of shaping the foamed resin sheet 23 into a shape along a cavity 22b of the second mold 22 by vacuum suction. As illustrated in FIGS. 17 to 22, a pinch-off portion 22d is provided in such a manner as to surround the cavity 22b.

In the embodiment, the second mold 22 is provided with an insert member placement spot 22e where the insert member 42 can be inserted. As an example, it is assumed here that the number of the insert member placement spots 22e is one. Instead of this, a plurality of the insert member placement spots 22e may be provided to allow placing a plurality of the insert members 42. Please note here that the insert member 42 is placed above the middle of the second mold 22. Generally, there is a tendency that the resin temperature is higher on the upper side of the mold than on the lower side. In other words, such a placement improves the spread of the resin when the insert member 42 is buried in the molded foam 43. Moreover, consequently, the pull-out strength of the insert member 42 is further increased. Furthermore, a protrusion 22f is provided around the insert member placement spot 22e of the second mold 22. When the molds 21 and 22 are clamped together, the protrusion 22f compresses the foamed resin around the insert member 42. This is described in detail below.

3. Method for Manufacturing Integrally-Molded Body 41

The method for manufacturing the integrally-molded body 41 according to the embodiment is described here, using FIGS. 18 to 22. The method of the embodiment includes an inserting step, a placement step, and an expansion step. The details are described below.

3.1 Inserting Step

Figure 18:
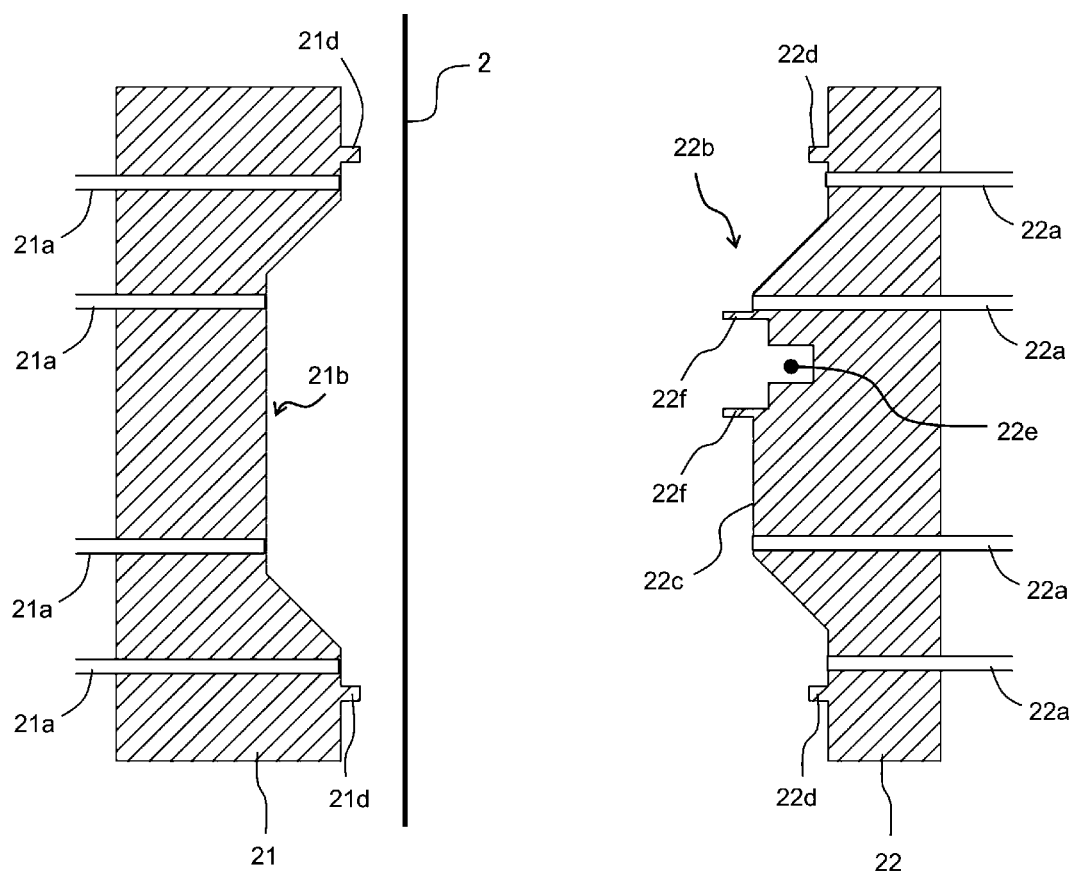
FIG. 18 is an end view illustrating a cross section Q of FIG. 17 of the first and second molds 21 and 22.
Figure 19:
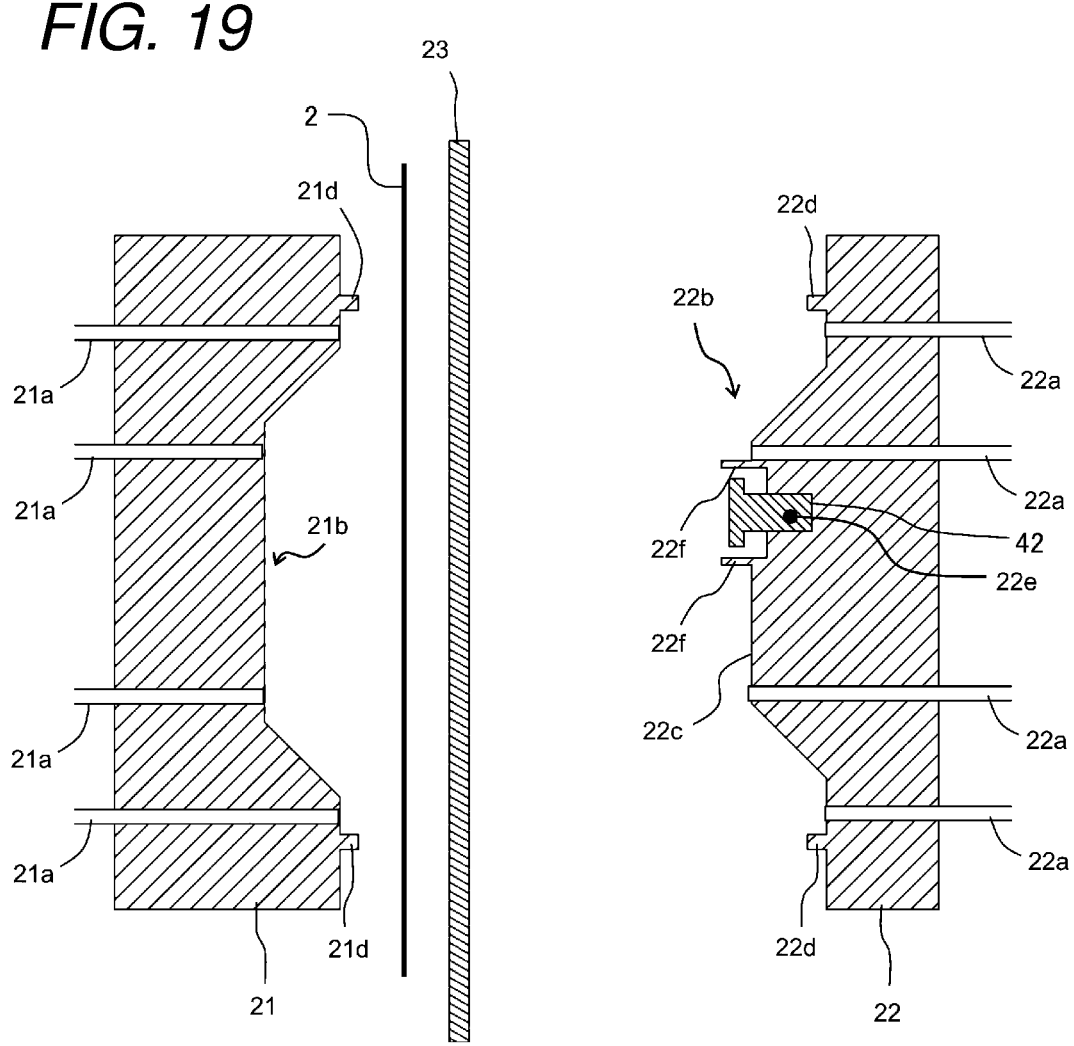
FIG. 19 is an end view illustrating a state where the insert member 42 is placed and a foamed resin sheet 23 is being drooped, after the state of FIG. 18.

In this step, the premolded insert member 42 is placed in the insert member placement spot 22e in the second mold 22 with the open molds 21 and 22 illustrated in FIG. 18 (FIG. 19). It is assumed here that a skin member 2 is caused to droop in advance between the molds 21 and 22. A method for inserting into the second mold 22 may be, for example, a method using a robot in addition to a method of attachment with a human hand.

3.2 Placement Step

In this step, as illustrated in FIG. 19, one foamed resin sheet 23 formed by extruding the molten foamed resin through the slit of the T-die 18 and drooping the foamed resin is placed on the mold 22 side with respect to the skin member 2 between the molds 21 and 22. In other words, the skin member 2, the foamed resin sheet 23, and the insert member 42 are in a state of being arranged parallel in this order between the mold 21 and the mold 22. In the embodiment, direct vacuum molding where the foamed resin sheet 23 extruded through the T-die 18 is used as it is performed. Hence, the foamed resin sheet 23 is not cooled to a room temperature and hardened before molding and the hardened foamed resin sheet 23 is not heated before molding, either. Moreover, the entire foamed resin sheet 23 of the embodiment is at a substantially uniform temperature immediately after being extruded through the slit. The foamed resin sheet 23 is gradually cooled from the surface by the air while being drooped. The influence of the cooling by the air is increasingly reduced toward the middle of the foamed resin sheet 23 in a thickness direction thereof. Hence, the foamed resin sheet 23 of the embodiment has the properties that the temperature increases and the viscosity reduces toward the middle in the thickness direction. The thickness of the foamed resin sheet 23 is not especially limited. The thickness of the foamed resin sheet 23 is, for example, 0.5 to 5.0 mm, preferably, 1.0 to 3.0 mm. Specifically, the thickness is, for example, 0.5, 1.0, 1.5, 2.0, 2.5, 3.0, 3.5, 4.0, 4.5, or 5.0 mm. The thickness may be within a range between any two of the numerical values illustrated here by example.

3.3 Expansion Step

Figure 20:
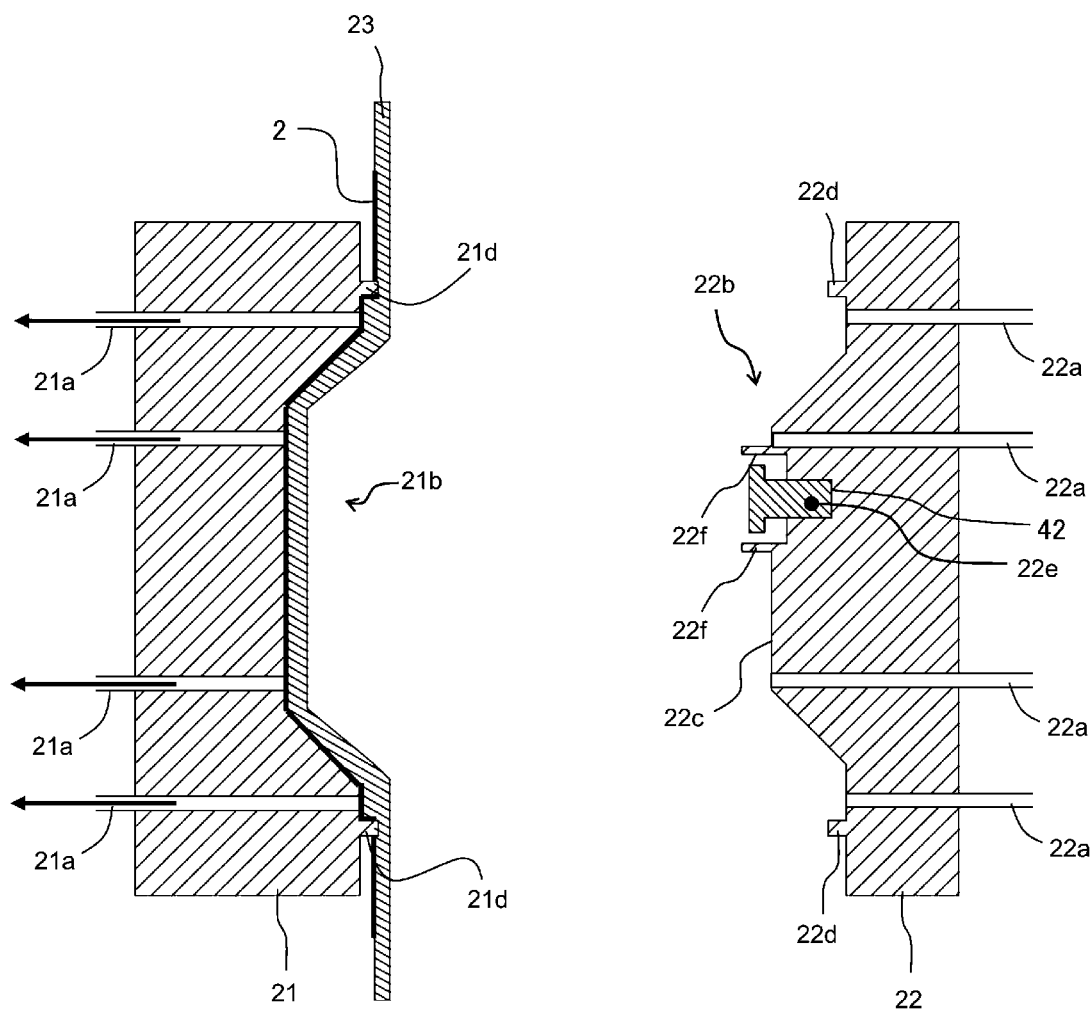
FIG. 20 is an end view illustrating a state where vacuum suction is performed via the vacuum suction holes 21a, after the state of FIG. 19.
Figure 21:
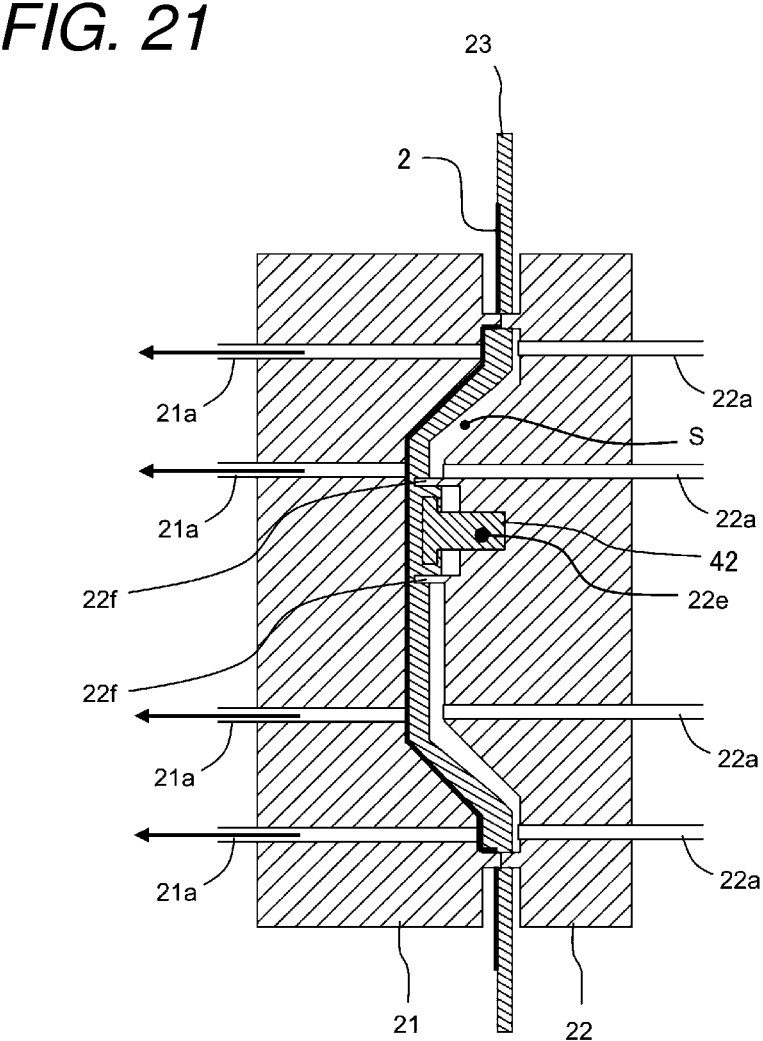
FIG. 21 is an end view illustrating a state where vacuum suction is performed via the vacuum suction holes 21a, after the state of FIG. 20.
Figure 22:
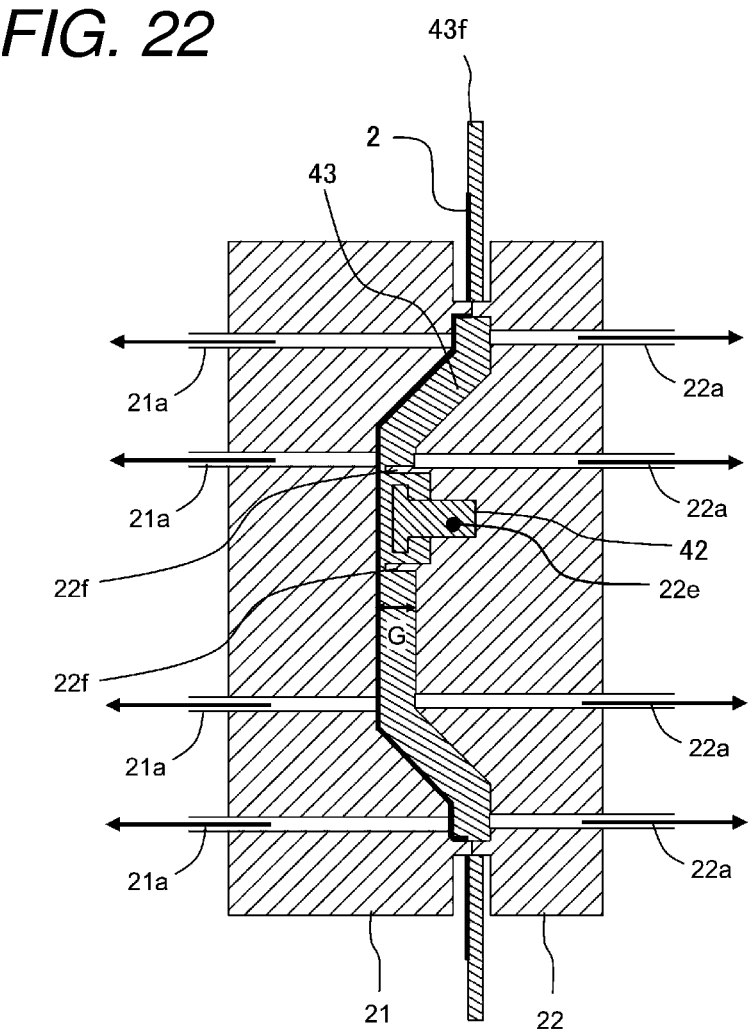
FIG. 22 is an end view illustrating a state where the foamed resin sheet 23 has been expanded to a thickness of a gap G by vacuum suction via the vacuum suction holes 22a, after the state of FIG. 21.

In this step, as illustrated in FIGS. 20 to 22, the foamed resin sheet 23 is vacuum suctioned, using both of the molds 21 and 22, in a state where the molds 21 and 22 are close to each other with a gap G greater than the thickness of the foamed resin sheet 23 between the molds 21 and 22. Consequently, the foamed resin sheet 23 is expanded to the thickness of the gap G. At this point in time, the protrusion 22f presses the foamed resin sheet 23 locally to compress the spot. The spot corresponds to the groove 43e of the molded foam 43. Such compression allows the foamed resin to effectively spread over the extension portion 42b of the insert member 42 placed in the second mold 22. Hence, detachment of the insert member 42 is prevented. As a result of such molding, the first portion 43c is molded thicker than the second portion 43d. Hence, the insert member 42 does not protrude toward the second surface 43b. In other words, the second surface 43b is molded in such a manner that an area corresponding to the insert member 42 (that is, an area of the second surface 43b, which faces a portion of the first surface 43a where the insert member 42 is buried), and its surrounding area are flat. Moreover, as illustrated in FIGS. 20 to 22, in this step, the skin member 2 and the foamed resin sheet 23 are integrated on the mold 21 side. The expansion step is not always required. For example, the foamed resin sheet 23 may be molded in such a manner as to be pressed by the first and second molds 21 and 22 and bury the insert member 42. Especially in such a case, a cylindrical foamed parison instead of the foamed resin sheet 23 may be employed.

In the embodiment, the pinch-off portions 21d and 22d are provided to the molds 21 and 22. When the molds 21 and 22 are brought close to each other until the pinch-off portions 21d and 22d come into contact with each other, a space surrounded by the pinch-off portions 21d and 22d becomes a closed space S. A part of the foamed resin sheet 23 in the closed space S is the molded foam 43. On the other hand, a part of the foamed resin sheet 23 outside the closed space S is a burr 43f.

The cavities 21b and 22b of the molds 21 and 22 are configured in such a manner that the gap G between the molds 21 and 22 is substantially constant all over a part, which becomes the molded foam 43, (that is, the part in the closed space S) of the foamed resin sheet 23. When the foamed resin sheet 23 is vacuum suctioned by the molds 21 and 22 in this state, the foamed resin sheet 23 expands to the thickness of the gap G to form the molded foam 43. The pinch-off portions 21d and 22d are not configurations that are always required. The molds 21 and 22 may be brought close to each other in a non-contact manner in such a manner as to form the gap G between the molds 21 and 22. However, if vacuum suction is performed by the molds 21 and 22 in a state where the pinch-off portions 21d and 22d are in contact with each other and the closed spaced S is formed, the pressure in the closed space S tends to fall. Accordingly, there is an advantage that the foamed resin sheet 23 expands easily.

The thickness of the gap G is not especially limited. The thickness of the gap G is preferably 1.1 to 3.0 times the thickness of the foamed resin sheet 23. Specifically, (the thickness of the gap G)/(the thickness of the foamed resin sheet 23) is, for example, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. (The thickness of the gap G)/(the thickness of the foamed resin sheet 23) may be within a range between any two of the numerical values illustrated here by example.

In vacuum suction by the molds 21 and 22, vacuum suction by the first mold 21 may start first, vacuum suction by the second mold 22 may start first, or vacuum suction by the molds 21 and 22 may start simultaneously. Moreover, vacuum suction by the first mold 21 may stop first, vacuum suction by the second mold 22 may stop first, or vacuum suction by the molds 21 and 22 may stop simultaneously. Vacuum suction by the molds 21 and 22 may start before or after the molds 21 and 22 are brought close to each other.

When the foamed resin sheet 23 is vacuum suctioned by both of the molds 21 and 22, foaming of the foamed resin sheet 23 is promoted to expand the foamed resin sheet 23. The vicinity of the middle in the thickness direction of the foamed resin sheet 23 is lowest in viscosity (highest in fluidity). Hence, foaming in the vicinity of the middle in the thickness direction is especially promoted to expand the foamed resin sheet 23. As a result, the molded foam 43 is obtained which has a configuration where an average cell diameter in a layer in the vicinity of the middle in the thickness direction (a middle layer) is large and an average cell diameter in a surface layer near the surface is small. Such a molded foam 43 has a sandwich structure where the middle layers having the large average cell diameter are sandwiched between the surface layers having the small average cell diameter and, accordingly, is lightweight and highly stiff.

Figure 23:
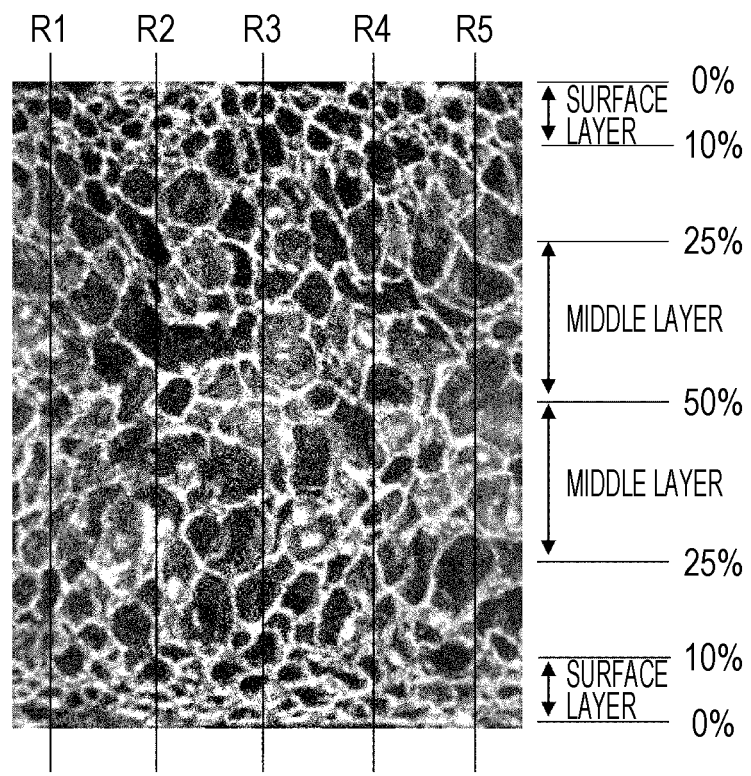
FIG. 23 illustrates a cross-sectional picture of the molded foam 43 obtained in an example of the present invention.

Assuming that in the molded foam 43 obtained by the method of the embodiment, a layer from the surface of the molded foam 43 to a thickness of 10% is the surface layer and a layer from the surface of the molded foam to a thickness of 25 to 50% is the middle layer with reference to the thickness of the molded foam 43, the average cell diameter of the middle layer is greater than the average cell diameter of the surface layer as illustrated in a cross-sectional picture of FIG. 23. The ratio of (the average cell diameter of the middle layer)/(the average cell diameter of the surface layer) is not especially limited, but is, for example, 1.2 to 10. Specifically, the ratio is, for example, 1.2, 1.3, 1.4, 1.5, 1.6, 1.7, 1.8, 1.9, 2.0, 2.5, 3.0, 3.5, 4.0, 4.5, 5.0, 5.5, 6.0, 7.0, 8.0, 9.0, or 10.0. The ratio may be within a range between any two of the numerical values illustrated here by example.

The overall average cell diameter of the molded foam 43 in the thickness direction is, for example, 100 to 2000 μm. Specifically, the average cell diameter is, for example, 100, 200, 300, 400, 500, 600, 700, 800, 900, 1000, 1500, or 2000 μm. The average cell diameter may be within a range between any two of the numerical values illustrated here by example. The average cell diameter of the surface layer is, for example, 80 to 500 μm. Specifically, the average cell diameter is, for example, 80, 100, 150, 200, 250, 300, 350, 400, 450, or 500 μm. The average cell diameter may be within a range between any two of the numerical values illustrated here by example. The average cell diameter of the middle layer is, for example, 100 to 2000 μm. Specifically, the average cell diameter is, for example, 100, 200, 300, 400, 500, 600, 700, 800, 900, 1000, 1100, 1200, 1300, 1400, 1500, 1600, 1700, 1800, 1900, or 2000 μm. The average cell diameter may be within a range between any two of the numerical values illustrated here by example.

Figure 24:
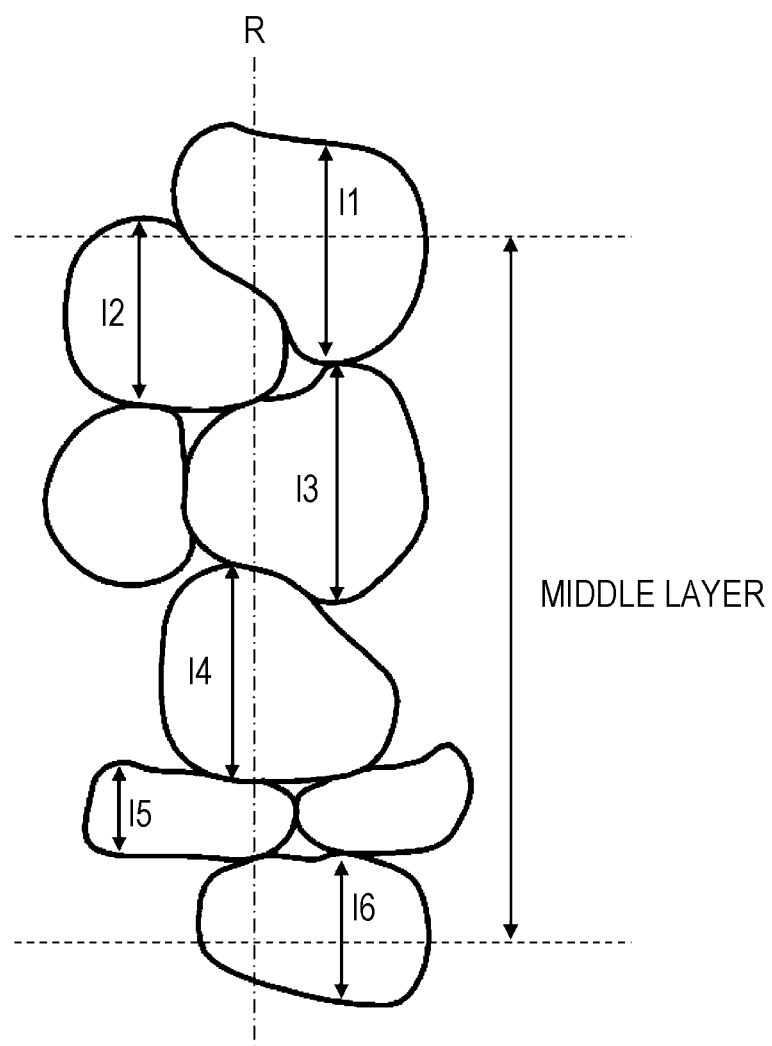
FIG. 24 illustrates an example of the form of cells for explaining a method for calculating a temporary average cell diameter.

The average cell diameter is measured by the following method:

Firstly, a cross-sectional picture of the molded foam 43 is taken at 50-fold magnification as illustrated in FIG. 24.

Next, five reference lines R1 to R5 extending in the thickness direction are drawn on the cross-sectional picture. The spacing between the reference lines is set at 500 μm.

The number of cells through which the reference line passes in a measurement target layer (the surface layer, the middle layer, or over the thickness direction) is counted for each reference line.

The maximum length in the thickness direction (the length at a part having the maximum length in the thickness direction) is measured for each cell.

A temporary average cell diameter is calculated in accordance with equation 1 for each reference line. Furthermore, the arithmetic mean of the temporary average cell diameters calculated for the reference lines is taken to calculate an average cell diameter.

A temporary average cell diameter=the total of the maximum lengths of all the cells counted/the count of the cells (Equation 1)

For example, in the example of FIG. 24, the number of cells through which the reference line R passes is six in the middle layer. The maximum lengths of the cells in the thickness direction are 11 to 16. Hence, in this example, a temporary average cell diameter of the middle layer is calculated from (11+12+13+14+15+16)/6.

The expansion step is preferably performed by executing a first suction step, a mold approaching step, and a second suction step in this order. In the first suction step, the foamed resin sheet 23 is vacuum suctioned by the first mold 21 as illustrated in FIG. 20 to shape the foamed resin sheet 23 into the shape along the cavity 21b of the first mold 21. In the mold approaching step, the molds 21 and 22 are brought close to each other in such as manner as to provide the gap G between the molds 21 and 22 as illustrated in FIG. 21. In the second suction step, the foamed resin sheet 23 is vacuum suctioned by the molds 21 and 22 as illustrated in FIG. 22 to expand the foamed resin sheet 23 to the thickness of the gap G.

When vacuum suction by the molds 21 and 22 starts after the molds 21 and 22 are brought close to each other, the foamed resin sheet 23 results in coming into contact with a protrusion 22c of the mold 22 before being shaped. The temperatures of the molds 21 and 22 are normally lower than the temperature of the foamed resin sheet 23. Hence, if the foamed resin sheet 23 comes into contact with the protrusion 22c of the mold 22, the foamed resin sheet 23 is cooled to increase the viscosity and deteriorate the following characteristics to the cavities 21b and 22b of the molds 21 and 22. On the other hand, if the first suction step, the mold approaching step, and the second suction step are executed in this order to perform the expansion step, the contact of the foamed resin sheet 23 with the molds 21 and 22 before the foamed resin sheet 23 is shaped into the shape along the cavity 21b of the first mold 21 is reduced to a minimum. Hence, an increase in the viscosity of the foamed resin sheet 23 is prevented, and accordingly it is possible to cause the foamed resin sheet 23 to follow the cavities of the molds 21 and 22 with high accuracy.

3.4 Finishing Step

After the expansion step, the molds 21 and 22 are opened. The molded foam 43 with the burr 43f is taken out. The burr 43f is removed. Accordingly, the molded foam 43 is obtained. The insert member 42 is buried in such a molded foam 43. In other words, a desired integrally-molded body 41 can be obtained.

4. Conclusion

The integrally-molded body 41 according to the embodiment can exert the following effects:

(1) A foamed resin is used as the material of the base. Hence, a product that is lighter than a solid molded body can be produced. Moreover, since the base is the foamed resin, the thickness can be increased by vacuum shaping as described above. At this point in time, it is simply that the diameter of an internal cell is increased. When insert molding is performed, even if the thickness of the product is increased to a level where an uneven geometry does not appear, it is hardly required to change the weight of the product.

(2) It is assumed that the pull-out strength of the insert member is reduced in the foamed resin as compared to a known solid resin. Hence, the vicinity of the spot where the insert member 42 is buried is compressed (a compressed portion 23e and the groove 43e) to allow an improvement in the spread of the resin around the insert member 42 and an increase in pull-out strength.

As described above, according to the embodiment, it is possible to manufacture the integrally-molded body 41 that is high in both of practicality and design quality, in which the uneven geometry of an attaching portion for the insert member 42 does not appear on the second surface 43b (the design surface) side, and the integrally-molded body 41 is lightweight even when the molded foam 43 (the base) is thick.

Third Embodiment

In a method in which a molten thermoplastic resin sheet extruded through a T-die is placed in a mold, the resin sheet is pressed against a cavity of the mold, and a resin molded article is molded, the resin sheet drooping in front of the mold may become wavy. Especially, if the resin sheet is a foamed resin sheet, the degree of waviness is noticeable. As a result, the quality of a molded body obtained by molding the resin sheet may be reduced.

The embodiment has been made considering such circumstances. The embodiment provides a method for manufacturing a molded body that can reduce the waviness of a resin sheet.

According to the embodiment, the following method for manufacturing a molded body is provided. The method includes a drooping step, a tension application step, and a shaping step. In the drooping step, a resin sheet is caused to droop on a front side of a mold. In the tension application step, tension is applied to the resin sheet. In the shaping step, the resin sheet is shaped into a shape along an inner surface of a cavity provided to the mold with the resin sheet under tension.

In the manufacturing method of the embodiment, the tension application step of applying tension to a resin sheet is performed to enable a reduction in the waviness of the resin sheet.

Various embodiments of the present invention are illustrated by example below. The embodiments illustrated below can be combined with one another.

It is preferable that the tension be applied to the resin sheet widthwise.

It is preferable that the tension be applied by an expander, the expander include a pair of holding units, and the pair of holding units holding each of the skin sheet and the resin sheet at both ends widthwise and increasing a distance between the pair of holding units allow the tension to be applied to the resin sheet.

It is preferable that a suction step be included before the shaping step. In the suction step, the resin sheet drooping on the front side of the mold is suctioned by an outer frame placed along a peripheral surface of the mold. In the shaping step, the resin sheet is vacuum suctioned by the mold.

It is preferable that the suction step be performed after the tension application step.

It is preferable that the outer frame include a frame upper portion and a frame lower portion.

It is preferable that each of the frame upper portion and the frame lower portion be placed in such a manner as to be within 50% of a length of the mold in an up-and-down direction from an upper end and a lower end of the mold in the up-and-down direction.

It is preferable that each of the frame upper portion and the frame lower portion have a flat plate shape.

It is preferable that the resin sheet be a foamed resin sheet.

The embodiment is described below. Various feature matters illustrated in the embodiment illustrated below can be combined with one another. Moreover, each feature matter establishes itself as the invention independently.

1. Configuration of Molding Machine 300

Figure 25:
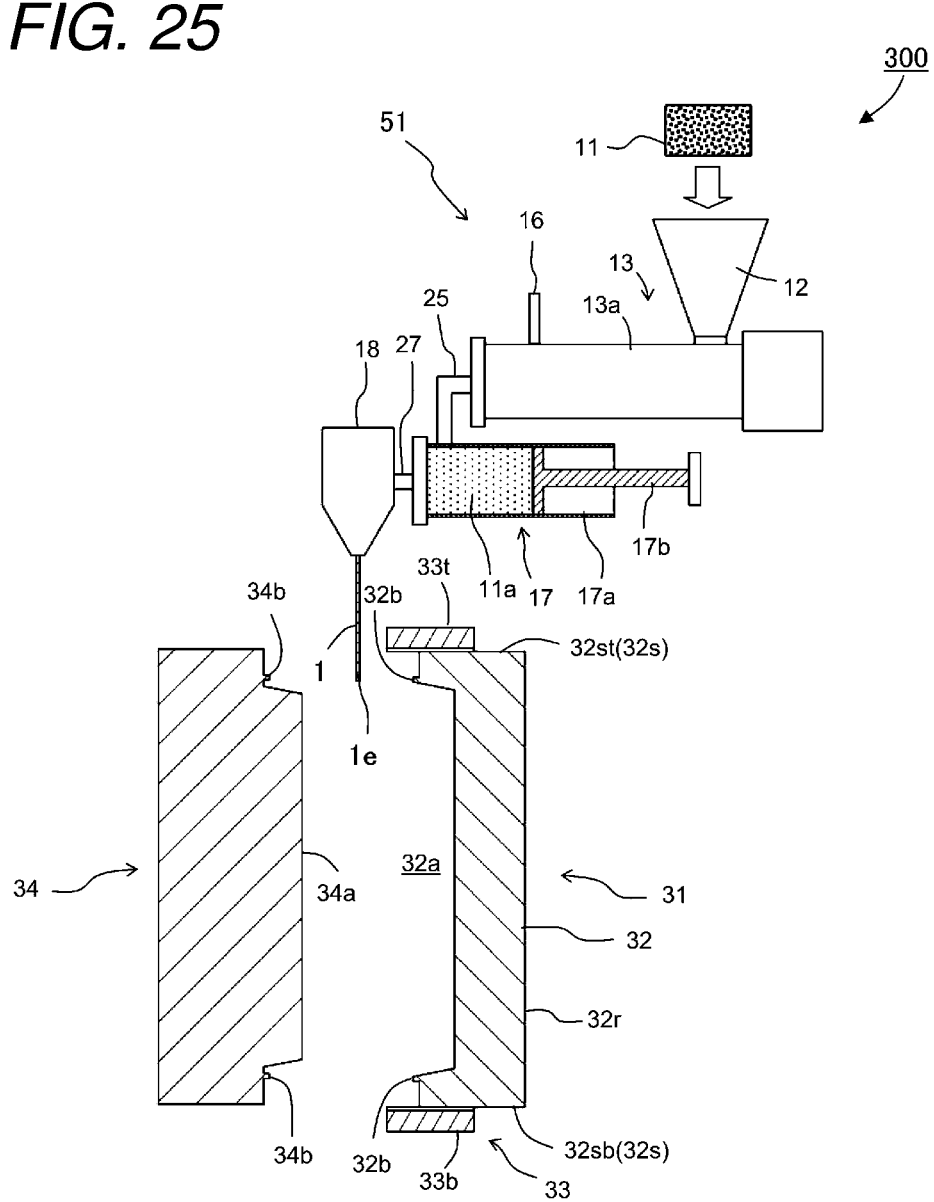
FIG. 25 illustrates an example of a molding machine 300 that can be used in a method for manufacturing a molded body according to one embodiment of the present invention, and a mold apparatus 31 is a cross-sectional end view along X-X in FIG. 26.
Figure 26:
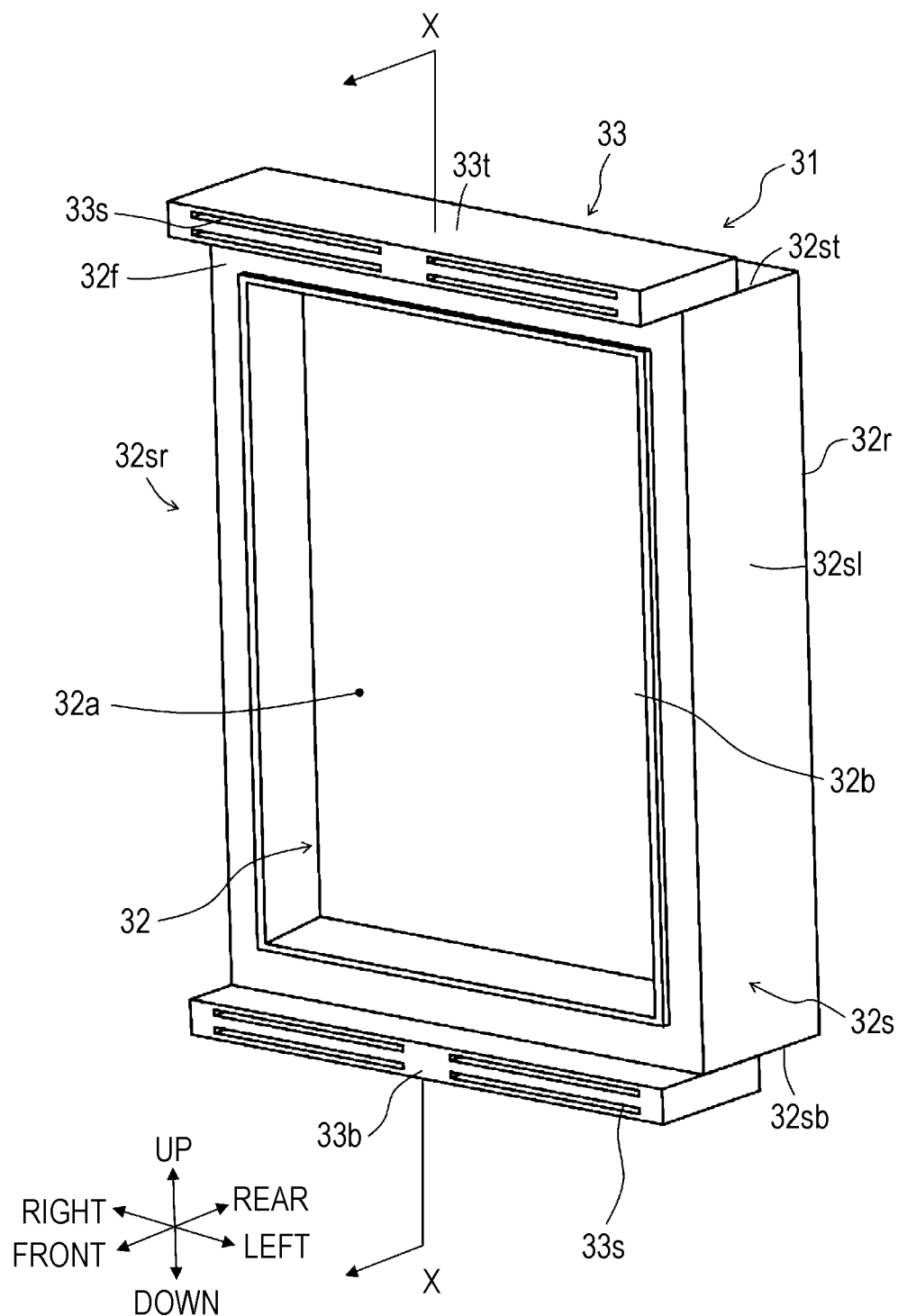
FIG. 26 is a perspective view of the mold apparatus 31 in FIG. 25.
Figure 27:
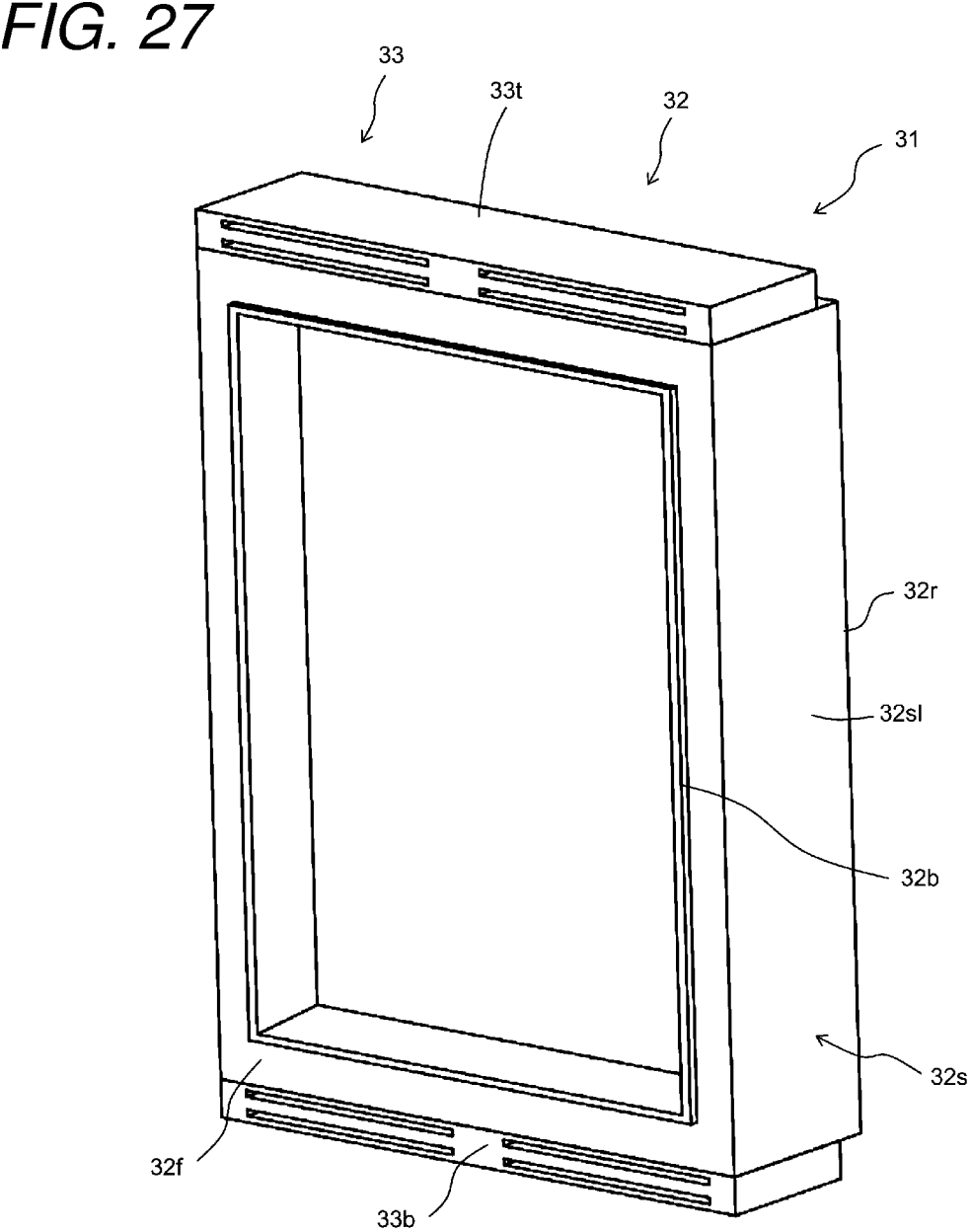
FIG. 27 is a perspective view of the mold apparatus 31 in a state where an outer frame 33 has been moved backward.

Firstly, a molding machine 300 that can be used to carry out a method for manufacturing a molded body according to one embodiment of the present invention is described, using FIGS. 25 to 27. The molding machine 300 includes a resin sheet forming apparatus 51 and a mold apparatus 31. The resin sheet forming apparatus 51 includes a hopper 12, an extruder 13, an injector 16, an accumulator 17, and a T-die 18. The extruder 13 and the accumulator 17 are connected via a connecting pipe 25. The accumulator 17 and the T-die 18 are connected via a connecting pipe 27.

Each configuration is described in detail below.

<Hopper 12, Extruder 13>

The hopper 12 is used to charge raw resin 11 into a cylinder 13a of the extruder 13. The form of the raw resin 11 is not especially limited, but is normally a pellet. The raw resin is, for example, a thermoplastic resin such as polyolefin. Examples of polyolefin include low-density polyethylene, liner low-density polyethylene, high-density polyethylene, polypropylene, ethylene-propylene copolymer, and a mixture thereof. The raw resin 11 is charged into the cylinder 13a from the hopper 12 and then heated in the cylinder 13a. Accordingly, the raw resin 11 melts into molten resin. Moreover, the molten resin is carried to a distal end of the cylinder 13a with the rotation of a screw placed in the cylinder 13a. The screw is placed in the cylinder 13a, and the rotation of the screw allows carrying the molten resin while mixing the molten resin. A gear apparatus is provided at a base end of the screw. The gear apparatus drives and rotates the screw. The number of screws placed in the cylinder 13a may be one or more.

<Injector 16>

The cylinder 13a is provided with the injector 16 for injecting a foaming agent into the cylinder 13a. If the raw resin 11 is not foamed, the injector 16 can be omitted. Examples of the foaming agent that is injected from the injector 16 include a physical foaming agent, a chemical foaming agent, and a mixture thereof. The foaming agent is preferably a physical foaming agent. Inorganic foaming agents such as air, carbonic acid gas, nitrogen gas, and water, organic foaming agents such as butane, pentane, hexane, dichloromethane, and dichloroethane, and supercritical fluids thereof can be used as the physical foaming agent.

The supercritical fluid is preferably produced using carbon dioxide, nitrogen, or the like. Nitrogen is increased to or above a critical temperature of −149.1° C. and a critical pressure of 3.4 MPa to obtain a supercritical fluid. Carbon dioxide is increased to or above a critical temperature of 31° C. and a critical pressure of 7.4 MPa to obtain a supercritical fluid. Examples of the chemical foaming agent include one that generates carbonic acid gas by a chemical reaction of an acid (for example, a citric acid or a salt thereof) and a base (for example, sodium bicarbonate). The chemical foaming agent may be charged from the hopper 12 instead of being injected from the injector 16.

<Accumulator 17, T-Die 18)>

A molten resin 11a to which the foaming agent has been added, or a molten resin 11a to which the foaming agent has not been added, is extruded through a resin extrusion port of the cylinder 13a, and is injected into the accumulator 17 via the connecting pipe 25. The accumulator 17 includes a cylinder 17a and a piston 17b that can slide in the cylinder 17a. The molten resin 11a can be stored in the cylinder 17a. After a predetermined amount of the molten resin 11a is stored in the cylinder 17a, the piston 17b is moved to extrude the molten resin 11a through a slit provided in the T-die 18 via the connecting pipe 27 and droop the molten resin 11a. Consequently, a molten resin sheet 1 is formed.

<Mold Apparatus 31>

As illustrated in FIGS. 26 and 27, the mold apparatus 31 includes a mold 32 for molding the resin sheet 1, and an outer frame 33 that is configured in such a manner as to be movable along a peripheral surface 32s of the mold 32. The outer frame 33 is configured in such a manner as to be movable by a cylinder mechanism or the like.

The mold 32 is substantially cuboid, and includes a front surface 32f, a rear surface 32r, and the peripheral surface 32s between them. The front surface 32f is a surface facing the resin sheet 1. The rear surface 32r is a surface opposite to the front surface 32f. The peripheral surface 32s includes a top surface 32st, a bottom surface 32sb, a right side surface 32sr, and a left side surface 32sl. The top surface 32st and the bottom surface 32sb face each other, and the right side surface 32sr and the left side surface 32sl face each other.

The mold 32 has a cavity 32a. A pinch-off portion 32b is provided in such a manner as to surround the cavity 32a. Vacuum suction holes (not illustrated) are provided in the cavity 32a. It is configured in such a manner that the resin sheet 1 is vacuum suctioned through the vacuum suction holes and accordingly can be shaped into a shape along an inner surface of the cavity 32a of the mold 32. The vacuum suction holes are ultrasmall holes. An end of the vacuum suction hole communicates with the inner surface of the cavity 32a through the inside of the mold 32, and the other end is connected to a decompression apparatus.

The outer frame 33 includes a frame upper portion 33t and a frame lower portion 33b. In the embodiment, each of the frame upper portion 33t and the frame lower portion 33b has a flat plate shape. The outer frame 33 is provided with a groove-shaped vacuum suction hole 33s. The vacuum suction hole 33s is connected to the decompression apparatus. The vacuum suction hole 33s is configured in such a manner as to allow the outer frame 33 to suction the resin sheet 1 by vacuum suction.

The frame upper portion 33t and the frame lower portion 33b are placed on upper and lower sides of the mold 32, respectively, and are configured in such a manner as to be movable independently. In other words, the frame upper portion 33t and the frame lower portion 33b are placed along the top surface 32st and the bottom surface 32sb of the mold 32, respectively, and are configured in such a manner as to be movable parallel along each surface.

The resin sheet 1 is sandwiched and pressed between the mold apparatus 31 and a press mold 34 as illustrated in FIG. 25. The press mold 34 has a pinch-off portion 34b corresponding to the pinch-off portion 32b of the mold apparatus 31. Moreover, the press mold 34 has a pressing portion 34a corresponding to the cavity 32a. The resin sheet 1 is charged into a space formed by the cavity 32a and the pressing portion 34a.

2. Method for Manufacturing Molded Body

A method for manufacturing a molded body according to one embodiment of the present invention is described here, using FIGS. 25 to 41. The method of the embodiment includes a drooping step, a tension application step, a suction step, a shaping step, and a clamping step. The details are described below.

2-1. Drooping Step

Figure 28:
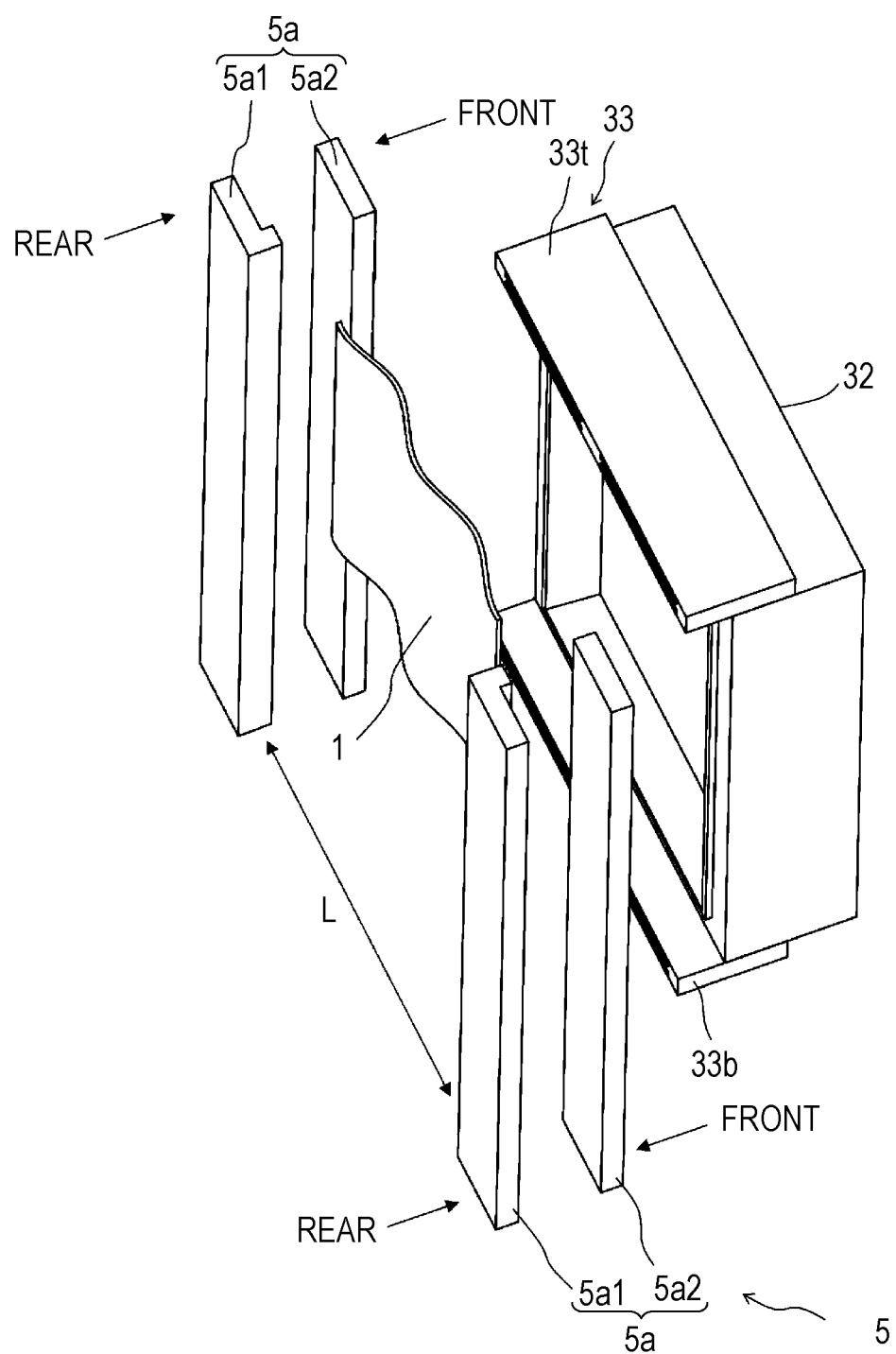
FIG. 28 is a front perspective view illustrating a state where the resin sheet 1 is being drooped on a front side of the mold apparatus 31 and the outer frame 33.
Figure 29:
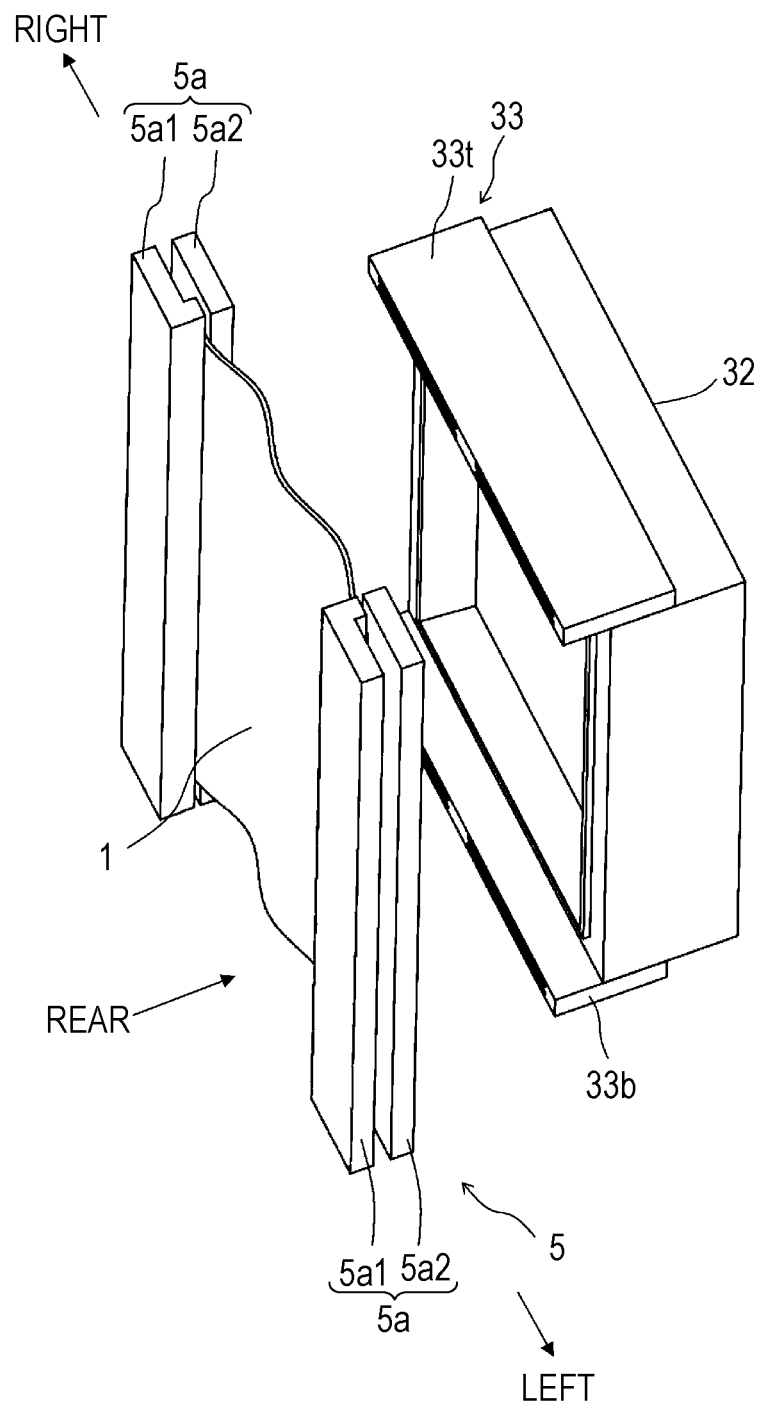
FIG. 29 is a front perspective view illustrating a state where a lower end of the resin sheet 1 has reached below a frame lower portion 33b and the resin sheet 1 is being held by the expander 5.
Figure 30:
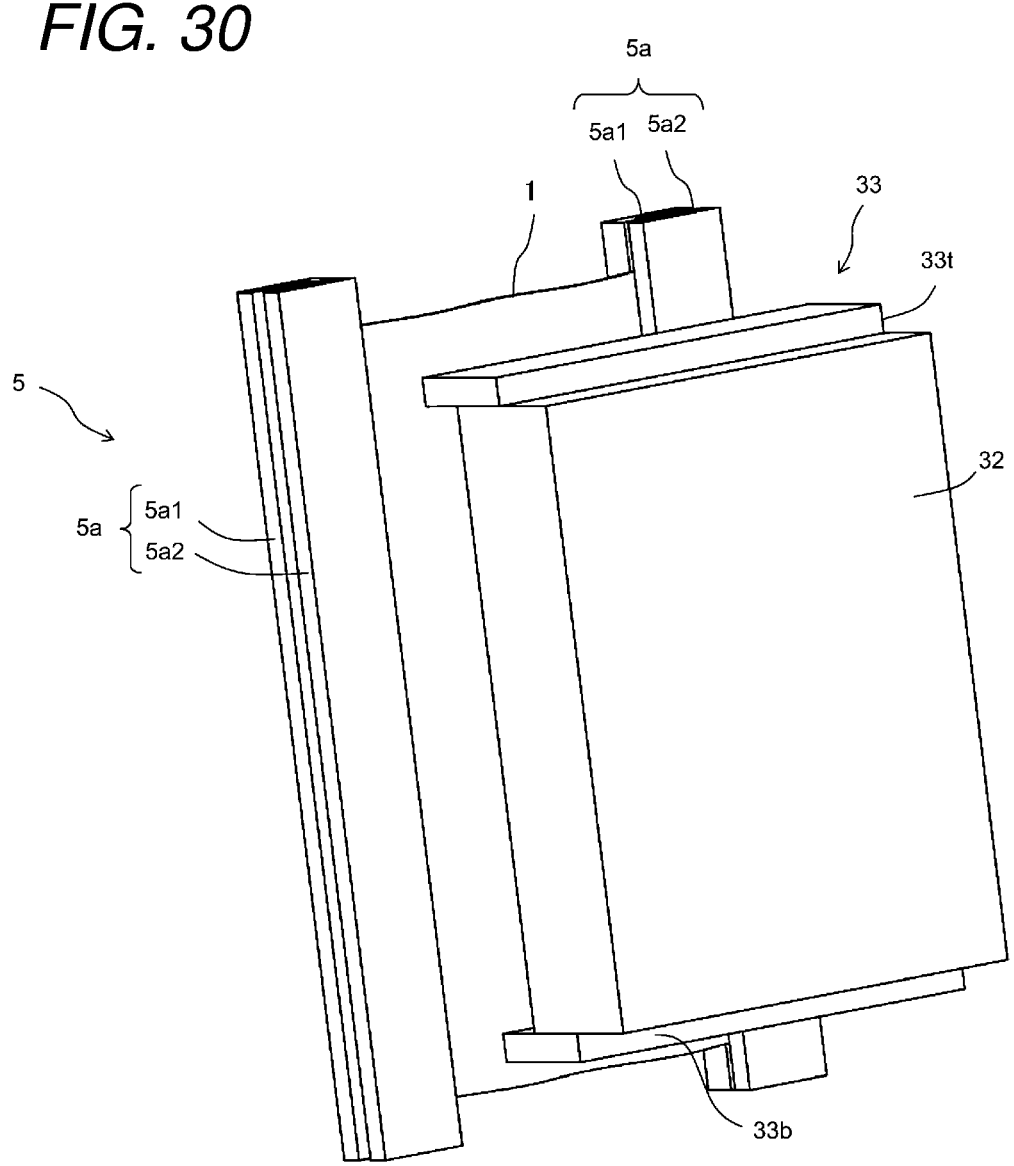
FIG. 30 is a rear perspective view of the state illustrated in FIG. 29.

In the drooping step, the resin sheet 1 is caused to droop on a front side of the mold 32 as illustrated in FIG. 25. At this point in time, the outer frame 33 is in an advanced state. Here, the resin sheet 1 is formed by extruding molten resin through a slit provided in the T-die 18 and drooping the molten resin. As illustrated in FIGS. 28 to 30, the resin sheet 1 is normally wavy. In order to solve this, an expander 5 is provided to apply tension to the resin sheet 1 on the front side of the mold 32 and the outer frame 33 as illustrated in FIG. 28. The expander 5 includes a pair of holding units 5a. Each holding unit 5a includes holding portions 5a1 and 5a2. It is configured in such a manner that the resin sheet 1 can be held between the holding portions 5a1 and 5a2 as illustrated in FIG. 29. Moreover, the pair of holding units 5a is configured in such a manner as to be capable of changing a distance L between them. The distance L is increased in a state where the pair of holding units 5a is holding the resin sheet 1 at both ends widthwise to allow applying tension to the resin sheet 1 widthwise. Moreover, the expander 5 can move forward, backward, left, and right relatively to the mold 32. It is configured in such a manner that the expander 5 moves relatively toward the mold 32 and accordingly the resin sheet 1 can be pressed against front surfaces of the pinch-off portion 32b of the mold 32 and the outer frame 33.

2-2. Tension Application Step

Figure 31:
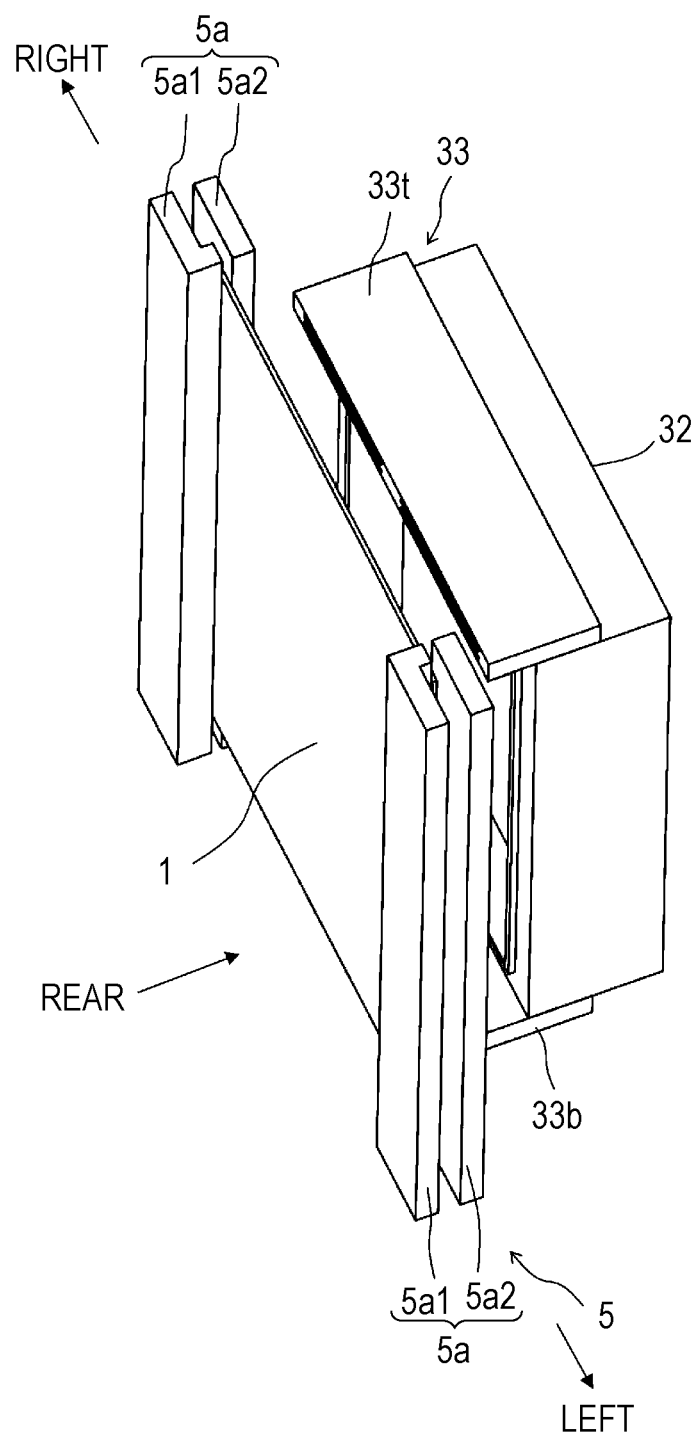
FIG. 31 is a front perspective view representing a step of applying tension.
Figure 32:
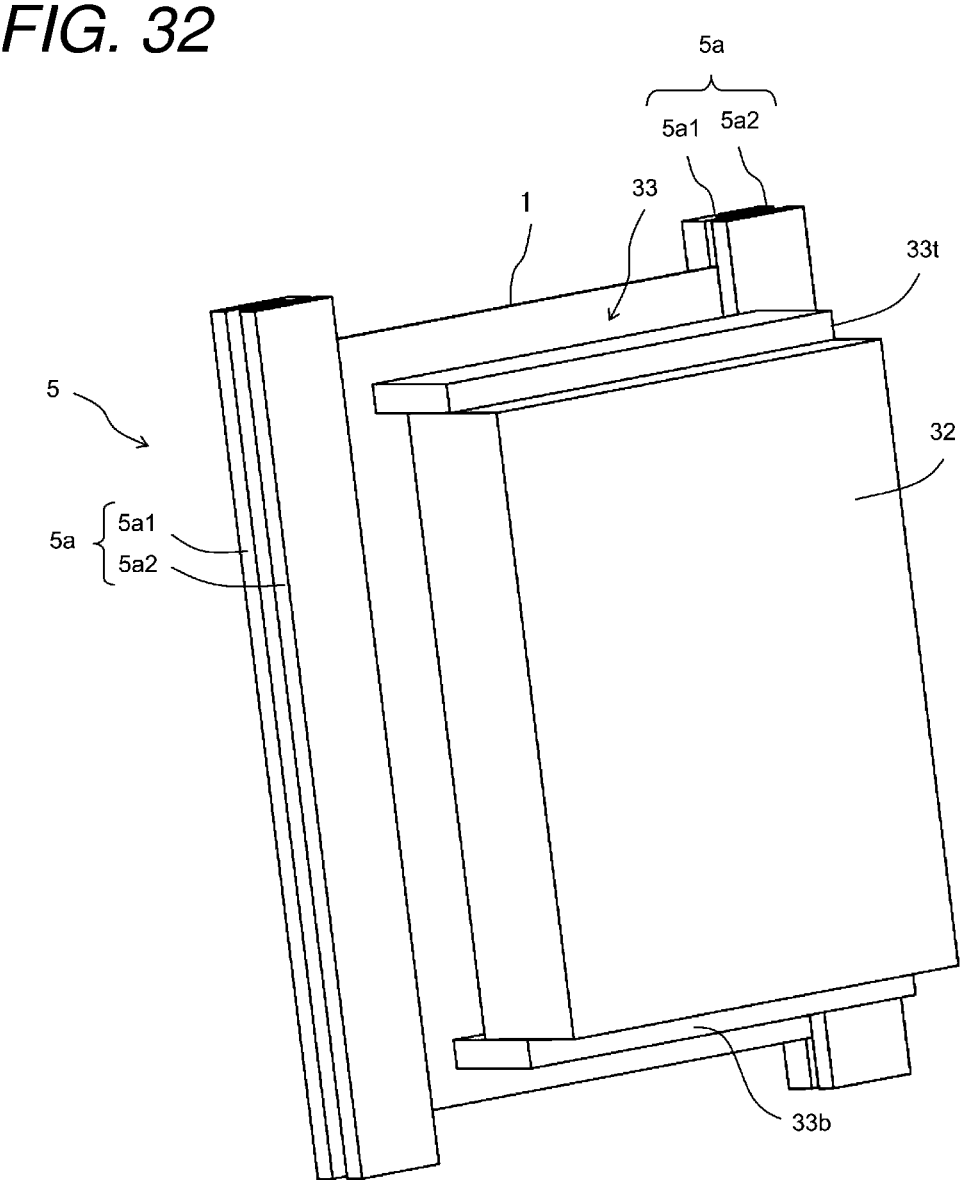
FIG. 32 is a rear perspective view of the state illustrated in FIG. 31.
Figure 33:
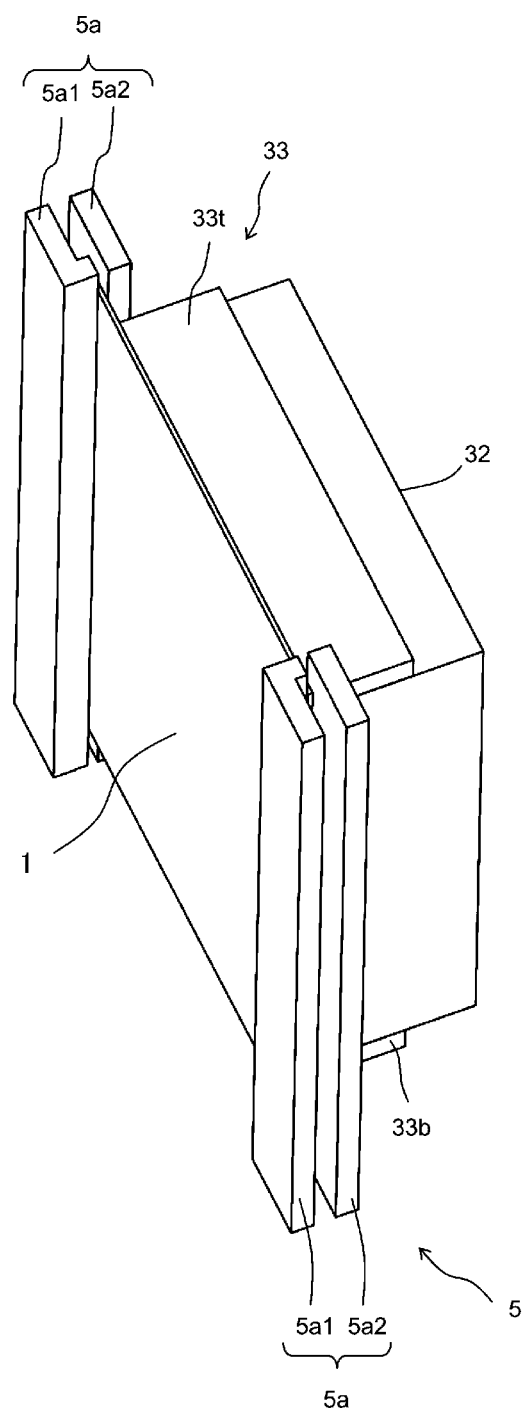
FIG. 33 is a front perspective view illustrating a state where the resin sheet 1 is in contact with the outer frame 33.
Figure 34:
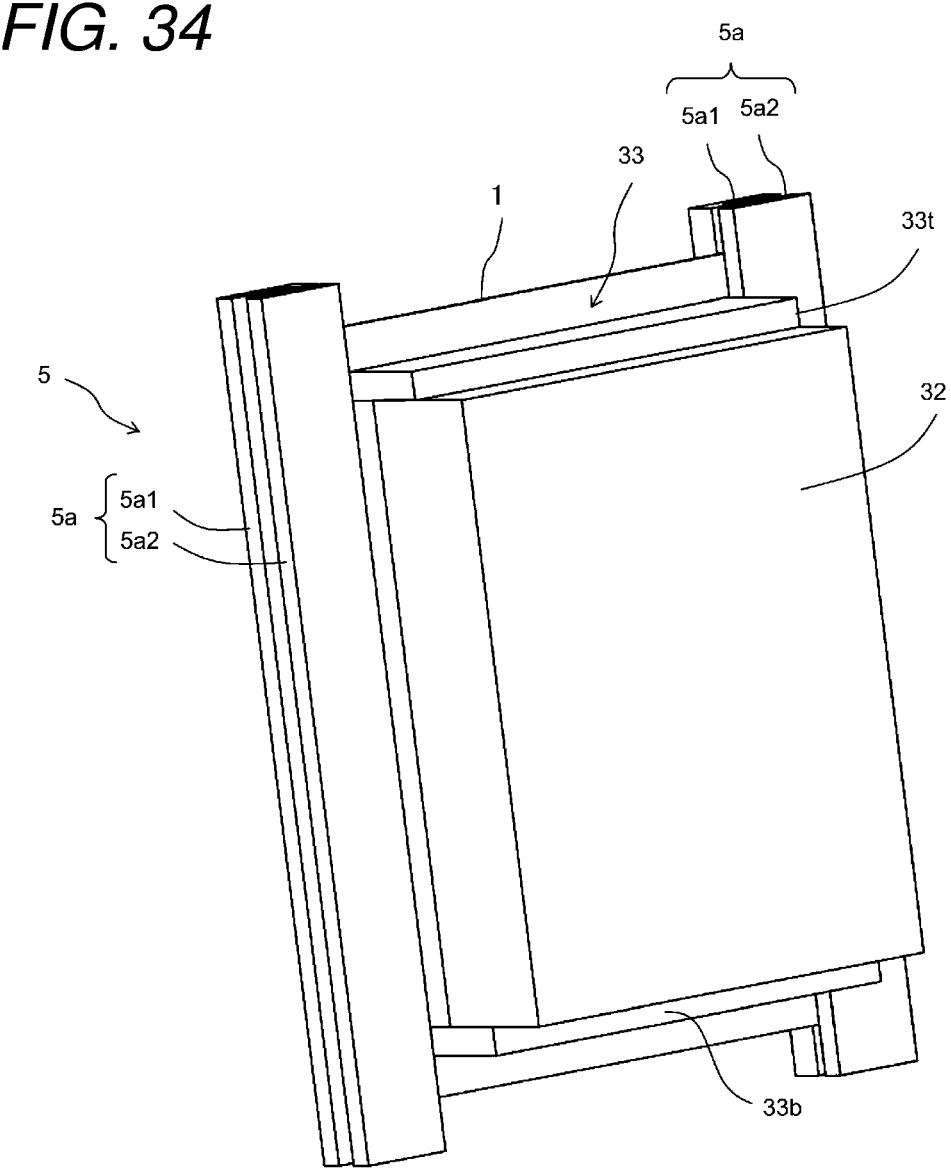
FIG. 34 is a rear perspective view of the state illustrated in FIG. 33.

Next, in the tension application step, tension is applied to the resin sheet 1. Specifically, as illustrated in FIGS. 29 and 30, after a lower end 1e of the resin sheet 1 reaches below the frame lower portion 33b, the distance L between the pair of holding units 5a is reduced to hold the resin sheet 1 with the holding portions 5a1 and 5a2. In the resin sheet holding step, the resin sheet 1 on the front side of the mold 32 and the outer frame 33 is sandwiched at each end portion widthwise between the holding portions 5a1 and 5a2 to hold the resin sheet 1. As illustrated in FIGS. 31 and 32, the expander 5 is moved backward while the pair of holding units 5a is moved left and right. Accordingly, the waviness of the resin sheet 1 is reduced. If the resin sheet 1 is a foamed resin sheet, the degree of waviness is noticeable. Hence, the technical significance of applying tension to the resin sheet 1 widthwise becomes remarkable. As illustrated in FIGS. 33 and 34, the expander 5 is moved forward to bring the resin sheet 1 into contact with the front surface of the outer frame 33.

2-3. Suction Step

In the suction step, the resin sheet 1 drooping on the front side of the mold 32 is suctioned by the outer frame 33 placed along the peripheral surface of the mold 32.

Figure 35:
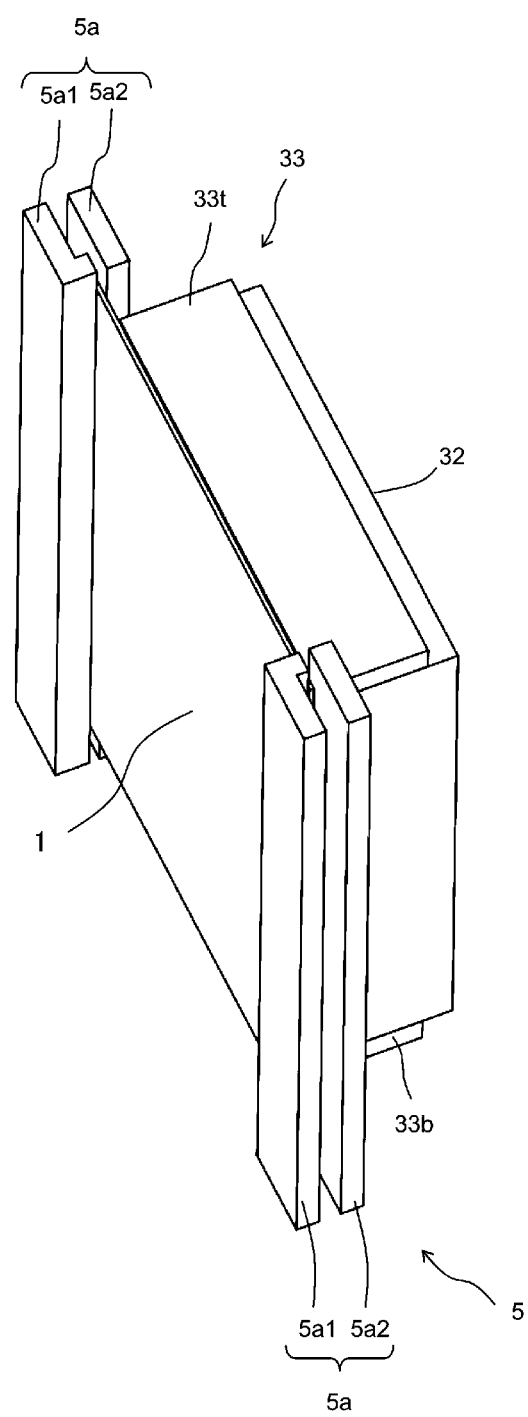
FIG. 35 is a diagram representing a state where while the resin sheet 1 is being suctioned by the outer frame 33, the outer frame 33 has been moved backward from the state of FIG. 33 and the resin sheet 1 is in contact with a mold 32.
Figure 36:
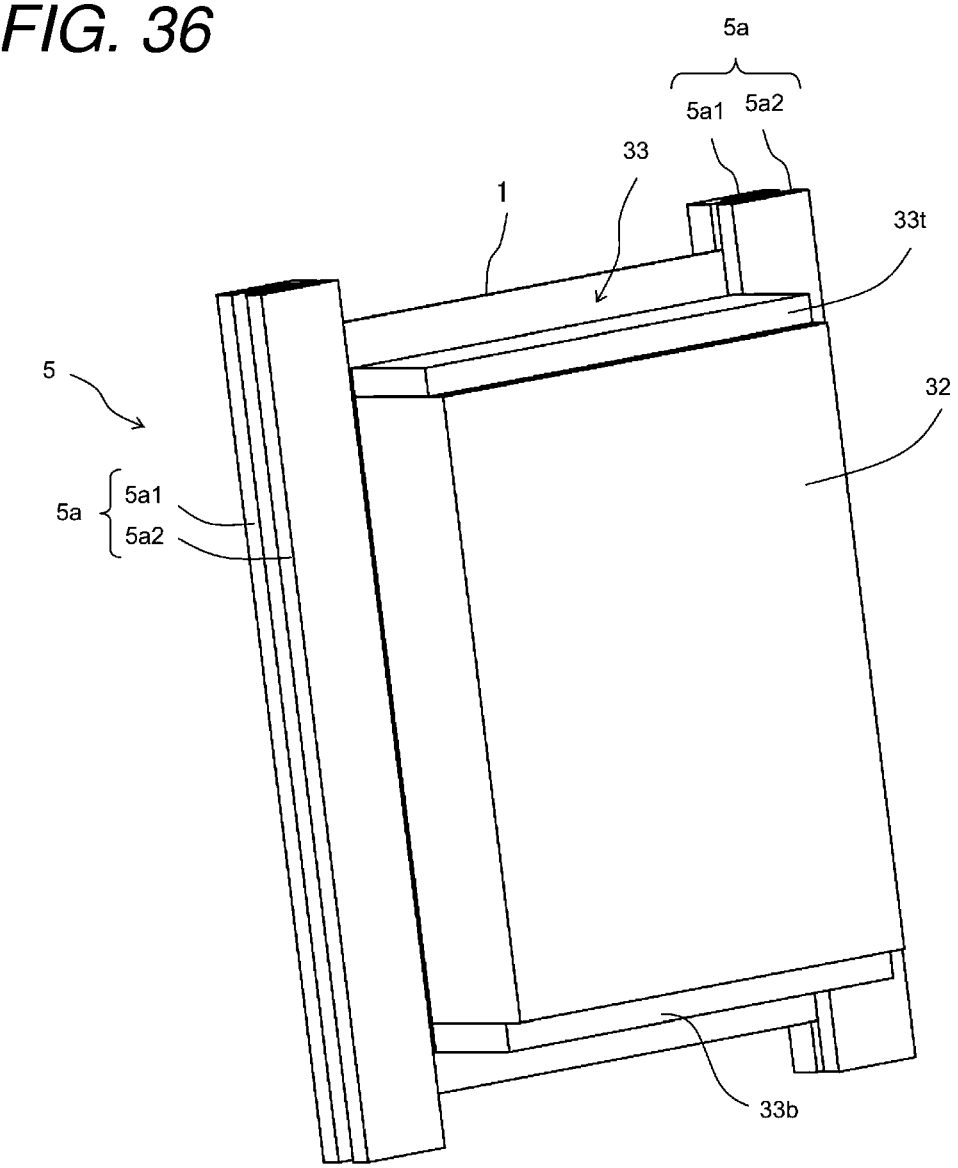
FIG. 36 is a rear perspective view of the state illustrated in FIG. 35.

Specifically, the decompression apparatus connected to the vacuum suction hole 33s of the outer frame 33 is operated in the state where the outer frame 33 is in contact with the resin sheet 1 to suction the resin sheet 1 to the outer frame 33. In the embodiment, as illustrated in FIGS. 35 and 36, the outer frame 33 is moved backward to a position where the front surface of the outer frame 33 is flush with the front surface of the mold 32, in the state where the resin sheet 1 is being suctioned by the outer frame 33. The outer frame 33 performs suction while moving backward. Accordingly, upper and lower portions of the resin sheet 1 can be pressed against upper and lower portions of the front surface 32f of the mold 32. Here, the timing when the outer frame 33 is moved backward is not especially limited. Immediately after the resin sheet 1 comes into contact with the front surface of the outer frame 33, or with a little time lag behind when the resin sheet 1 comes into contact with the front surface of the outer frame 33, the outer frame 33 may start moving backward.

Figure 37:
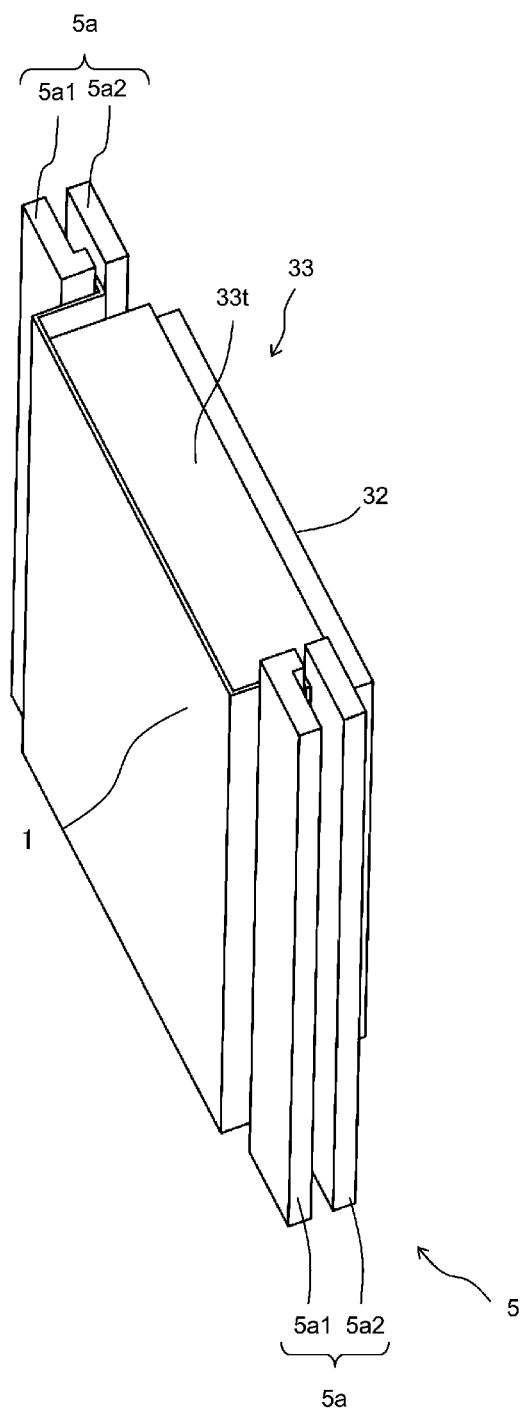
FIG. 37 is a front perspective view representing a state where the expander 5 has been moved forward to side surfaces of the mold 32.
Figure 38:
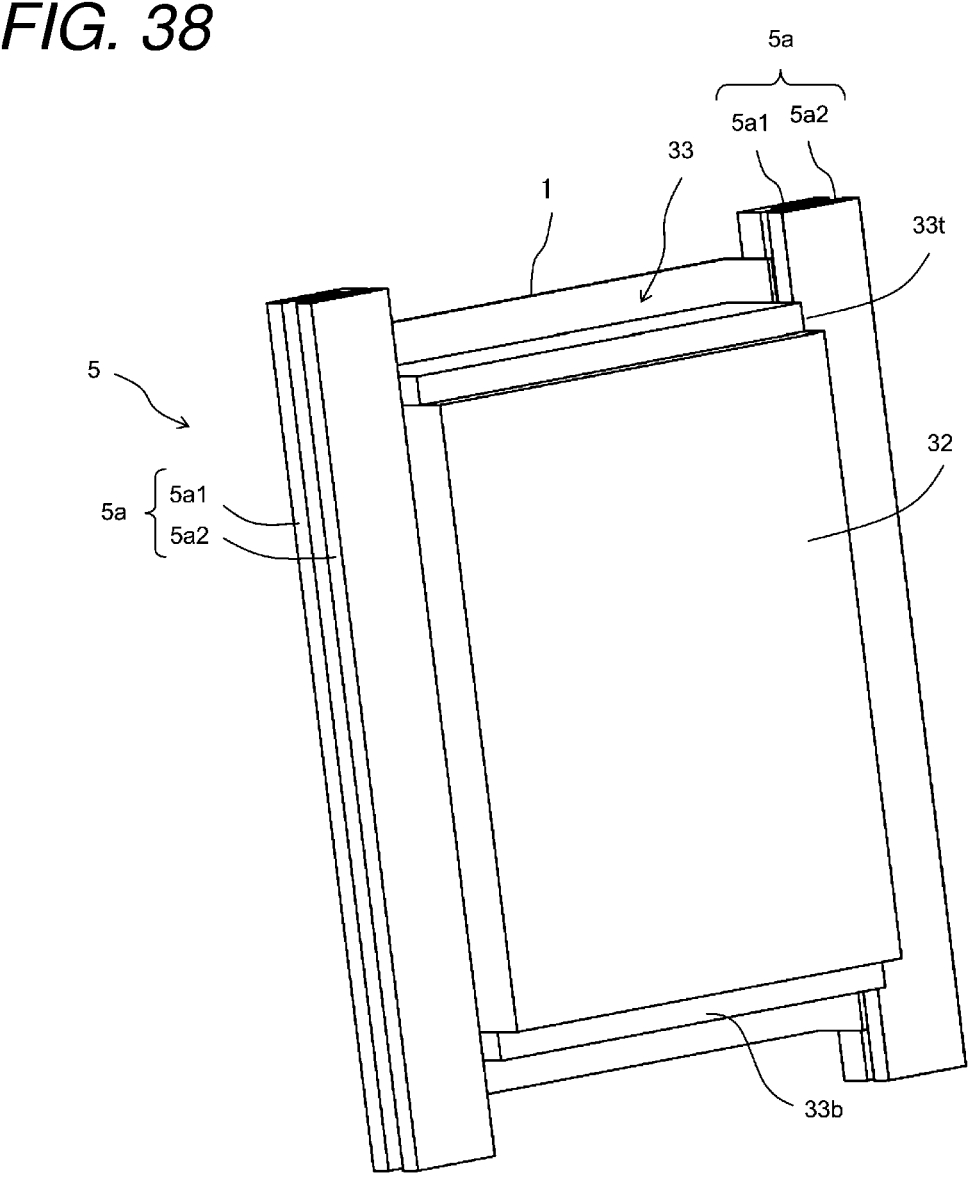
FIG. 38 is a rear perspective view of the state illustrated in FIG. 37.

As illustrated in FIGS. 37 and 38, the expander 5 is then caused to move forward until the expander 5 is located at substantially the middles of side surfaces of the mold 32. Consequently, the cavity 32a of the mold 32 is covered with the resin sheet 1. Accordingly, the cavity 32a becomes a closed space. Here, in the embodiment, the resin sheet 1 is extended widthwise to be pulled toward the mold 32 and the outer frame 33. Hence, a similar effect to a case where an outer frame is provided on the left and right of the mold 32. Consequently, when the frame upper portion 33t and the frame lower portion 33b are moved, the positions thereof do not need to be determined with reference to the outer frame on the left and right. Hence, interference between the outer frame 33 and the mold 32 can be prevented.

2-4. Shaping Step

In the shaping step, the resin sheet 1 is shaped into the shape along the inner surface of the cavity 32a provided to the mold 32, with the resin sheet 1 under tension. In the embodiment, the resin sheet 1 is vacuum suctioned by the mold 32. Here, the shaping method is not limited to this. The resin sheet 1 can also be shaped by blow molding.

Figure 39:
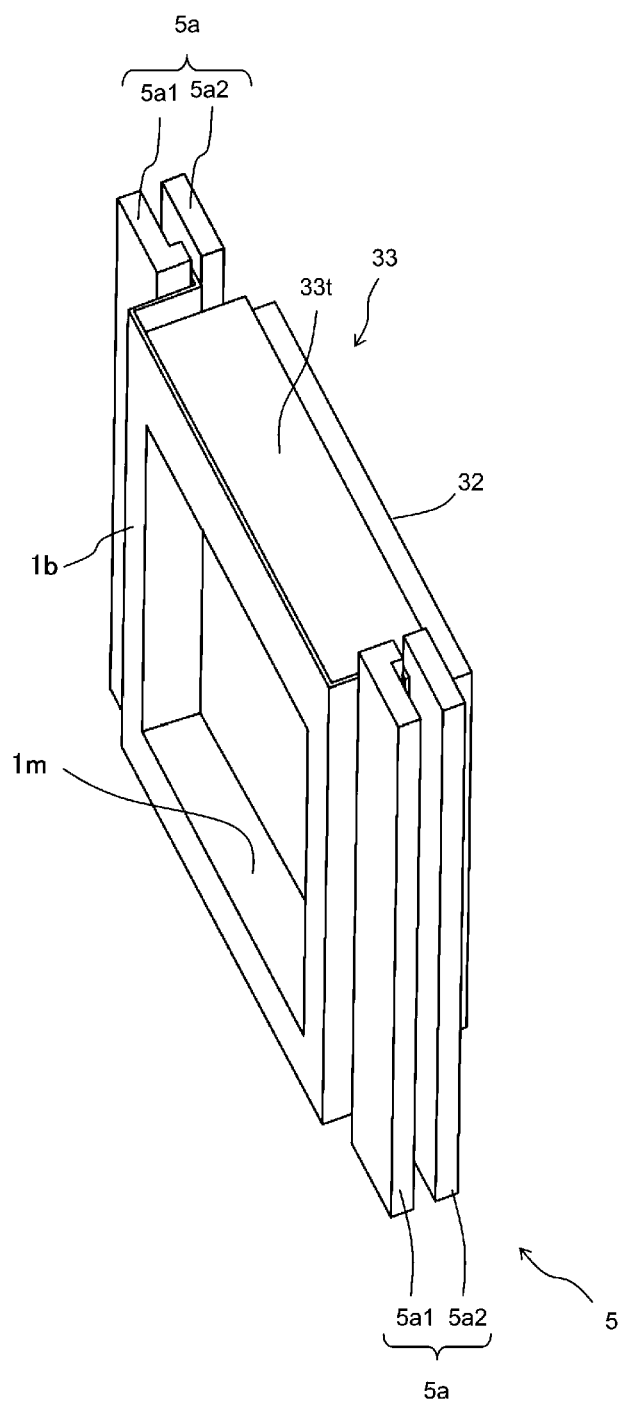
FIG. 39 is a front perspective view illustrating a state where the resin sheet 1 has been shaped with the mold 32 by vacuum suction.
Figure 40:
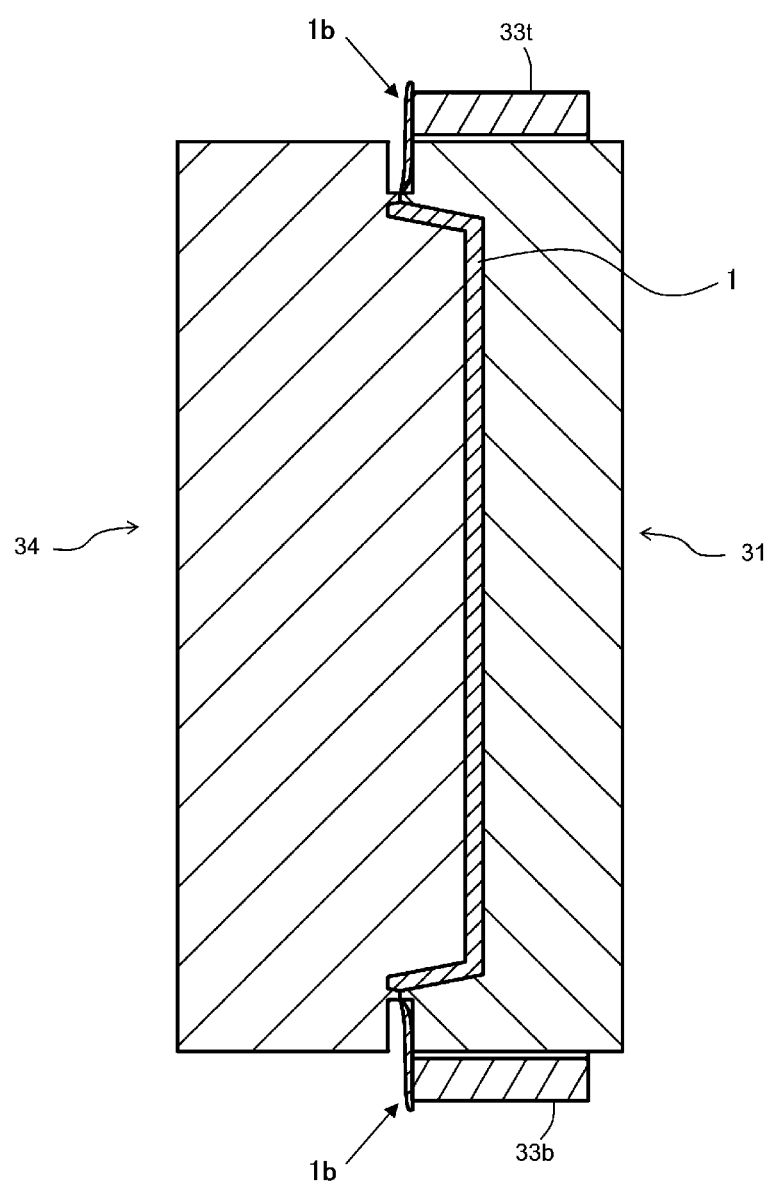
FIG. 40 is a cross-sectional view illustrating a clamped state by the mold apparatus 31 and a press mold 34 in a clamping step.

Specifically, as illustrated in FIGS. 39 and 40, the resin sheet 1 is vacuum suctioned by the mold 32 to shape the resin sheet 1 into the shape along the inner surface of the cavity 32a.

2-5. Clamping Step

Figure 41A:
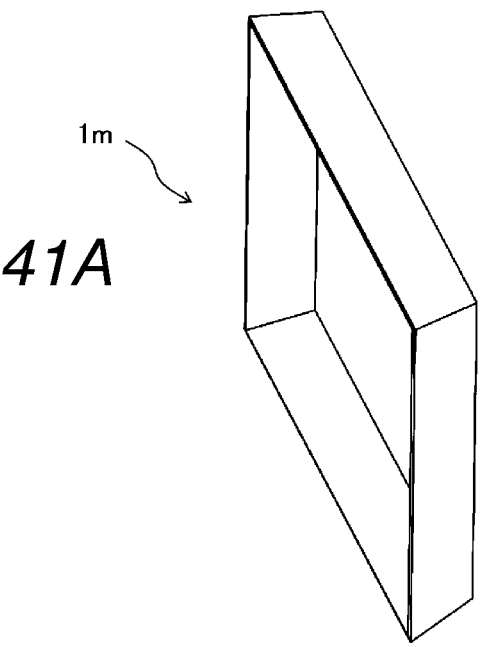
FIG. 41A is a front perspective view of a molded body 1m.
Figure 41B:
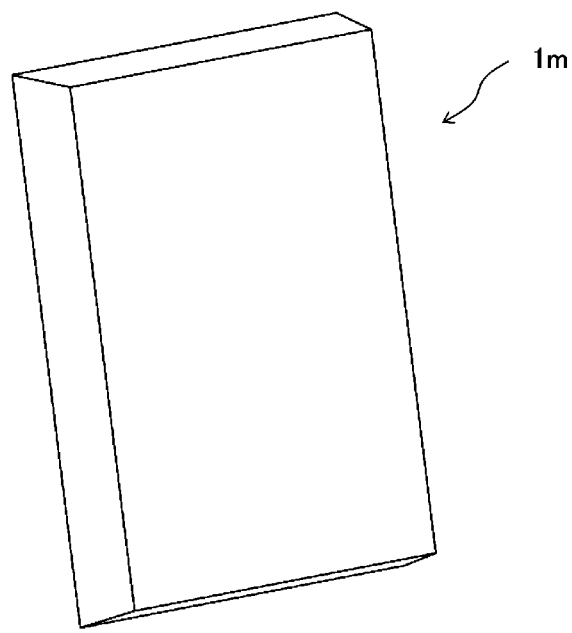
FIG. 41B is a rear perspective view of the molded body 1m.

In the clamping step, as illustrated in FIG. 40, the mold apparatus 31 and the press mold 34 are clamped together. Accordingly, a hollow molded body 1m of the shape along the inner surface of the cavity 32a formed by the mold 32 is obtained. As illustrated in FIGS. 41A and 41B, the molded body 1m is then taken out from the mold 32 to remove a burr 1b. Consequently, a desired molded body is obtained.

3. Modifications

Figure 42:
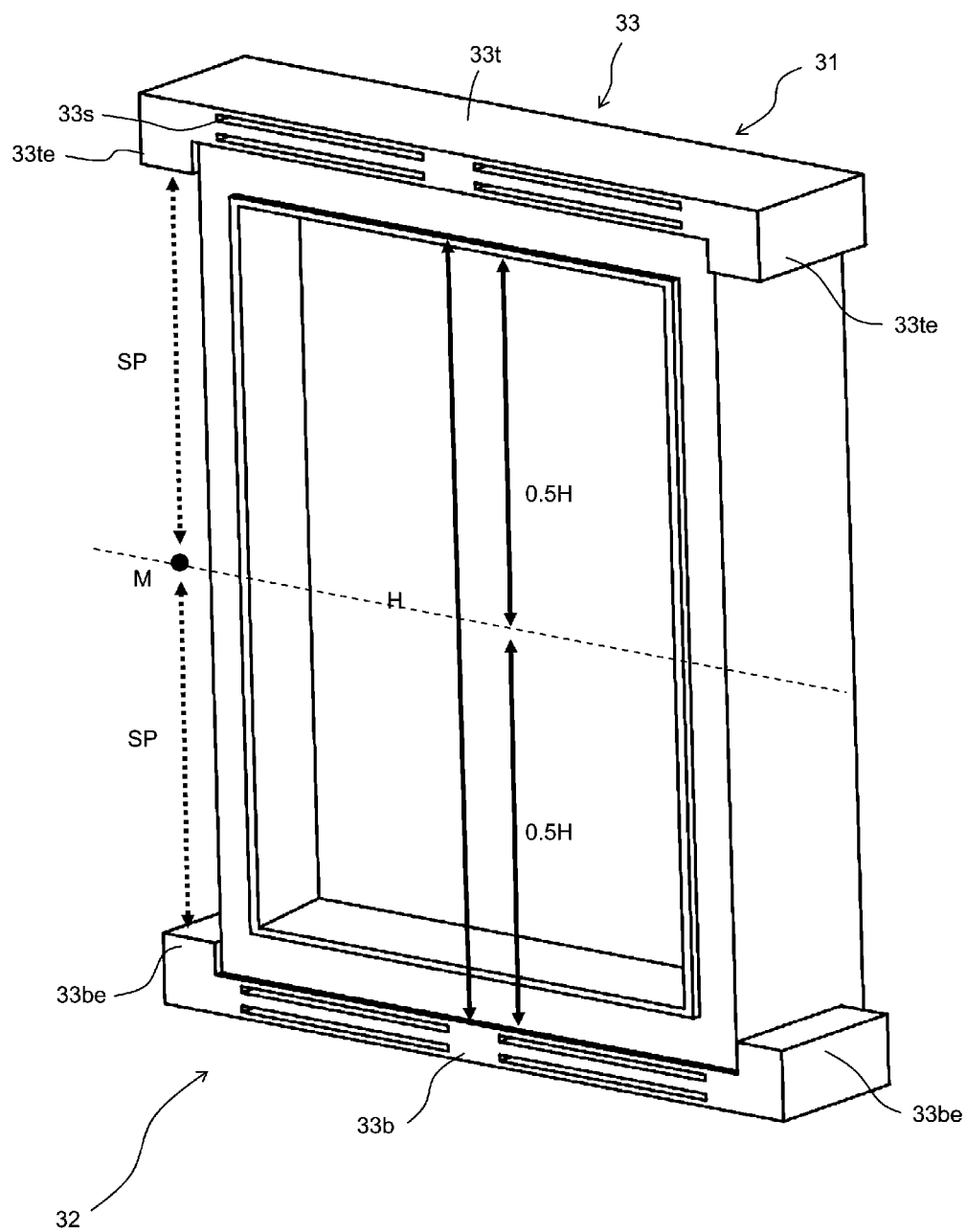
FIG. 42 is a perspective view illustrating a modification of the mold apparatus 31.

In the above embodiment, the frame upper portion 33t and the frame lower portion 33b have a flat plate shape. However, they are not necessarily the flat plate shape. For example, in a modification of FIG. 42, protrusions 33te and 33be protruding along the side surfaces of the mold 32 are formed at ends of the frame upper portion 33t and the frame lower portion 33b. Moreover, it is preferable to place the frame upper portion 33t and the frame lower portion 33b in such a manner that the protrusions 33te and 33be are within 50% of a length H of the mold 32 in the up-and-down direction from the upper and lower ends of the mold 32 in the up-and-down direction. The protrusions 33te and 33be are placed within an area of, more preferably 40%, still more preferably 30%, still more preferably 20%, still more preferably 10%, or still more preferably 0% of the length H. Moreover, in another expression, a space SP equal to or greater than 0% of the length H from a midpoint M between the upper and lower ends of the mold 32 in the up-and-down direction is provided in the mold 32 in the up-and-down direction. The space SP of, preferably 10%, more preferably 20%, still more preferably 30%, still more preferably 40%, or still more preferably 50% is provided. Here, these numerical values are simply exemplifications, and a value between the numerical values may be used. Also in a case of such a shape, interference between the outer frame 33 and the mold 32 can be prevented by a similar operation and effect to the embodiment.

4. Others

The embodiment can also be carried out in the following modes:

In the above embodiment, the outer frame 33 is provided with the groove-shaped vacuum suction hole 33s. However, the shape of the vacuum suction hole 33s is not limited. For example, a configuration where many circular vacuum suction holes 33s are placed is also possible.

The shaping step and the clamping step may be performed simultaneously, or the clamping step may start, lagging slightly behind the shaping step. At this point in time, the resin sheet 1 may be vacuum suctioned by the press mold 34 in a direction opposite to the mold 32.

In the above embodiment, a description is given taking, as an example, the method in which the hollow molded body 1m is formed using a pair of the mold apparatus 31 and the press mold 34. Instead of this, one resin sheet 1 may be shaped using one mold apparatus 31 to form a molded body. In this case, the clamping step after the shaping step is unnecessary.

If a pair of the mold apparatuses 31 is used, the molded body 1m may be hollow, and may be filled with a foam or the like.

The resin sheet 1 may be a foamed resin sheet.

After the resin sheet 1 is brought into contact with the front surface of the outer frame 33 in a state where the outer frame 33 has been moved forward (refer to FIG. 26), the mold 32 may be moved forward.

Fourth Embodiment

In a mold apparatus including a mold for molding a resin sheet and an outer frame that is configured in such a manner as to be movable parallel along a peripheral surface of the mold, the outer frame is configured including a frame upper portion of a shape surrounding an upper side, a right side, and a left side of the mold, and a frame lower portion placed on a lower side of the mold. The frame upper portion and the frame lower portion are each configured in such a manner as to be movable parallel along the peripheral surface of the mold. Here, the frame upper portion has a shape surrounding the upper side, the right side, and the left side of the mold. Hence, it is not easy to move the frame upper portion strictly parallel. There is a problem that if the moving direction of the frame upper portion inclines even slightly, the frame upper portion may interfere with the mold. This problem becomes bigger with increasing mold size.

The embodiment has been made considering such circumstances. The embodiment provides a mold apparatus that can prevent interference between an outer frame and a mold.

According to the embodiment, the following mold apparatus is provided. The mold apparatus includes a mold for molding a resin sheet, and an outer frame that is configured in such a manner as to be movable along a peripheral surface of the mold. The outer frame is configured in such a manner as to be capable of suctioning the resin sheet, and includes a frame upper portion, a frame lower portion, a frame right portion, and a frame left portion. The frame upper portion, the frame lower portion, the frame right portion, and the frame left portion are placed on an upper side, a lower side, a right side, and a left side of the mold, respectively, and are configured in such a manner as to be movable independently of each other.

In the mold apparatus of the embodiment, the outer frame includes the frame upper portion, the frame lower portion, the frame right portion, and the frame left portion, and is configured in such a manner as to be movable independently of each other. A frame upper portion of a known technology is divided into the frame upper portion, the frame right portion, and the frame left portion in the present invention. Moving the frame upper portion, the frame right portion, and the frame left portion parallel is easier than moving the frame upper portion of the known technology parallel. Hence, the present invention can prevent interference between the outer frame and the mold.

Various embodiments of the present invention are illustrated by example below. The embodiments illustrated below can be combined with one another.

It is preferable that each of the frame upper portion, the frame lower portion, the frame right portion, and the frame left portion have a flat plate shape.

According to another aspect of the embodiment, the following method is provided. This method is a method for manufacturing a molded body using a mold apparatus. The mold apparatus is the mold apparatus described above. This method includes a drooping step, a suction step, and a shaping step. In the drooping step, a resin sheet is caused to droop on a front side of the mold. In the suction step, the outer frame is moved in such a manner as to bring the resin sheet close to the mold in a state where the outer frame is suctioning the resin sheet. In the shaping step, the resin sheet is vacuum suctioned by the mold to shape the resin sheet to a shape along an inner surface of the cavity.

It is preferable that a pair of mold apparatuses be used as the mold apparatus. Each of the pair of mold apparatuses is the mold apparatus described above. The drooping step, the suction step, and the shaping step are performed for each of the pair of mold apparatuses. It is preferable that this method include a clamping step of clamping molds of the pair of mold apparatuses together.

It is preferable that in the drooping step, the resin sheet be caused to droop along the frame right portion and the frame left portion.

It is preferable that in the drooping step, the frame right portion and the frame left portion be placed adjacent to the resin sheet before a lower end of the resin sheet reaches the frame lower portion, and the frame lower portion be moved in such a manner as to be adjacent to the resin sheet after the lower end reaches below the frame lower portion.

It is preferable that the frame upper portion be moved together with the frame lower portion.

It is preferable that in the suction step, the frame upper portion and the frame lower portion be moved lagging behind the frame right portion and the frame left portion.

An embodiment of the present invention is described below. Various feature matters illustrated in the embodiment illustrated below can be combined with one another. Moreover, each feature matter establishes itself as the invention independently.

1. Configuration of Molding Machine 400

Firstly, a molding machine 400 that can be used to carry out a method for manufacturing a molded body according to one embodiment of the present invention is described, using FIGS. 43 to 46. The molding machine 400 includes a pair of resin sheet forming apparatuses 52 and a pair of mold apparatuses 31. Each resin sheet forming apparatus 52 includes a hopper 12, an extruder 13, an accumulator 17, and a T-die 18. The extruder 13 and the accumulator 17 are connected via a connecting pipe 25. The accumulator 17 and the T-die 18 are connected via a connecting pipe 27.

Each configuration is described in detail below

<Hopper 12, Extruder 13>

The hopper 12 is used to charge raw resin 11 into a cylinder 13a of the extruder 13. The form of the raw resin 11 is not especially limited, but is normally a pellet. The raw resin is, for example, a thermoplastic resin such as polyolefin. Examples of polyolefin include low-density polyethylene, liner low-density polyethylene, high-density polyethylene, polypropylene, ethylene-propylene copolymer, and a mixture thereof. The raw resin 11 is charged into the cylinder 13a from the hopper 12 and then heated in the cylinder 13a. Accordingly, the raw resin 11 melts into molten resin. Moreover, the molten resin is carried to a distal end of the cylinder 13a with the rotation of a screw placed in the cylinder 13a. The screw is placed in the cylinder 13a, and the rotation of the screw allows carrying the molten resin while mixing the molten resin. A gear apparatus is provided at a base end of the screw. The gear apparatus drives and rotates the screw. The number of screws placed in the cylinder 13a may be one or more.

<Accumulator 17, T-Die 18>

The molten resin is extruded through a resin extrusion port of the cylinder 13a, and injected into the accumulator 17 via the connecting pipe 25. The accumulator 17 includes a cylinder 17a and a piston 17b that can slide in the cylinder 17a. The molten resin can be stored in the cylinder 17a. After a predetermined amount of the molten resin is stored in the cylinder 17a, the piston 17b is moved to extrude the molten resin through a slit provided in the T-die 18 via the connecting pipe 27 and droop the molten resin. Consequently, a molten resin sheet 230 is formed.

<Mold Apparatus 31>

Each mold apparatus 31 includes a mold 32 for molding the resin sheet 230, and an outer frame 33 that is configured in such a manner as to be movable along a peripheral surface 32s of the mold 32. The outer frame 33 is configured in such a manner as to be movable by a cylinder mechanism or the like.

The mold 32 is substantially cuboid, and includes a front surface 32f, a rear surface 32r, and the peripheral surface 32s between them. The front surface 32f is a surface facing the resin sheet 230. The rear surface 32r is a surface opposite to the front surface 32f. The peripheral surface 32s includes a top surface 32st, a bottom surface 32sb, a right side surface 32sr, and a left side surface 32sl. The top surface 32st and the bottom surface 32sb face each other, and the right side surface 32sr and the left side surface 32sl face each other.

The mold 32 has a cavity 32a. A pinch-off portion 32b is provided in such a manner as to surround the cavity 32a. Vacuum suction holes (not illustrated) are provided in the cavity 32a. It is configured in such a manner that the resin sheet 230 is vacuum suctioned through the vacuum suction holes and accordingly can be shaped into a shape along an inner surface of the cavity 32a of the mold 32. The vacuum suction holes are ultrasmall holes. An end of the vacuum suction hole communicates with the inner surface of the cavity 32a through the inside of the mold 32, and the other end is connected to a decompression apparatus.

The outer frame 33 includes a frame upper portion 33t, a frame lower portion 33b, a frame right portion 33r, and a frame left portion 33l. The outer frame 33 is provided with a groove-shaped vacuum suction hole 33s. The vacuum suction hole 33s is connected to the decompression apparatus. It is configured in such a manner that the vacuum suction hole 33s can suction the resin sheet 230 to the outer frame 33 by vacuum suction.

The frame upper portion 33t, the frame lower portion 33b, the frame right portion 33r, and the frame left portion 33l are placed on an upper side, a lower side, a right side, and a left side of the mold 32, respectively, and are configured in such a manner as to be movable independently. In other words, the frame upper portion 33t, the frame lower portion 33b, the frame right portion 33r, and the frame left portion 33l are placed along the top surface 32st, the bottom surface 32sb, the right side surface 32sr, and the left side surface 32sl of the mold 32, respectively, and are configured in such a manner as to be movable parallel along each surface. The frame right portion 33r and the frame left portion 33l are provided in such a manner as to be sandwiched between the frame upper portion 33t and the frame lower portion 33b.

2. Method for Manufacturing Molded Body

A method for manufacturing a molded body according to one embodiment of the present invention is described here, using FIGS. 43 to 52. The method of the embodiment includes a drooping step, a suction step, a shaping step, and a clamping step. The details are described below.

2-1. Drooping Step

Figure 43:
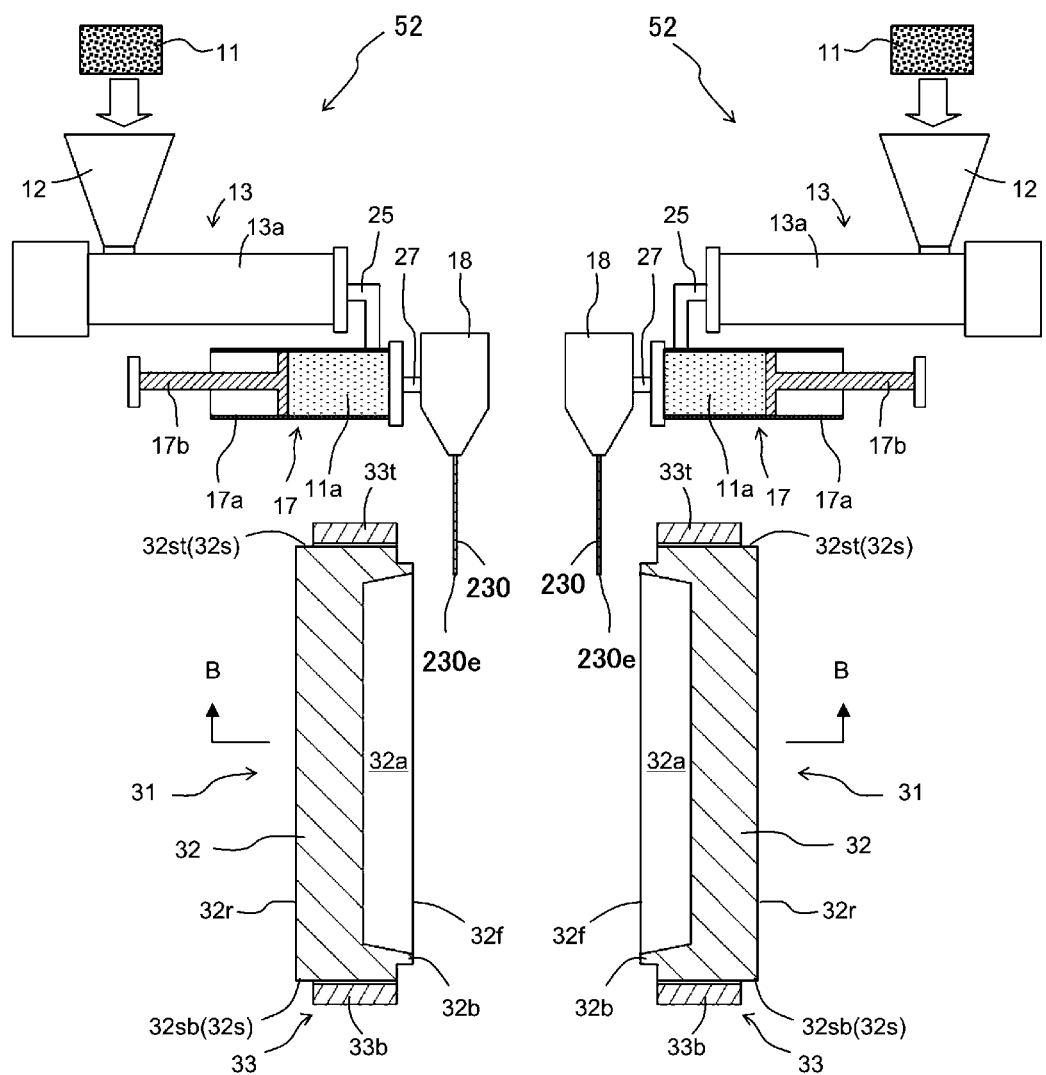
FIG. 43 illustrates an example of a molding machine 400 that can be used in a method for manufacturing a molded body according to one embodiment of the present invention, including a cross-sectional view along A-A in FIG. 44 of the mold apparatus 31.
Figure 44:
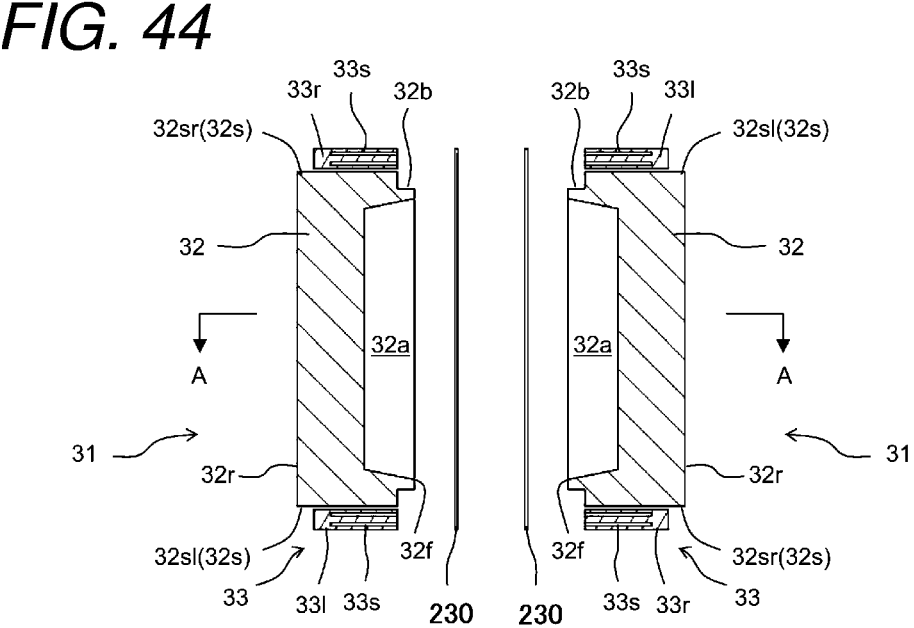
FIG. 44 is a cross-sectional view along B-B in FIG. 43.
Figure 45:
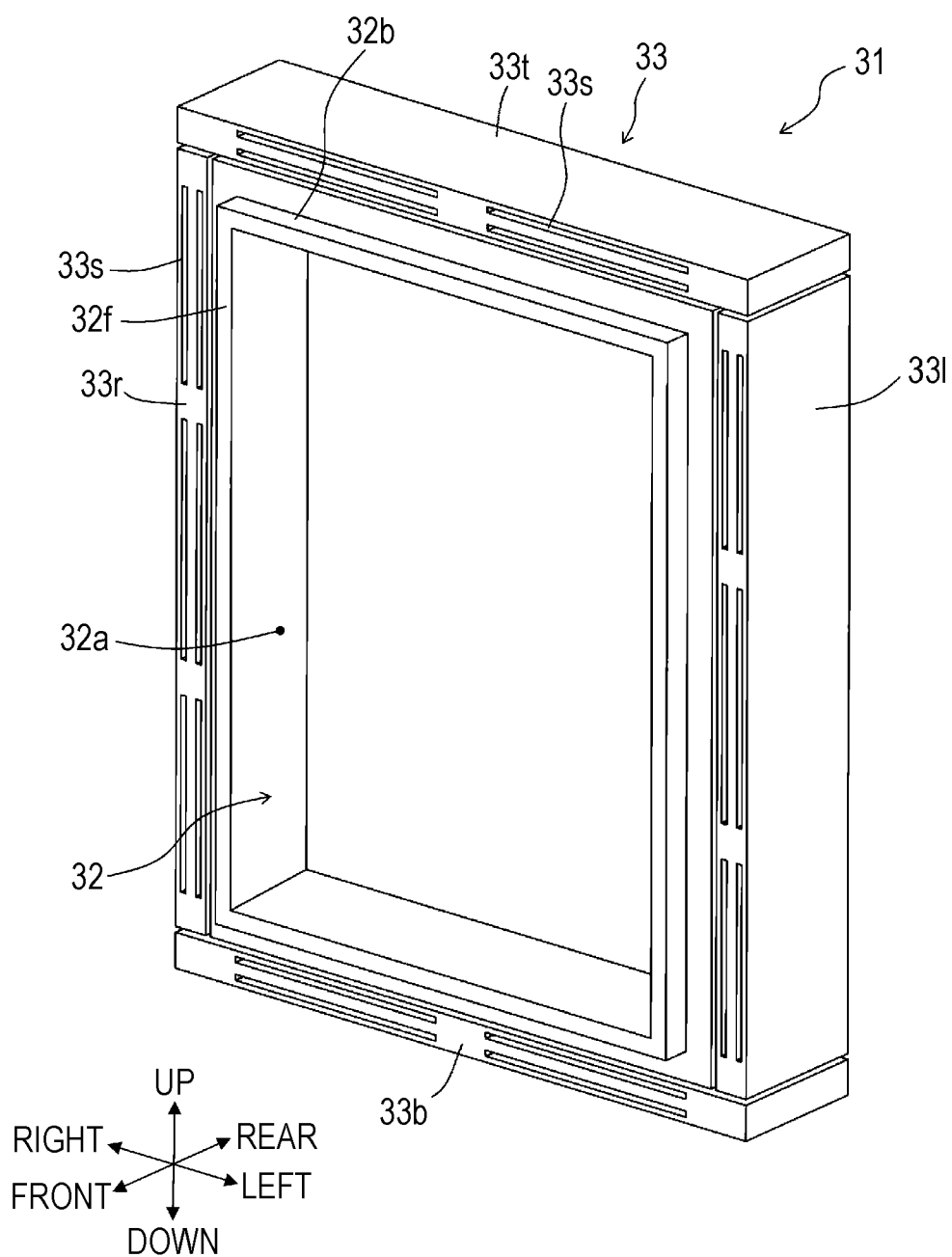
FIG. 45 is a perspective view of the mold apparatus 31 in FIG. 43.
Figure 46:
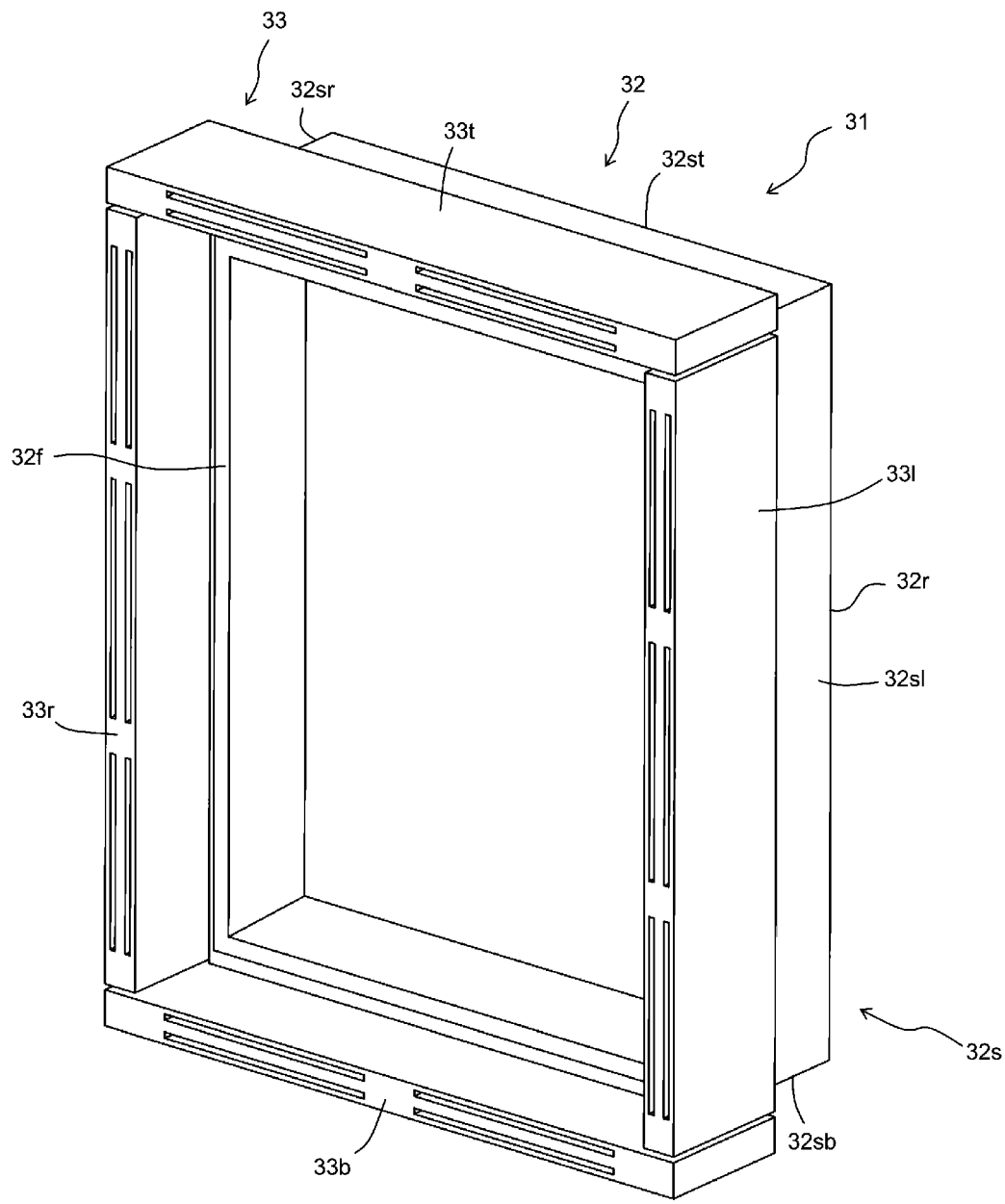
FIG. 46 is a perspective view of the mold apparatus 31 in a state where the outer frame 33 has moved forward.
Figure 47:
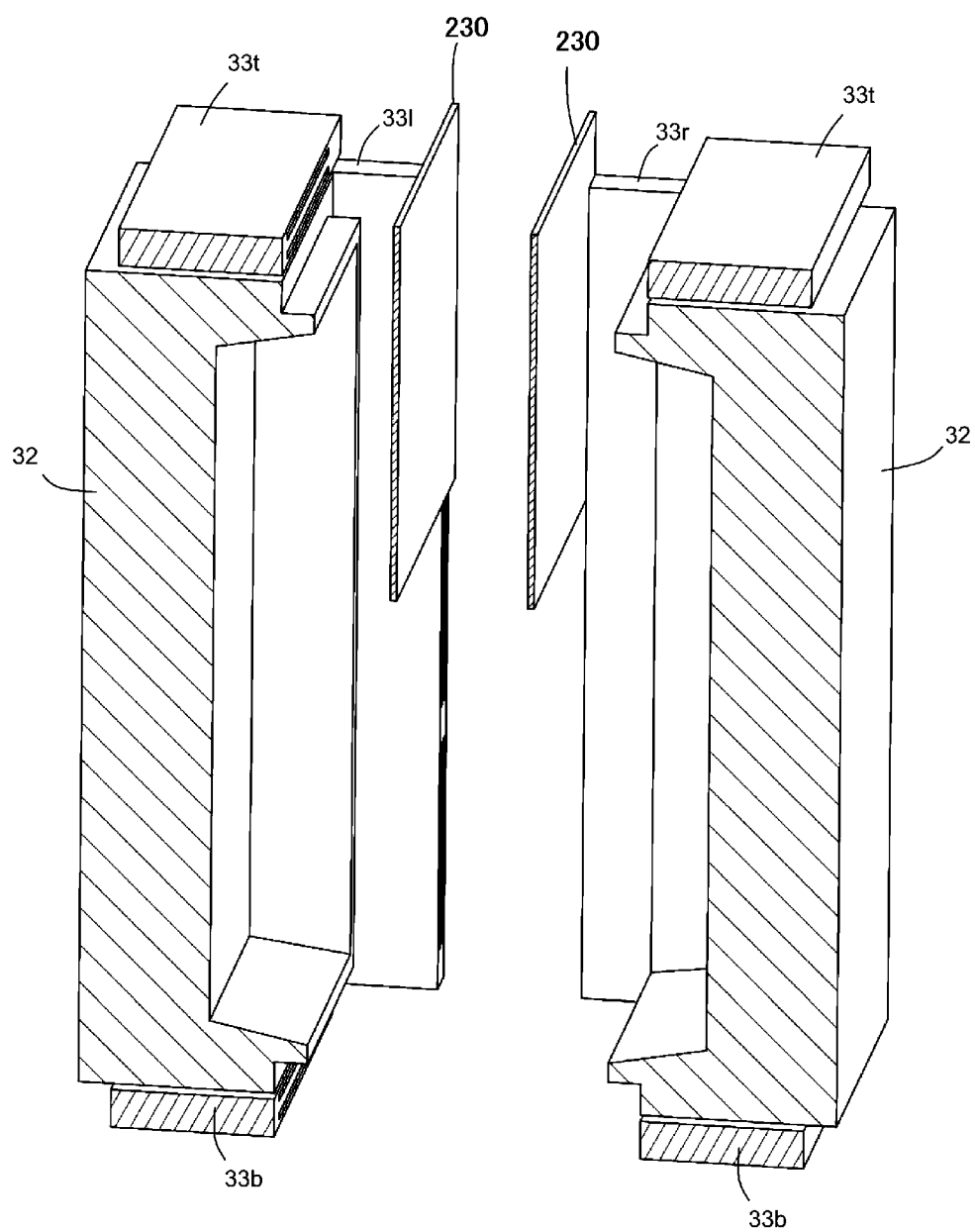
FIG. 47 is a cross-sectional perspective view of a cross section A-A in FIG. 44, illustrating a state where a resin sheet 230 is being drooped along a frame right portion 33r and a frame left portion 33l.

As illustrated in FIG. 43, in the drooping step, the resin sheet 230 is caused to droop on the front surface 32f side of the mold 32. As illustrated in FIG. 43, the outer frame 33 is retracted at a position away from the resin sheet 230 before a lower end 230e of the resin sheet 230 reaches below the frame upper portion 33t. When the lower end 230e of the resin sheet 230 reaches below upper ends of the frame right portion 33r and the frame left portion 33l as illustrated in FIG. 47, the frame right portion 33r and the frame left portion 33l are moved in such a manner as to be brought close to the resin sheet 230 to droop the resin sheet 230 in a state where the frame right portion 33r and the frame left portion 33l are adjacent to the resin sheet 230. Consequently, friction between the resin sheet 230 and the frame right portion 33r and the frame left portion 33l prevents a drawdown of the resin sheet 230. The frame right portion 33r and the frame left portion 33l are simply required to be adjacent to the resin sheet 230 before the lower end 230e of the resin sheet 230 reaches below the frame lower portion 33b. It is preferable that the frame right portion 33r and the frame left portion 33l be placed adjacently to the resin sheet 230 before the lower end 230e of the resin sheet 230 reaches the middles of the frame right portion 33r and the frame left portion 33l in the up-and-down direction.

Figure 48:
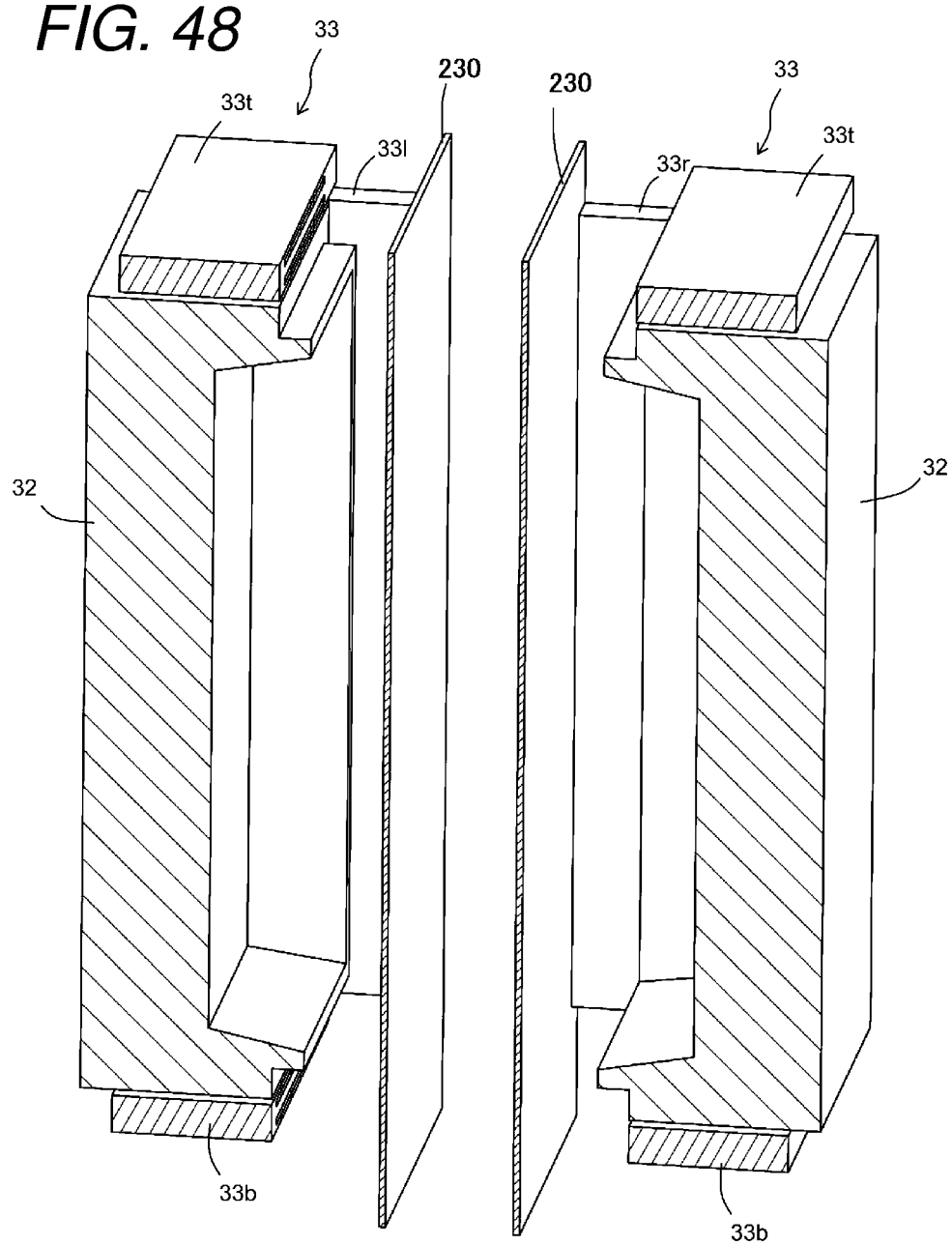
FIG. 48 is a cross-sectional perspective view of the cross section A-A in FIG. 44, illustrating a state where a lower end of the resin sheet 230 has reached below the frame lower portion 33b.
Figure 49:
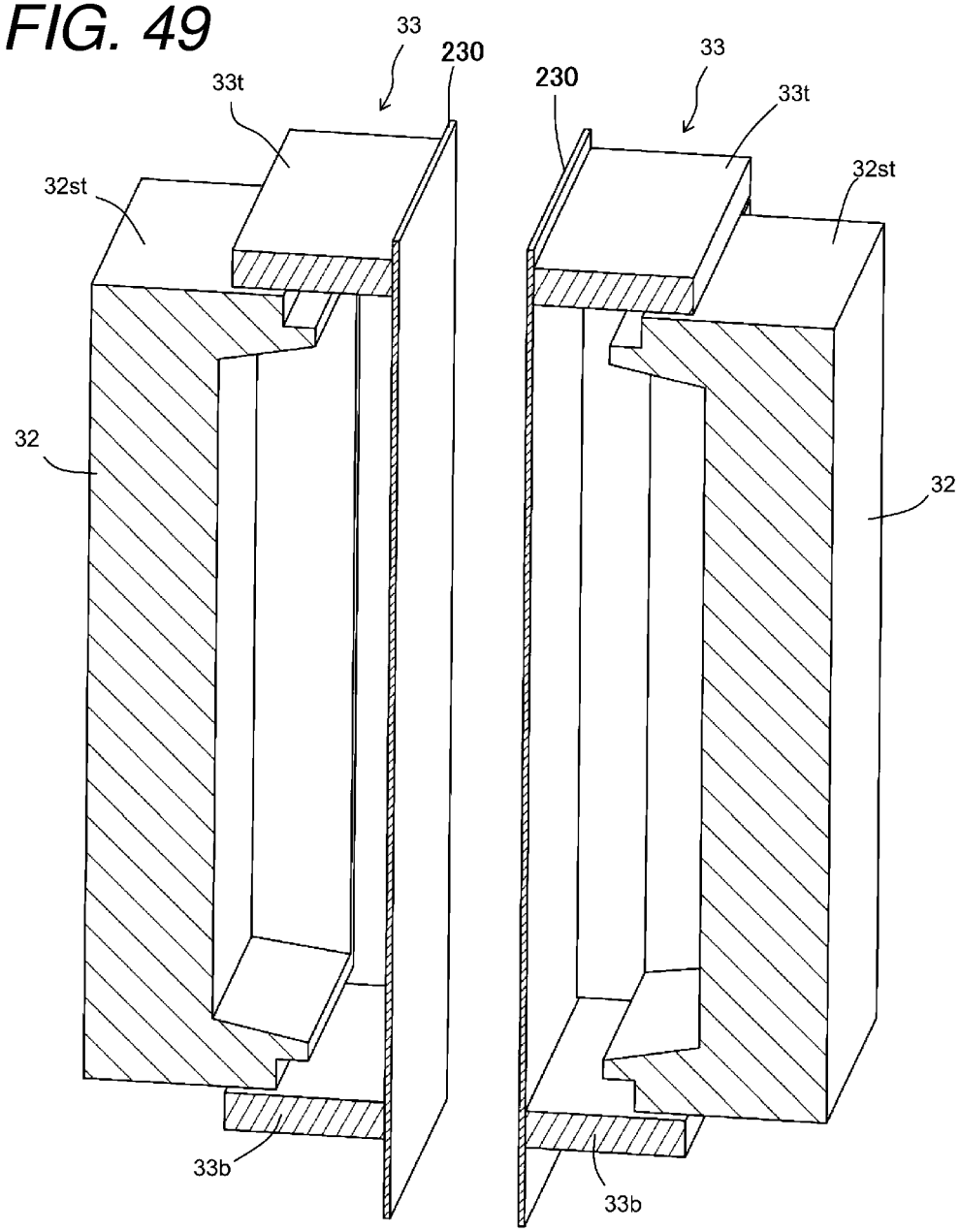
FIG. 49 is a cross-sectional perspective view of the cross section A-A in FIG. 44, illustrating a state where a frame upper portion 33t and the frame lower portion 33b are in contact with the resin sheet 230 and the outer frame 33 is suctioning the resin sheet 230.

Next, after the lower end 230e of the resin sheet 230 reaches below the frame lower portion 33b as illustrated in FIG. 48, the frame lower portion 33b is moved in such a manner as to be adjacent to the resin sheet as illustrated in FIG. 49. At this timing, the frame lower portion 33b is moved to allow preventing the lower end 230e of the resin sheet 230 from overriding the frame lower portion 33b. The timing when the frame upper portion 33t is moved is not especially limited. It is preferable that the frame upper portion 33t be moved toward the resin sheet 230 after the resin sheet 230 reaches below the frame upper portion 33t. It is preferable that the frame upper portion 33t and the frame lower portion 33b be moved together. When being moved simultaneously, the frame upper portion 33t and the frame lower portion 33b are moved in such a manner as to be symmetric with respect to a middle surface of the mold 32 in the up-and-down direction. Hence, forces in rotating directions by reaction forces upon moving the frame upper portion 33t and the frame lower portion 33b cancel each other out. Therefore, it becomes easy to move the frame upper portion 33t and the frame lower portion 33b parallel along the top surface 32st and the bottom surface 32sb of the mold 32.

2-2. Suction Step

Figure 50:
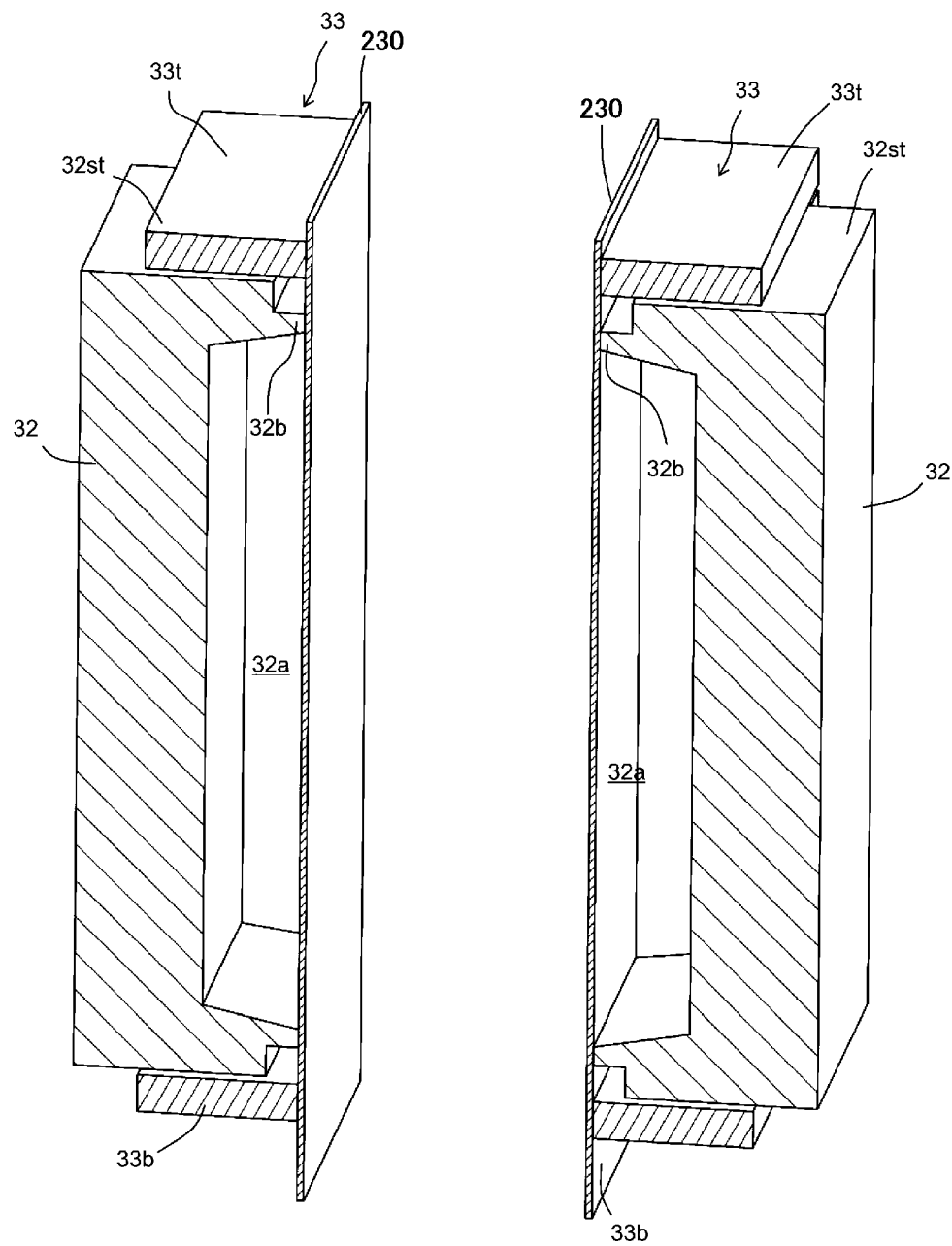
FIG. 50 is a cross-sectional perspective view of the cross section A-A in FIG. 44, illustrating a state where the outer frame 33 has been moved in such a manner as to bring the resin sheet 230 close to the mold 32 in a state where the resin sheet 230 is being suctioned by the outer frame 33.

In the suction step, in a state where the outer frame 33 is suctioning the resin sheet 230 as illustrated in FIG. 49, the outer frame 33 is moved in such a manner as to bring the resin sheet 230 close to the mold 32 as illustrated in FIG. 50.

Specifically, as illustrated in FIG. 49, the decompression apparatus connected to the vacuum suction hole 33s of the outer frame 33 is operated in the state where the outer frame 33 is in contact with the resin sheet 230 to suction the resin sheet 230 to the outer frame 33. The outer frame 33 is moved backward in this state and accordingly the resin sheet 230, together with the outer frame 33, moves toward the mold 32 to bring the resin sheet 230 into contact with the pinch-off portion 32b. Consequently, the cavity 32a of the mold 32 is covered with the resin sheet 230 to make the cavity 32a a closed space.

In terms of the outer frame 33, it is preferable that the frame upper portion 33t and the frame lower portion 33b be moved lagging behind the frame right portion 33r and the frame left portion 33l. The time lag is preferably 0.1 to 1 second, more preferably 0.3 to 0.7 seconds. Movement with the time lag allows applying tension to the resin sheet 230. Accordingly, slack and waviness of the resin sheet 230 is prevented. The reason why it is preferable that the time lag be within one second is because if the time lag is too long, a gap between the resin sheet 230 and the mold 32 becomes larger to make shaping by vacuum suction difficult. Moreover, if the frame upper portion 33t and the frame lower portion 33b are moved lagging behind the frame right portion 33r and the frame left portion 33l, the resin sheet 230 is highly likely to come off the outer frame 33. In the embodiment, the frame right portion 33r and the frame left portion 33l are provided in such a manner as to be sandwiched between the frame upper portion 33t and the frame lower portion 33b. The resin sheet 230 is firmly suctioned by the frame upper portion 33t and the frame lower portion 33b. Hence, the resin sheet 230 hardly comes off.

2-3. Shaping Step

Figure 51:
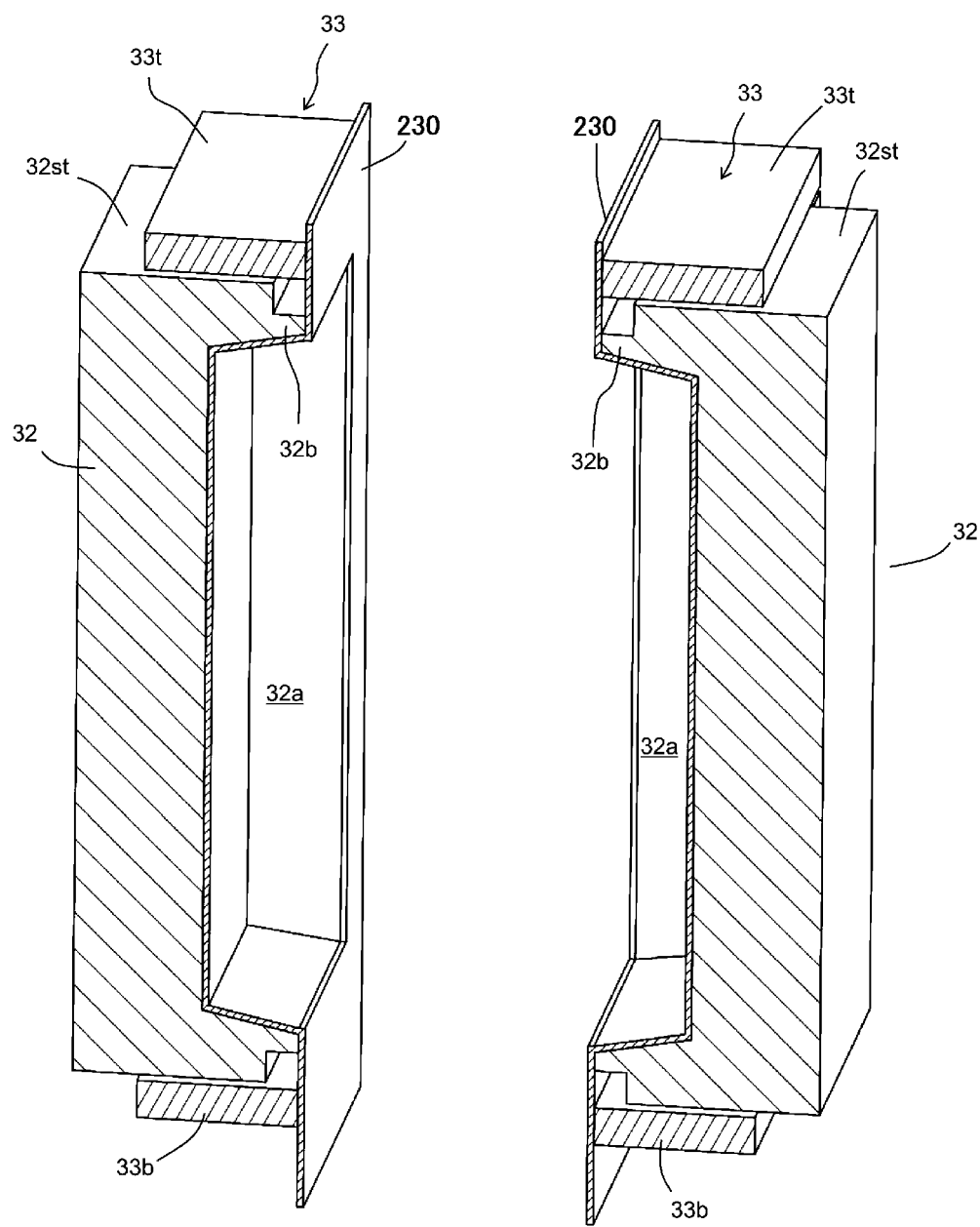
FIG. 51 is a cross-sectional perspective view of the cross section A-A in FIG. 44, illustrating a state where the resin sheet 230 has been shaped with the mold 32 by vacuum suction.

In the shaping step, the resin sheet 230 is vacuum suctioned by the mold 32 as illustrated in FIG. 51 to shape the resin sheet 230 into a shape along the inner surface of the cavity 32a.

2-4. Clamping Step

Figure 52:
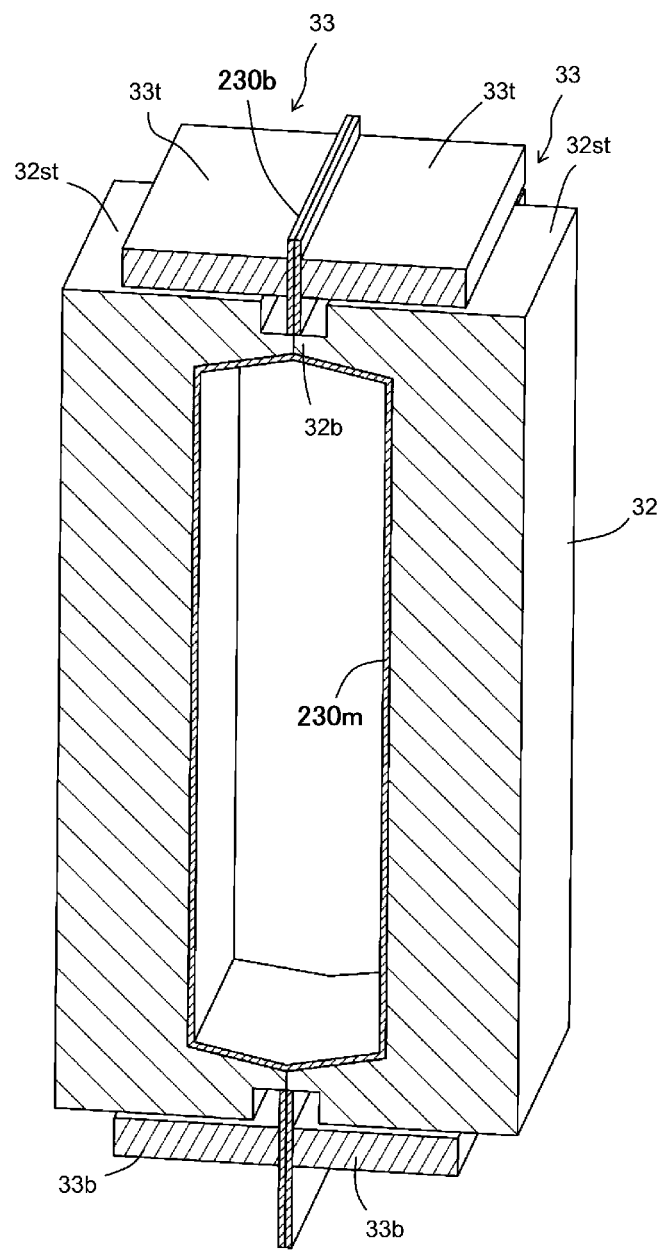
FIG. 52 is a cross-sectional perspective view of the cross section A-A in FIG. 44, illustrating a state after a pair of the molds 32 is clamped together.

In the clamping step, a pair of the molds 32 is clamped together as illustrated in FIG. 52. Consequently, a hollow molded body 230m of a shape along an inner surface of a cavity formed by the pair of the molds 32 is obtained. An outer side of the pinch-off portion 32b becomes a burr 230b. After clamping, air may or may not be blown into the molded body 230m.

The molds 32 are then opened. The molded body 230m is taken out. The burr 230b is removed. Accordingly, a desired molded body is obtained.

3. Modifications

Figure 53:
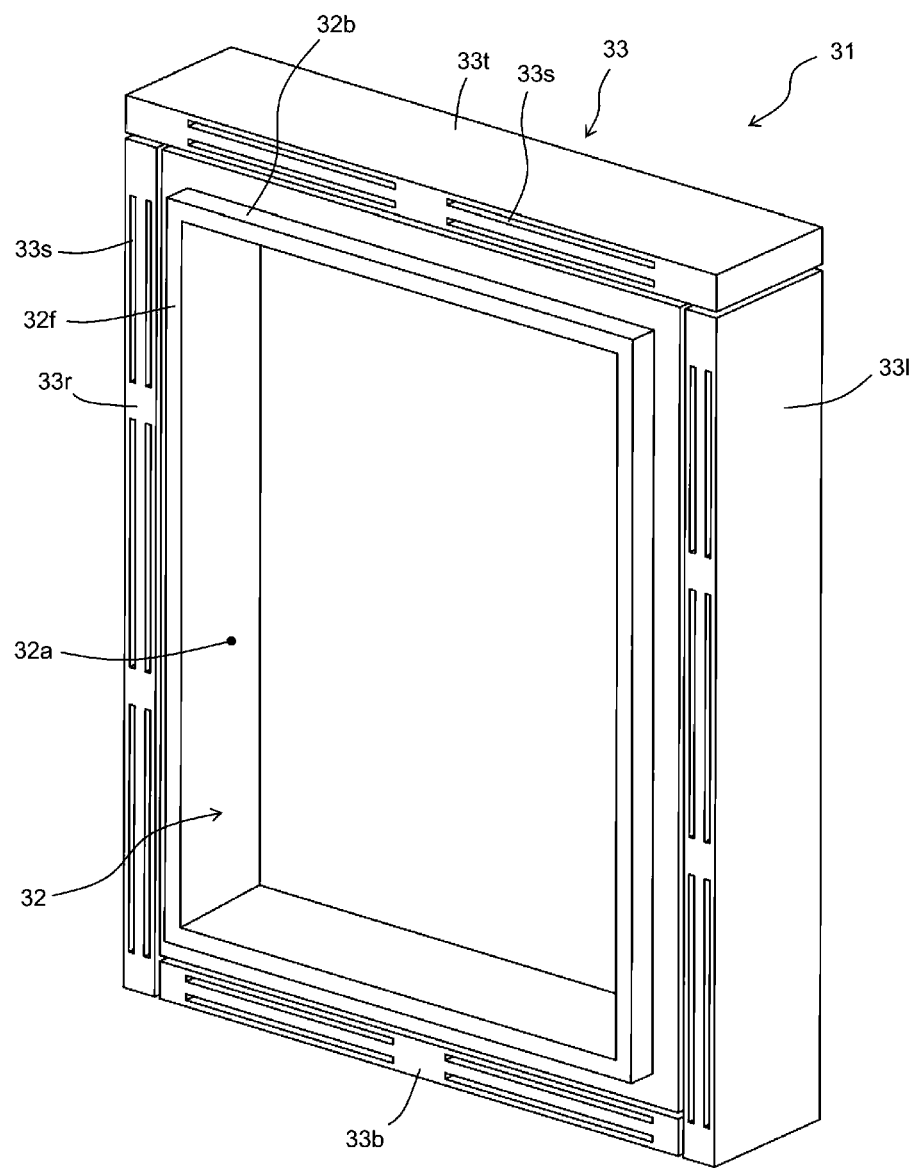
FIG. 53 is a perspective view illustrating a first modification of the mold apparatus 31.

In the above embodiment, the frame right portion 33r and the frame left portion 33l are provided in such a manner as to be sandwiched between the frame upper portion 33t and the frame lower portion 33b. As illustrated in a first modification illustrated in FIG. 53, the frame upper portion 33t may be provided in such a manner as to cover upper end surfaces of the frame right portion 33r and the frame left portion 33l, and the frame lower portion 33b may be provided in such a manner as to be sandwiched between the frame right portion 33r and the frame left portion 33l.

Figure 54:
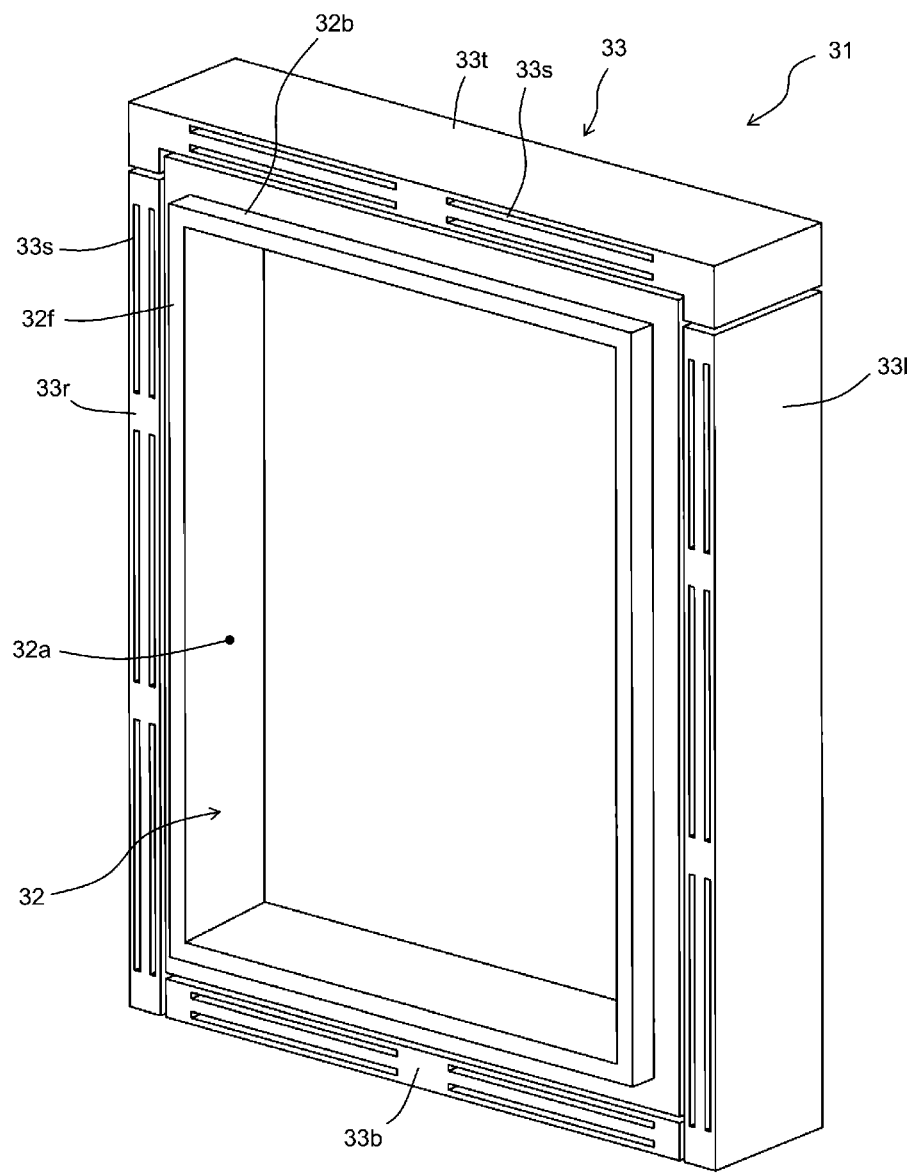
FIG. 54 is a perspective view illustrating a second modification of the mold apparatus 31.
Figure 55:
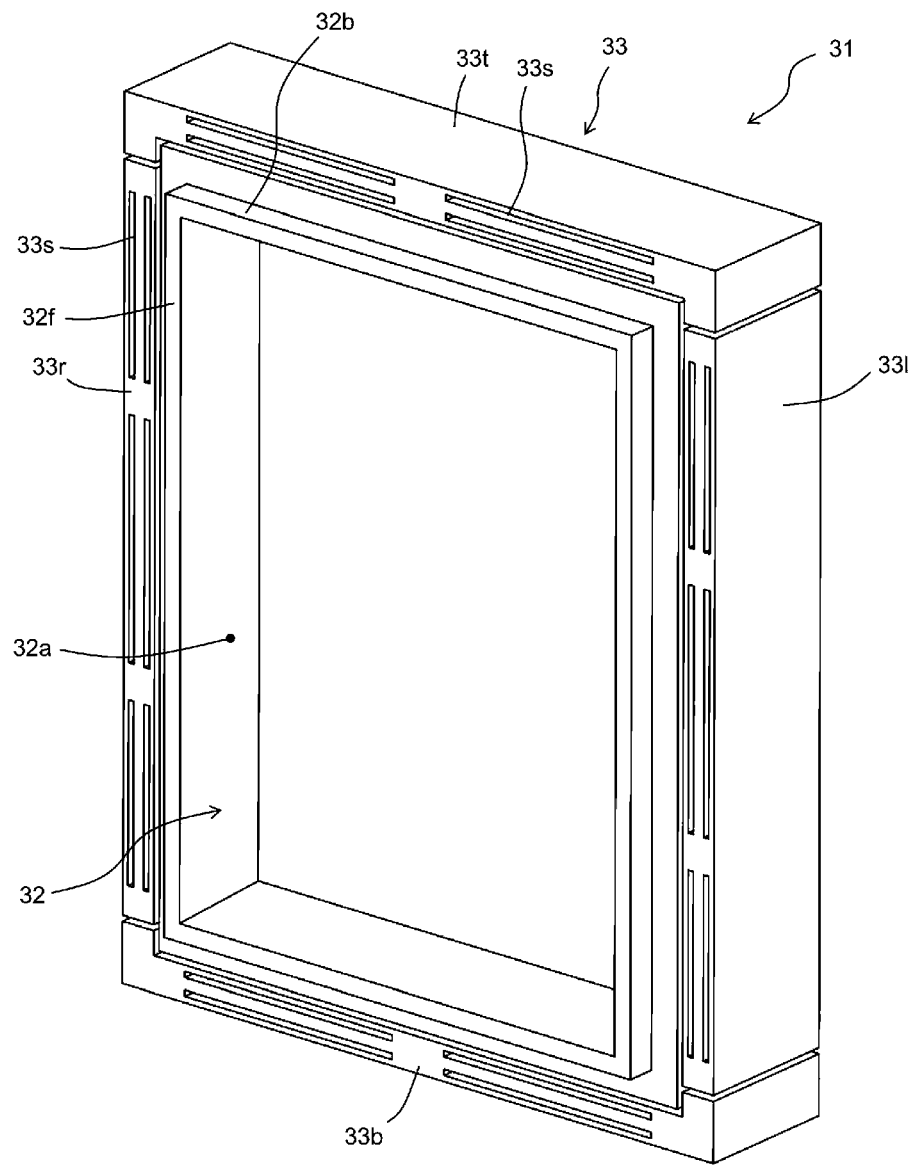
FIG. 55 is a perspective view illustrating a third modification of the mold apparatus 31.

In the above embodiment, all of the frame upper portion 33t, the frame lower portion 33b, the frame right portion 33r, and the frame left portion 33l have a flat plate shape. However, they do not necessarily have a flat plate shape. For example, in a second modification of FIG. 54, the frame upper portion 33t has a shape protruding toward the frame right portion 33r and the frame left portion 33l at end portions thereof. In a third modification of FIG. 55, the frame upper portion 33t and the frame lower portion 33b have a shape protruding toward the frame right portion 33r and the frame left portion 33l at end portions thereof. Even in a case of such a shape, the frame upper portion 33t, the frame lower portion 33b, the frame right portion 33r, and the frame left portion 33l are configured in such a manner as to be movable independently to enable the prevention of interference between the outer frame 33 and the mold 32 with a similar operation and effect to the above embodiment.

4. Others

The embodiment can also be carried out in the following modes:

In the above embodiment, the outer frame 33 is divided into four portions, but may be divided into five or more portions. For example, each of the frame right portion 33r and the frame left portion 33l may be divided into two portions.

In the above embodiment, the outer frame 33 is provided with the groove-shaped vacuum suction hole 33s. However, the shape of the vacuum suction hole 33s is not limited. For example, a configuration where many circular vacuum suction holes 33s are placed is also possible.

In the above embodiment, a description is given taking, as an example, the method in which the hollow molded body 230m is formed using the pair of the mold apparatuses 31. Instead of this, one resin sheet 230 may be shaped using one mold apparatus 31 to form a molded body. In this case, the clamping step is unnecessary.

In the above embodiment, the molded body 230m is hollow. Instead of this, a foam or the like may be filled in the molded body 230m.

The resin sheet 230 may be a foamed resin sheet.

Up to this point the embodiments according to the present invention have been described. They are presented as examples, and are not intended to limit the scope of the invention. The novel embodiments can be carried out in other various modes. These embodiments can be omitted, replaced, and changed in various manners within a scope that does not depart from the gist of the invention. The embodiments and modifications thereof are included in the scope and gist of the invention, and included in the invention described in the claims and the scope of equivalents thereof.

The invention claimed is:

1. A method for manufacturing an integrally-molded body using a first and a second mold, the method comprising:
   an inserting step;
   a placement step; and
   a molding step, wherein
   in the inserting step, an insert member is mounted on the second mold,
   in the placement step, foamed resin in a mold molten state is caused to droop between the first and second molds in a state where the insert member is mounted on the second mold, and
   the insert member includes a main body portion and an extension portion extending from the main body portion, and the extension portion is buried in the foamed resin in the molding step.

2. The method according to claim 1, wherein
   the molding step includes an expansion step, and
   in the expansion step, the foamed resin is vacuum suctioned by both of the first and second molds in a state where the first and second molds are close to each other to provide a gap greater than a thickness of the foamed resin between the first and second molds, and accordingly is expanded to a thickness of the gap.

3. The method according to claim 2, wherein
   the expansion step includes a first suction step, a mold approaching step, and a second suction step in this order,
   in the first suction step, the foamed resin is vacuum suctioned by the first mold to shape the foamed resin into a shape along a cavity of the first mold,
   in the mold approaching step, the first and second molds are brought close to each other in such a manner as to provide the gap between the first and second molds, and
   in the second suction step, the foamed resin is vacuum suctioned by the first and second molds to expand the foamed resin to the thickness of the gap.

4. The method according to claim 2, wherein
   the second mold includes a protrusion surrounding a mounting part for the insert member, and in the expansion step, the protrusion presses the foamed resin to form a groove on the foamed resin.

* * * * *